United States Patent
Yang et al.

(10) Patent No.: US 12,452,415 B2
(45) Date of Patent: Oct. 21, 2025

(54) JOINT COMPONENT VIDEO FRAME FILTERING

(71) Applicant: InterDigital VC Holdings, Inc., Wilmington, DE (US)

(72) Inventors: Hua Yang, Plainsboro, NJ (US); Yuwen He, San Diego, CA (US); Wei Chen, San Diego, CA (US); Hongyu Li, Princeton Junction, NJ (US)

(73) Assignee: InterDigital VC Holdings, Inc., Wilmington, DE (US)

(*) Notice: Subject to any disclaimer, the term of this patent is extended or adjusted under 35 U.S.C. 154(b) by 188 days.

(21) Appl. No.: 17/762,991

(22) PCT Filed: Sep. 23, 2020

(86) PCT No.: PCT/US2020/052273
§ 371 (c)(1),
(2) Date: Mar. 23, 2022

(87) PCT Pub. No.: WO2021/061814
PCT Pub. Date: Apr. 1, 2021

(65) Prior Publication Data
US 2022/0377324 A1    Nov. 24, 2022

Related U.S. Application Data

(60) Provisional application No. 62/942,952, filed on Dec. 3, 2019, provisional application No. 62/926,005, filed
(Continued)

(51) Int. Cl.
*H04N 19/00*  (2014.01)
*H04N 19/117*  (2014.01)
(Continued)

(52) U.S. Cl.
CPC ......... *H04N 19/117* (2014.11); *H04N 19/176* (2014.11); *H04N 19/186* (2014.11)

(58) Field of Classification Search
CPC .................................................... H04N 19/00
See application file for complete search history.

(56) References Cited

U.S. PATENT DOCUMENTS

| | | |
|---|---|---|
| 2013/0101018 A1 | 4/2013 | Chong et al. |
| 2016/0080712 A1 | 3/2016 | Daly et al. |
| | (Continued) | |

FOREIGN PATENT DOCUMENTS

| | | |
|---|---|---|
| CN | 103535035 A | 1/2014 |
| CN | 105164996 A | 12/2015 |
| | (Continued) | |

OTHER PUBLICATIONS

"VTM-6.0 Reference Software", Available at <https://vcgit.hhi.fraunhofer.de/jvet/VVCSoftware_VTM/tags/VTM-6.0>, pp. 1-2.
(Continued)

*Primary Examiner* — Maryam A Nasri
(74) *Attorney, Agent, or Firm* — Condo Roccia Koptiw LLP

(57) ABSTRACT

A filter may be applied to a subset of components associated with a sample in a coding block. The output of the filter may be used to modify values for other component(s). For example, a filter may be applied to a selected (for example, dominant) component(s). The output of the filter may be used to modify a value for one of the other components (for example, non-dominant components). The output of the filter may be used, for example, after a weighting factor is applied to the filter output, to modify a value for another one of the other components. A joint refinement signal may be obtained, for example, as the filtered output signal minus the filter input signal of the selected component(s). A properly
(Continued)

weighted version of the joint refinement signal may be applied to modify the other components.

18 Claims, 27 Drawing Sheets

Related U.S. Application Data on Oct. 25, 2019, provisional application No. 62/910,184, filed on Oct. 3, 2019, provisional application No. 62/904,335, filed on Sep. 23, 2019.

(51) Int. Cl.
  *H04N 19/176* (2014.01)
  *H04N 19/186* (2014.01)

(56) References Cited

U.S. PATENT DOCUMENTS

| | | | |
|---|---|---|---|
| 2016/0309184 A1* | 10/2016 | Choe | H04N 19/593 |
| 2017/0352062 A1 | 12/2017 | Vermeir | |
| 2018/0063527 A1 | 3/2018 | Chen et al. | |
| 2018/0220138 A1* | 8/2018 | He | H04N 19/80 |
| 2019/0014349 A1 | 1/2019 | Karczewicz et al. | |
| 2025/0193458 A1 | 6/2025 | Dong et al. | |

FOREIGN PATENT DOCUMENTS

| | | |
|---|---|---|
| CN | 107211115 A | 9/2017 |
| CN | 109327704 A | 2/2019 |
| WO | 2012/155553 A1 | 11/2012 |

OTHER PUBLICATIONS

Bossen et al., "JVET common test conditions and software reference configurations for SDR video", JVET-N1010-v1, Joint Video Experts Team (JVET) of ITU-T SG 16 WP 3 and ISO/IEC JTC 1/SC 29/WG 11, 14th Meeting: Geneva, CH, Mar. 19-27, 2019, 6 pages.

Bross et al., "High Efficiency Video Coding (HEVC) Text Specification Draft 10 (For FDIS & Consent)", JCTVC-L1003_V1, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.

Bross et al., "Versatile Video Coding (Draft 6)", JVET-O2001-VD, Editors, Joint Video Experts Team (JVET) of ITU-T SG 16 WP 3 and ISO/IEC JTC 1/SC 29/WG 11, 15th Meeting: Gothenburg, SE, Jul. 3-12, 2019, 456 pages.

Chen et al., "Algorithm Description for Versatile Video Coding and Test Model 6 (VTM 6)", JVET-O2002-V2, Editors, Joint Video Experts Team (JVET) of ITU-T SG 16 WP 3 and ISO/IEC JTC 1/SC 29/WG 11, 15th Meeting: Gothenburg, SE, Jul. 3-12, 2019, 87 pages.

Ikonin et al., "CE5-3: Combination of Hadamard filter and Sao (CE5-3.2, CE5-3.4)", JVET-P0078-V1, Huawei Technologies Co., LTD., Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-18.

ITU-T, "Advanced Video Coding for Generic Audiovisual Services", Recommendation H.264, Series H: Audiovisual and Multimedia Systems, Infrastructure of Audiovisual Services—Coding of Moving Video, Nov. 2007, 563 pages.

Misra et al., "Cross-Component Adaptive Loop Filter for Chroma", JVET-O0636_r1, Sharp Labs of America, Sharp Electronics of Canada, Joint Video Experts Team (JVET) of ITU-T SG 16 WP 3 and ISO/IEC JTC 1/SC 29/WG 11, 15th Meeting: Gothenburg, SE, Jul. 3-12, 2019, 9 pages.

Segall et al., "Joint Call for Proposals on Video Compression with Capability Beyond Hevc", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.

SMPTE Standard, "VC-1 Compressed Video Bitstream Format and Decoding Process", SMPTE 421M, 2006, 493 pages.

Strom et al., "CE5-3.1 Combination of Bilateral Filter and SAO", JVET-P0073, Ericsson Research, Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-13.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Yang et al., "CE5-Related: Joint Chroma Cross-Component Adaptive Loop Filtering", JVET-P0372-V1, InterDigital Communications, Inc., Joint Video Experts Team (JVET) of ITU-T SG 16 WP 3 and ISO/IEC JTC 1/SC 29/WG 11, 16th Meeting: Geneva, CH, Oct. 1-11, 2019, 4 pages.

Bossen et al., "CE5-related: On the design of CC-ALF", JVET-P1008-v2, Joint Video Experts Team (JVET) of ITU-T SG 16 WP 3 and ISO/IEC JTC 1/SC 29/WG 11, 16th Meeting: Geneva, CH, Oct. 1-11, 2019, 6 pages.

Du et al., "Non-CE5: On non-linear ALF clipping values", JCTVC-P0505-v5, Editor, Joint Collaborative Team on Video Coding (JCT-VC) of ITU-T SG 16 WP 3 and ISO/IEC JTC 1/SC 29/WG 11, 16th Meeting: Geneva, CH, Oct. 1-11, 2019, 7 pages.

\* cited by examiner

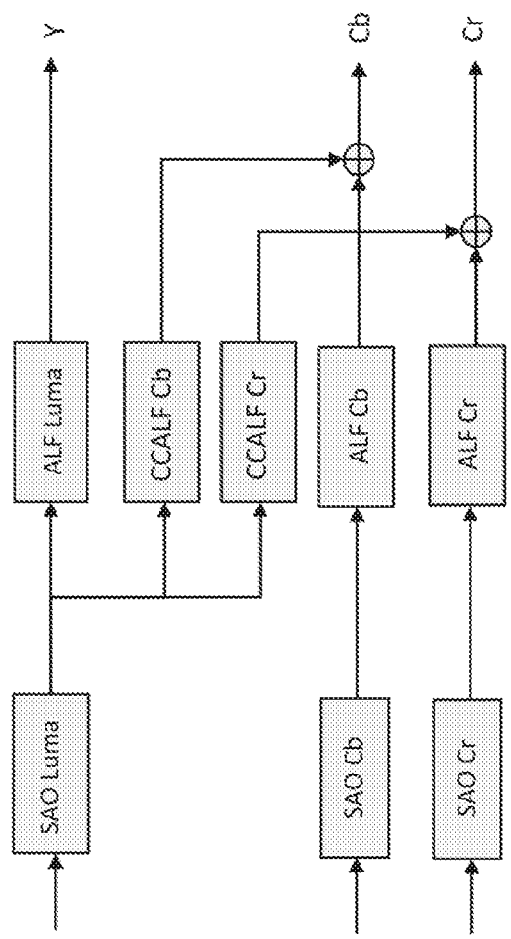
FIG. 19
FIG. 20B
FIG. 20A

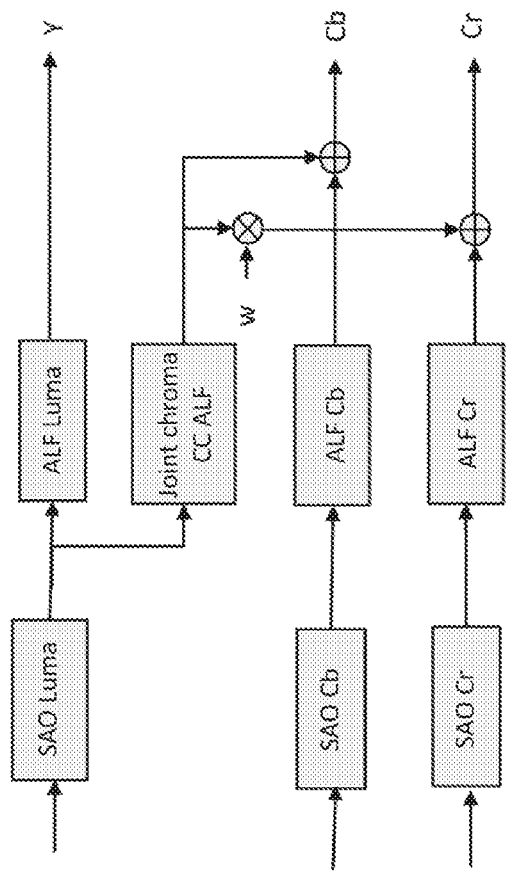
FIG. 21A
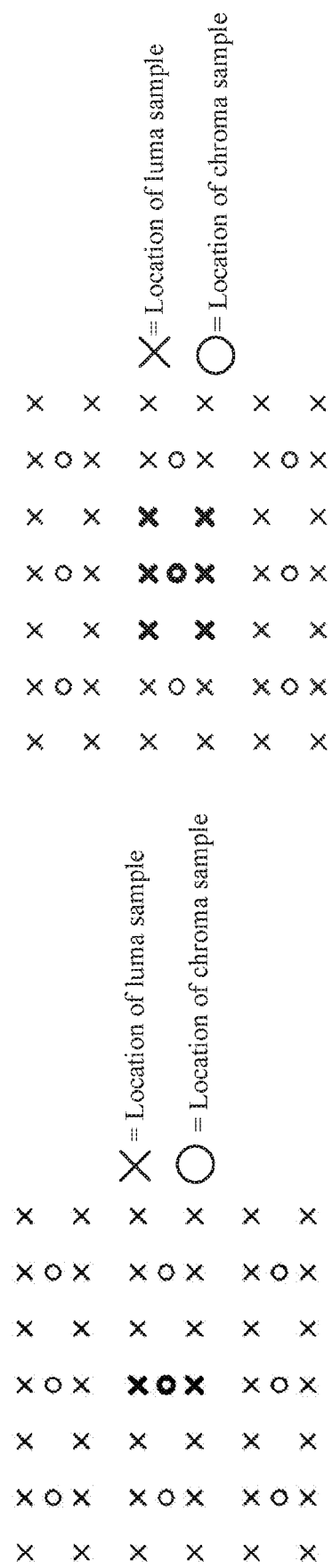
FIG. 21C
FIG. 21B

JOINT COMPONENT VIDEO FRAME FILTERING

CROSS-REFERENCE TO RELATED APPLICATIONS

This application is the National Stage Entry under 35 U.S.C. § 371 of Patent Cooperation Treaty Application No. PCT/US2020/0052273, filed Sep. 23, 2020, which claims the benefit of U.S. Provisional Application No. 62/904,335, filed Sep. 23, 2019, U.S. Provisional Application No. 62/910,184, filed Oct. 3, 2019, U.S. Provisional Application No. 62/926,005, filed Oct. 25, 2019, and U.S. Provisional Application No. 62/942,952, filed Dec. 3, 2019 which are hereby incorporated herein by reference in their entireties.

BACKGROUND

Video coding systems may be used to compress digital video signals, for example, to reduce the storage and/or transmission bandwidth associated with such signals. Video coding systems may include, for example, block-based, wavelet-based, and/or object-based systems.

SUMMARY

Systems, methods, and instrumentalities are provided for applying a filter (such as, a video frame filter (VFF), an adaptive loop filter (ALF), or a cross-component adaptive loop filter (CCALF)) to a subset of components in video encoding and decoding. A filter may be applied to a subset of (for example, one or more) components associated with a sample in a coding block. Refinement signal(s) may be derived for one or more other components based on an output of the filter application. The output of the filter applied to one or more components may be used to modify (for example, refine) values for one or more other components.

For example, a filter (such as, a set of filter coefficients) may be applied to a selected (for example, a dominant) component. A refinement signal (for example, a joint refinement signal) may be obtained (for example, derived) from application of the filter to the selected component. For example, the refinement signal may be obtained as the filtered output signal minus the filter input signal of the selected component. The filtered output signal may be an output of the filter that is applied to the selected component. A weighted version of the refinement signal may be applied to other components.

For example, two sets of filter coefficients may be applied to two selected (for example, dominant) components. A refinement signal may be derived from one of the two selected components, for example, as the filtered output signal minus the filter input signal of the selected component. A weighted version of the refinement signal may be applied to the other component (for example, the non-selected or non-dominant component).

Joint chroma CCALF may be applied. Joint chroma CCALF may be applied for chroma components (Cb, Cr).

CCALF filtering may be applied for one of the two chroma components. A refinement signal for the other chroma component may be derived as a properly weighted version of the same refinement signal. In an example, a joint chroma CCALF output refinement signal may be applied to the Cb component, weighted, and applied to the other Cr component. A joint chroma CCALF output refinement signal may be applied to the Cr component, then weighted and applied to the Cb component. The joint chroma CCALF (JC-CCALF) filter may be derived iteratively.

In an example, a method may include generating a residual coefficient block, dequantizing the residual coefficient block, and inverse transforming the dequantized residual coefficient block to generate a coding block. The method may include applying a filter (for example, a CCALF) on the coding block, for example, using a linear ALF or a non-linear ALF to generate a refinement block and determining a modified (for example, refined) reconstruction based on the refinement block.

In examples, methods may be implemented to perform video frame filtering on components associated with samples in a coding block for video encoding and decoding. Methods may be implemented, for example, by an apparatus, such as a video processing apparatus, comprising one or more processors configured to execute computer executable instructions, which may be stored on a computer readable medium or a computer program product, that, when executed by the one or more processors, performs the method. The apparatus may, thus, comprise one or more processors configured to perform the method. The computer readable medium or the computer program product may comprise instructions that cause one or more processors to perform the method by executing the instructions. A computer readable medium may contain data content generated according to the method. A signal may comprise a message according to the method. A device, such as a television, a cellular phone, a tablet or a set-top box, may comprise an apparatus, such as a video processing apparatus, and at least one of (i) an antenna configured to receive a signal, the signal including data representative of an image, (ii) a band limiter configured to limit the received signal to a band of frequencies that includes the data representative of the image, or (iii) a display configured to display the image. An apparatus may comprise, for example, a video encoder or a video decoder.

A method for video processing may comprise, for example, obtaining a filter associated with a coding block; applying the filter to a first component associated with a sample in the coding block; modifying a value for a second component associated with the sample in the coding block using an output of the filter applied to the first component; and modifying a value for a third component associated with the sample in the coding block using the output of the filter applied to the first component.

The method may further comprise, for example, obtaining a weighting factor associated with the third component; and applying the weighting factor to the output of the filter to generate a weighted filter output. The value for the third component associated with the sample in the coding block may be modified, for example, using the weighted filter output.

The method may further comprise, for example, reconstructing a value for the first component and obtaining a refinement signal for the second component and for the third component based on a difference between the output of the filter and the value for the first component before the value for the first component is filtered using the filter.

The method may further comprise, for example, reconstructing a value for the first component, the value for the second component, and the value for the third component for the sample in the coding block; obtaining a refinement signal for the second component and for the third component based on a difference between the output of the filter and the value for the first component before the value for the first component is filtered using the filter; obtaining a first weighting factor associated with the second component determining a first weighted refinement signal based on the first weighting factor and the refinement signal; obtaining a second weighting factor associated with the third component; and determining a second weighted refinement signal based on the second weighting factor and the refinement signal, wherein the value for the second component is modified (for example, refined) using the first weighted refinement signal, and the value for the third component is modified using the second weighted refinement signal.

The filter may be CCALF. The first component may be a luma component. The second component and the third component may be chroma components. The method may further comprise, for example, obtaining a chroma ALF associated with the second component and the third component; applying the chroma ALF to the second component and the third component to generate the value for the second component and the value for the third component obtaining a weighting factor associated with the third component; and applying the weighting factor to the output of the filter to generate a weighted filter output, wherein the value for the third component associated with the sample in the coding block is modified (for example, refined) using the weighted filter output.

In some examples, the filter may be a CCALF. The first component may be a luma component. The second component and the third component may be chroma components. The value for the second component and the value for the third component may not be filtered by a chroma ALF. A weighting factor associated with the third component may be obtained and applied to the output of the filter to generate a weighted filter output. The value for the third component associated with the sample in the coding block may be modified (for example, refined) using the weighted filter output.

In some examples, the value for the second component associated with the sample in the coding block may be modified (for example, refined) using the output of the filter, and the value for the third component associated with the sample in the coding block may be modified using the output of the filter.

In some examples, the filter may comprise a video frame filter (VFF).

A method may comprise, for example, accessing data including a residual that is generated based on at least one of the modified value for the second component or the modified (for example, refined) value for the third component; and transmitting the data including the residual.

An apparatus (for example, with one or more processors configured to execute computer executable instructions that implement any method described herein) may comprise an encoder or a decoder. A non-transitory computer readable medium may include data content generated according to the method. A computer readable medium may include instructions for causing one or more processors to perform the method. A computer program product may comprise instructions for performing the method when executed by one or more processors. A device may comprise an apparatus and at least one of (i) an antenna configured to receive a signal, the signal including data representative of an image, (ii) a band limiter configured to limit the received signal to a band of frequencies that includes the data representative of the image, or (iii) a display configured to display the image. A device may comprise an apparatus, such as one or more of a TV, a cell phone, a tablet, or a set-top box (STB). A signal may comprise a residual generated based on at least one of the modified value for the second component or the modified (for example, refined) value for the third component according to the method. An apparatus may comprise an accessing unit configured to access data including a residual that is generated based on at least one of the modified value for the second component or the modified value for the third component; and a transmitter configured to transmit the data including the residual.

An apparatus for video processing may comprise one or more processors configured to: reconstruct a value for a first component associated with a sample in a coding block and a value for a second component associated with the sample in the coding block; obtain a video frame filter (VFF) associated with the coding block; apply the VFF to the first component associated with the sample in the coding block to filter the value for the first component obtain a refinement signal for s second component associated with the sample in the coding block based on a difference between the value for the first component before the value for the first component is filtered using the VFF and a filter output of the VFF; obtain a weighting factor associated with the second component apply the weighting factor to the refinement signal to generate a weighted refinement signal; and refine the value for the second component associated with the sample in the coding block using weighted refinement signal.

BRIEF DESCRIPTION OF THE DRAWINGS

FIGS. 10A and 10B illustrate examples of adaptive loop filter (ALF) shapes (for example, chroma: 5×5 diamond, luma: 7×7 diamond).

FIGS. 11A-11D illustrate examples based on subsampled Laplacian calculations, including subsampled positions for a vertical gradient in FIG. 11A, subsampled positions for a horizontal gradient in FIG. 11B, subsampled positions for a diagonal gradient in a first direction in FIG. 11C, and subsampled positions for a diagonal gradient in a second direction in FIG. 11D.

FIG. 19 is a diagram illustrating a placement of CCALF with respect to other loop filters.

FIGS. 20A and 20B are diagrams illustrating different types of diamond shaped filters.

FIG. 21A is a diagram illustrating an example workflow of JC-CCALF operation in which chroma ALF(s) and JC-CCALF are used.

FIG. 21B is a diagram illustrating examples of luma interpolation for the chroma sample location of a 4:2:0 video signal with 2-tap luma interpolation.

FIG. 21C is a diagram illustrating examples of luma interpolation for the chroma sample location of a 4:2:0 video signal with 6-tap luma interpolation.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
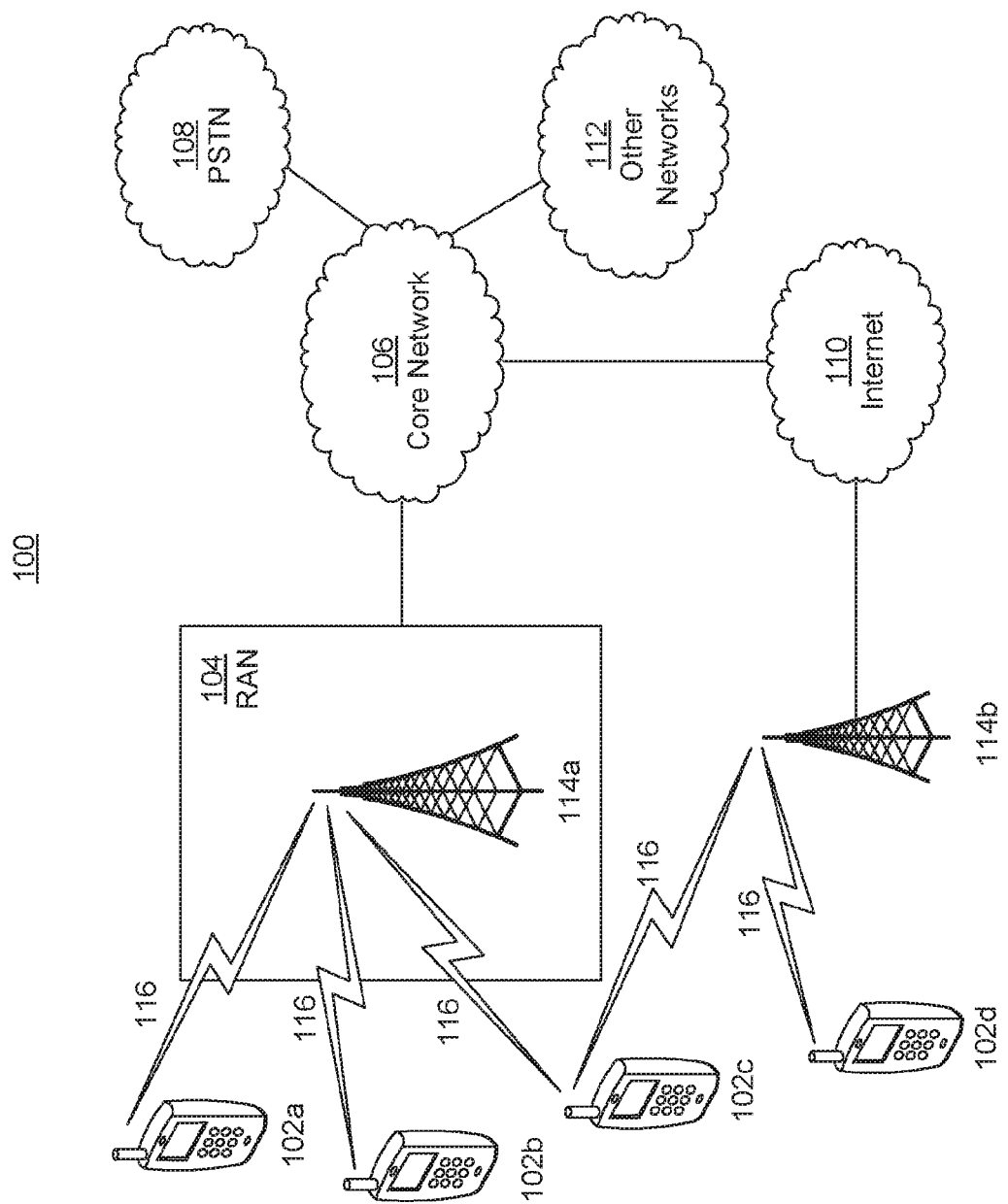
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
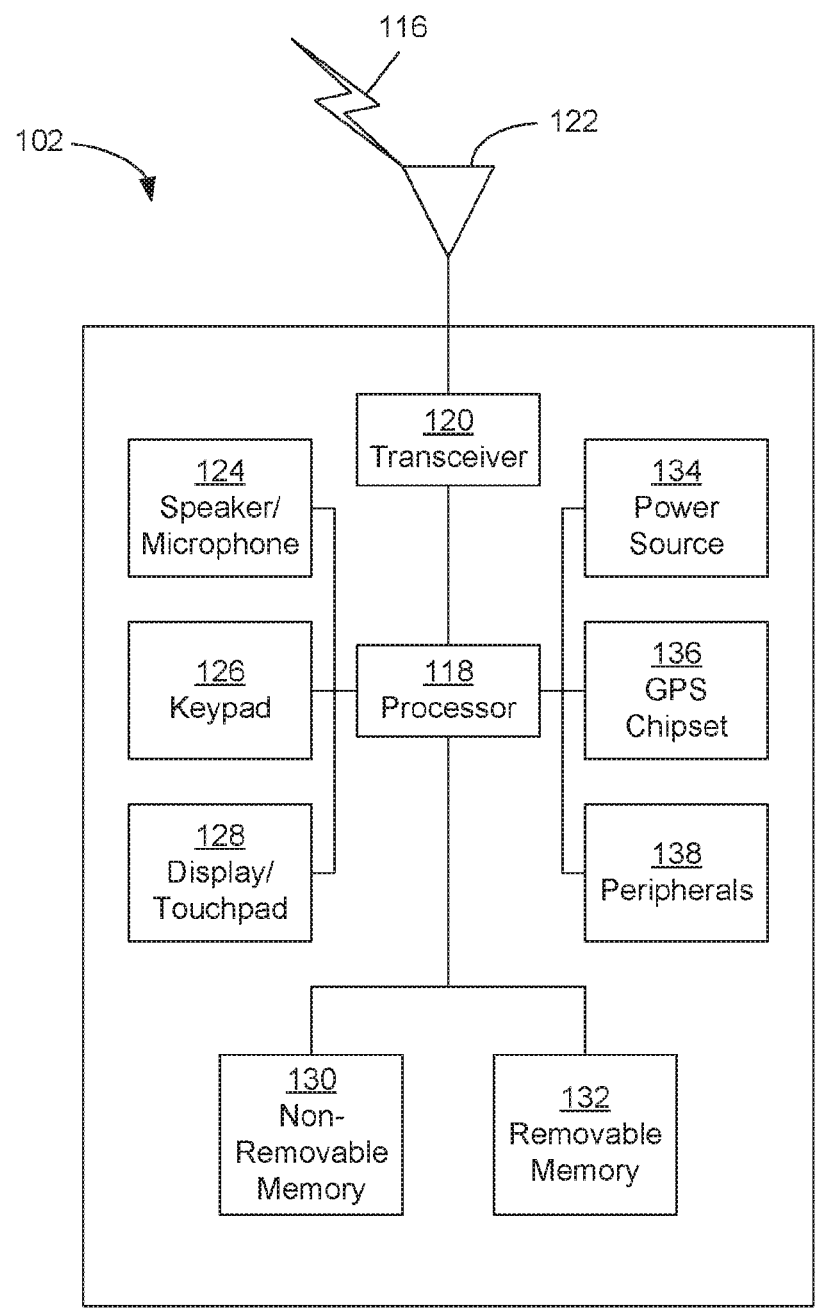
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodimen.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
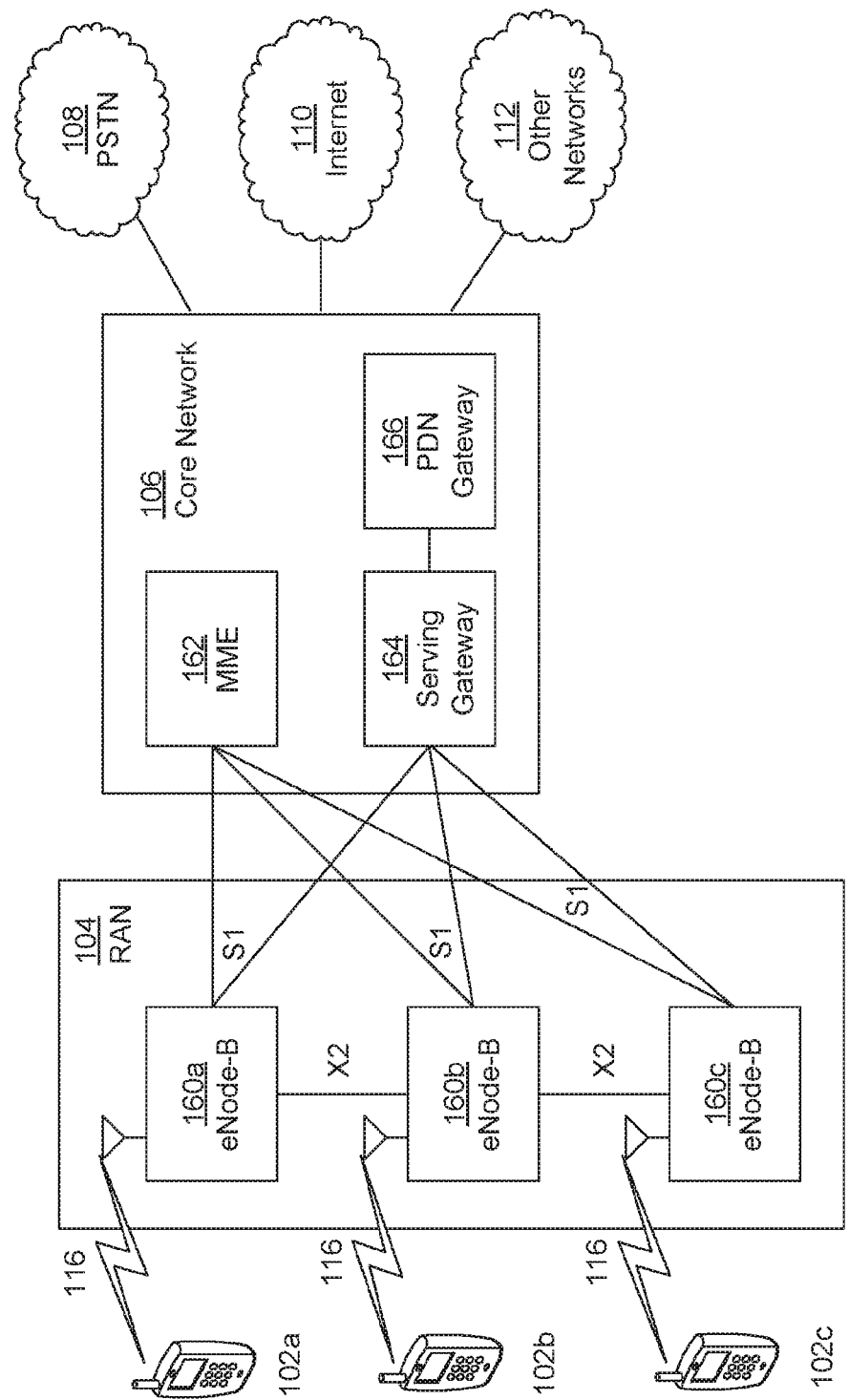
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e LS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
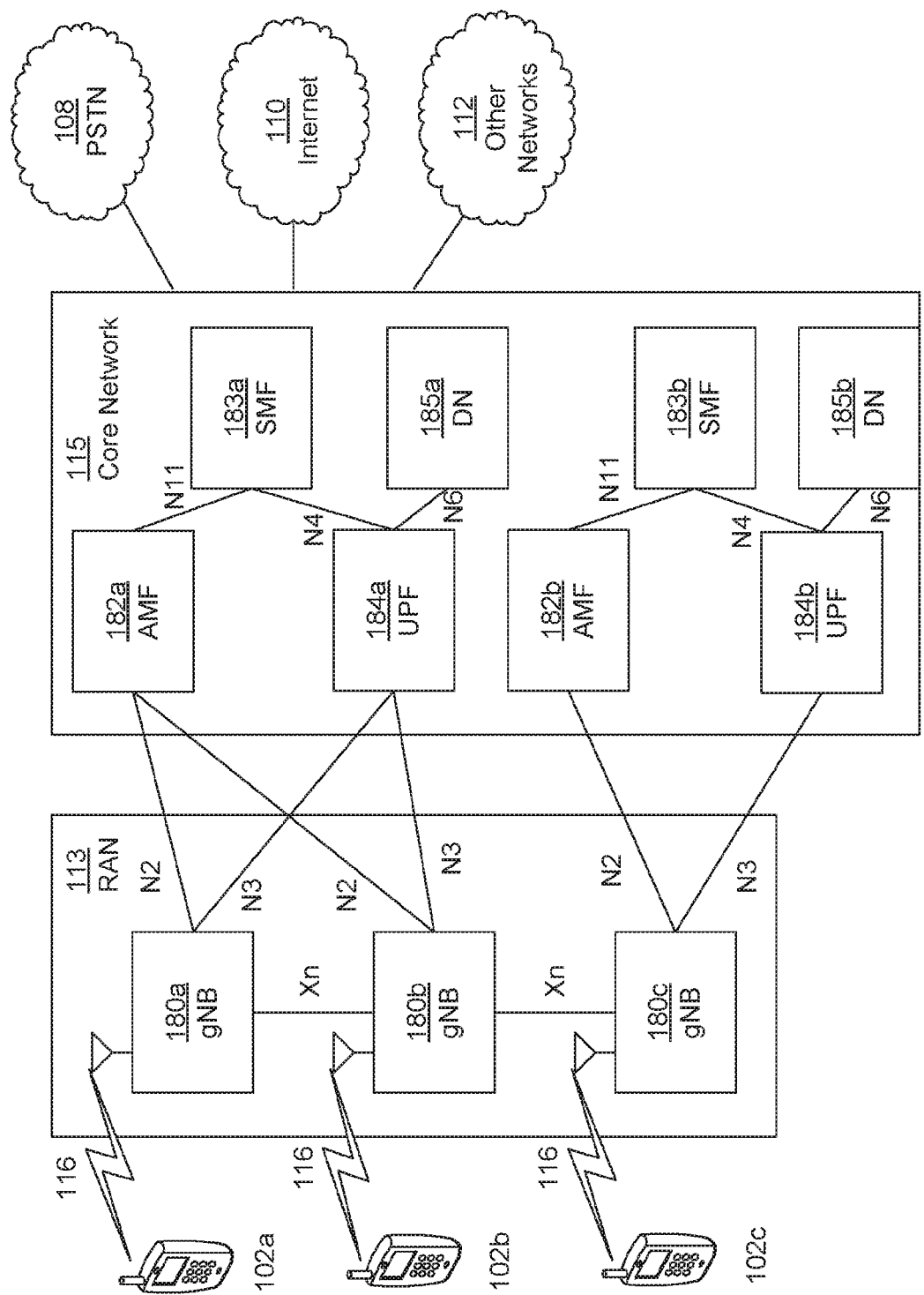
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples or embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-22 described herein may provide some embodiments, but other embodiments are contemplated. The discussion of FIGS. 5-22 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

The terms HDR (high dynamic range) and SDR (standard dynamic range) may be used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range." Such additional embodiments are not constrained by any specific values of dynamic range that might often be associated with the terms "high dynamic range" and "standard dynamic range."

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
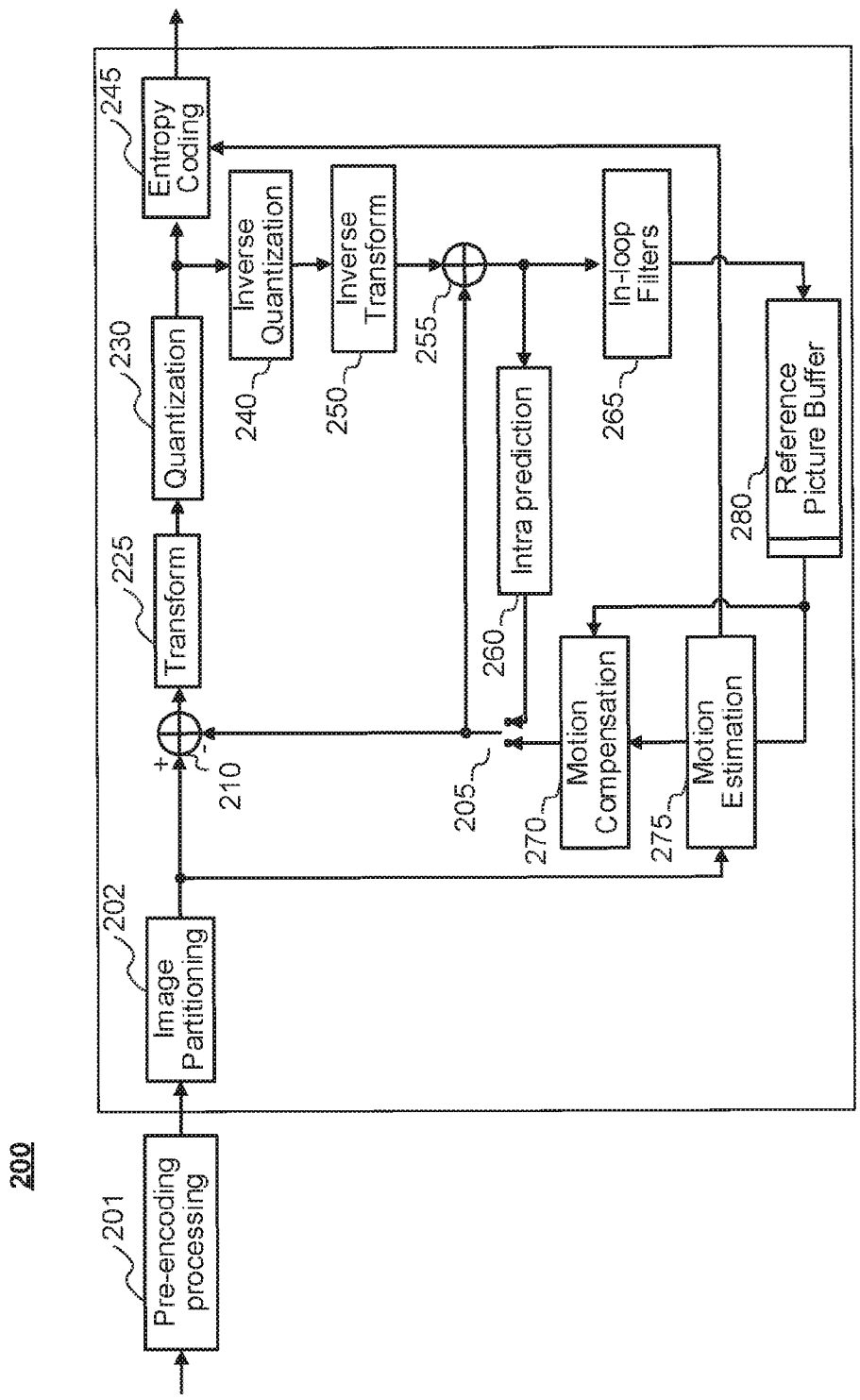
FIG. 2 is a diagram showing an example video encoder.
Figure 3:
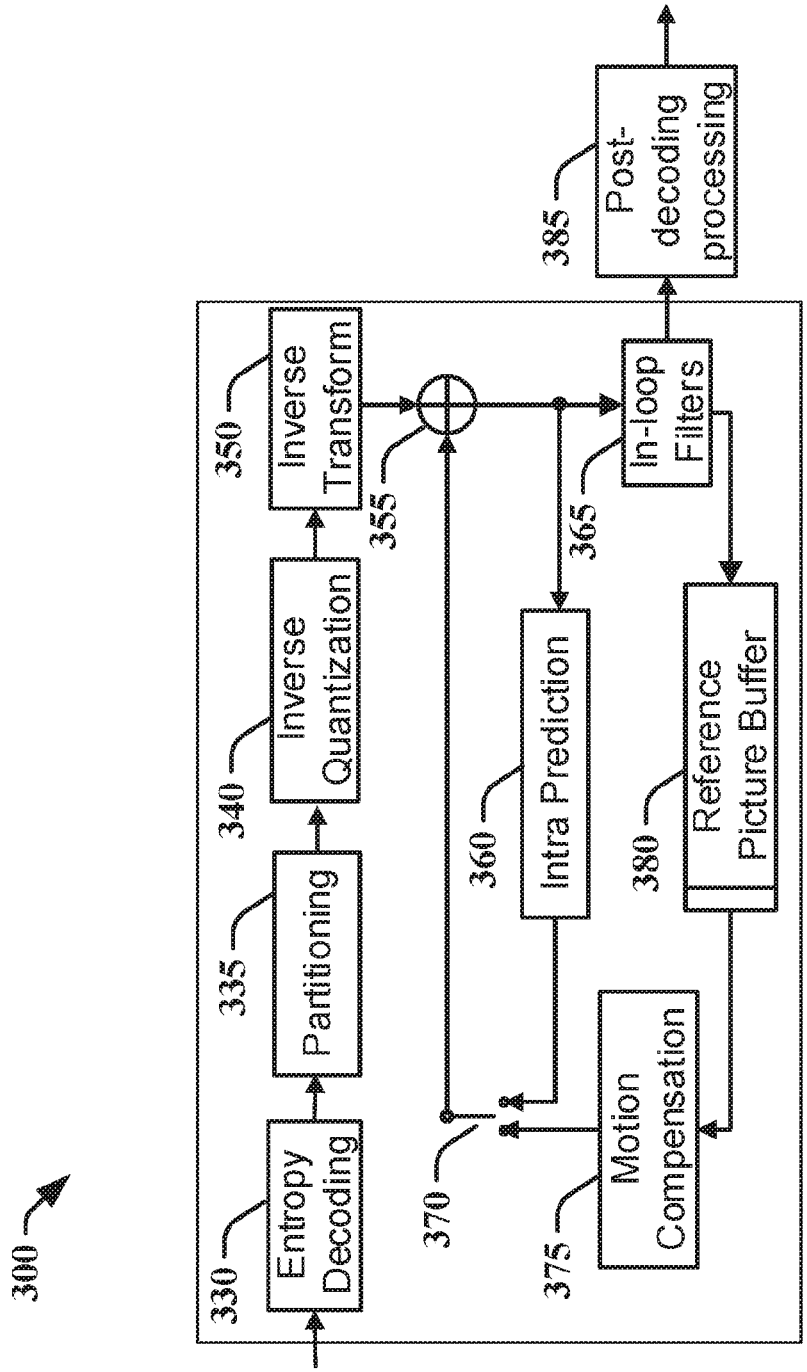
FIG. 3 is a diagram showing an example of a video decoder.

Various methods and other aspects described in this application may be used to modify modules, for example, decoding modules, of a video encoder 200 and decoder 300 as shown in FIG. 2 and FIG. 3. Moreover, the subject matter disclosed herein presents aspects that are not limited to WC or HEVC, and may be applied, for example, to any type, format or version of video coding, whether described in a standard or a recommendation, whether pre-existing or future-developed, and extensions of any such standards and recommendations (for example, including WC and HEVC). Unless indicated otherwise, or technically precluded, the aspects described in this application may be used individually or in combination.

Various numeric values are used in examples described the present application, such as 65 angular intra prediction directions, block sizes of 16×16, 32×32, 64×64, 128×128, 4×4 LFNST, 8×8 LFNST, 16×16 transform matrix, 16×1 coefficient vector, 25 block classifications, 5×5 diamond shape filter, 7×7 diamond shape filter, 25 sets of luma filter coefficients and clipping value indexes, a equal to 2.35, N equal to four, 45° and 135° diagonal gradient patterns, weighting factor value of −1 or %, cross component filter values, $\gamma_{min}$ may be 0.75, or 0.5, etc., $QP_{th1}$ may be 33 or 35, etc., and $QP_{th2}$ may be 40 or 42, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (for example, conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 may also generally perform video decoding as part of encoding video data. For example, the encoder 200 may perform one or more of the video decoding steps presented herein. The encoder reconstructs the decoded images, for example, to maintain synchronization with the decoder with respect to one or more of the following: reference pictures, entropy coding contexts, and other decoder-relevant state variables.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (for example, conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Figure 4:
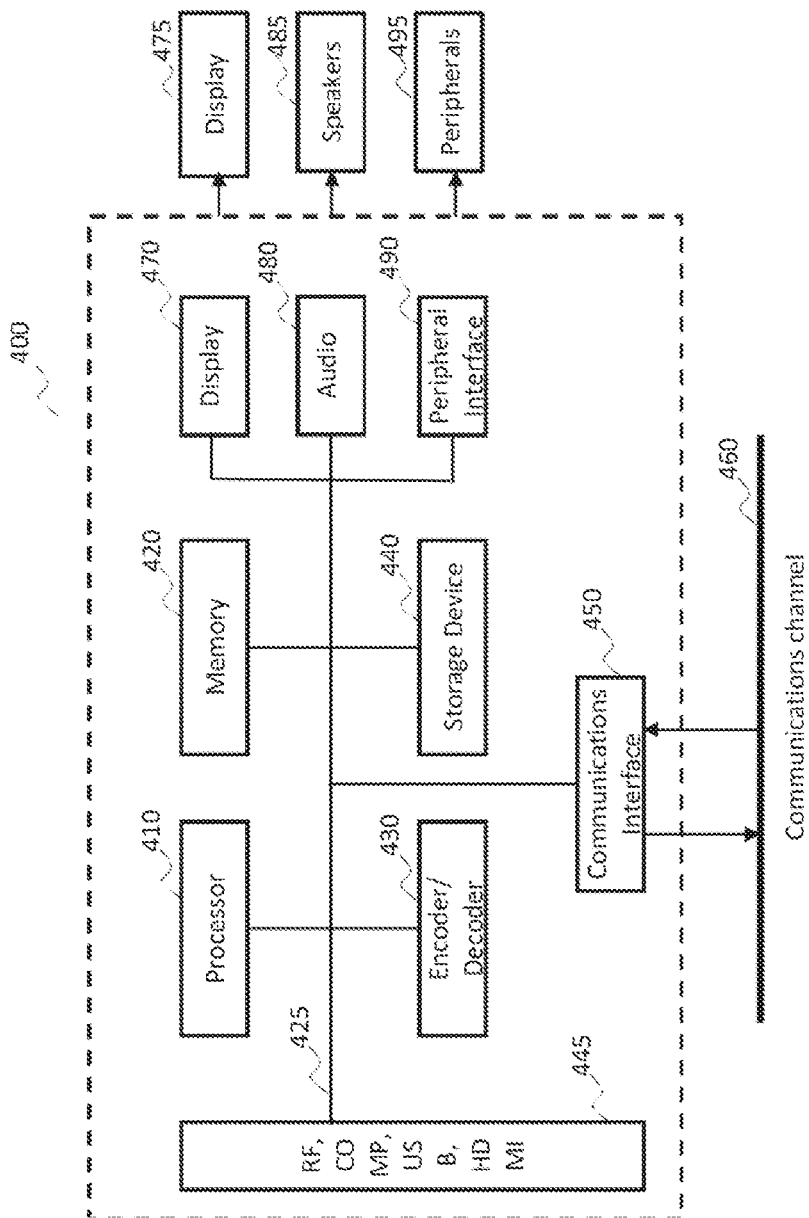
FIG. 4 is a diagram showing an example of a system in which various aspects and embodiments described herein may be implemented.

FIG. 4 is a diagram showing an example of a system in which various aspects and embodiments described herein may be implemented. System 400 may be embodied as a device including the various components described below and is configured to perform one or more of the aspects described in this document Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various embodiments, the system 400 is communicatively coupled to one or more other systems, or other electronic devices, via, for example, a communications bus or through dedicated input and/or output ports. In various embodiments, the system 400 is configured to implement one or more of the aspects described in this documen.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (for example, a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various embodiments, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 410 and/or the encoder/decoder module 430 is used to store instructions and to provide working memory for processing that is needed during encoding or decoding. In other embodiments, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as, for example, MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various embodiments, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various embodiments, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these embodiments is typically connected to an access point or router that provides access to external networks including the Internet for allowing streaming applications and other over-the-top communications. Other embodiments provide streamed data to the system 400 using a set-top box that delivers the data over the HDMI connection of the input block 445. Still other embodiments provide streamed data to the system 400 using the RF connection of the input block 445. As indicated above, various embodiments provide data in a non-streaming manner. Additionally, various embodiments use wireless networks other than Wi-Fi, for example a cellular network or a Bluetooth network.

The system 400 can provide an output signal to various output devices, including a display 475, speakers 485, and other peripheral devices 495. The display 475 of various embodiments includes one or more of, for example, a touchscreen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples of embodiments, one or more of a stand-alone digital video disc (or digital versatile disc) (DVR, for both terms), a disk player, a stereo system, and/or alighting system. Various embodiments use one or more peripheral devices 495 that provide a function based on the output of the system 400. For example, a disk player performs the function of playing the output of the system 400.

In various embodiments, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various embodiments, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various embodiments in which the display 475 and speakers 485 are external components, the output signal may be provided via dedicated output connections, including, for example, HDMI ports, USB ports, or COMP outputs.

The embodiments may be carried out by computer software implemented by the processor 410 or by hardware, or by a combination of hardware and software. As a non-limiting example, the embodiments may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, reconstructing chroma blocks; reconstructing the samples of a coding unit; receiving filter on/off flags; performing operations described in formulas and/or equations; receiving a filter; receiving a video signal comprising luma and chroma components; obtaining a filter associated with a coding block; filter a sample within a coding unit applying the filter to a first component associated with a sample in the coding block; modifying a value for a second component associated with the sample in the coding block using an output of the filter applied to the first component; modifying a value for a third component associated with the sample in the coding block using the output of the filter applied to the first component; obtaining (for example, calculating) a weighting factor associated with the third component; applying the weighting factor to the output of the filter to generate a weighted filter output; modifying the third component associated with the sample in the coding block using the weighted filter output; reconstructing a value for the first component; obtaining a refinement signal for the second component and for the third component based on a difference between the output of the filter and the value for the first component before the value for the first component is filtered using the filter; reconstructing a value for the first component, the value for the second component, and the value for the third component for the sample in the coding block; obtaining a refinement signal for the second component and for the third component based on a difference between the output of the filter and the value for the first component before the value for the first component is filtered using the filter; obtaining a first weighting factor associated with the second component determining a first weighted refinement signal based on the first weighting factor and the refinement signal; obtaining a second weighting factor associated with the third component; determining a second weighted refinement signal based on the second weighting factor and the refinement signal; modifying the second component using the first weighted refinement signal; modifying the value for the third component using the second weighted refinement signal; etc.

As further embodiments, in one example "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the ar.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, selecting a filter coefficient training function; training for an optimal set of filter coefficients; determining whether to terminate training ealy; selecting a filter among multiple filters; aligning optimization criterion of block classification with optimization criterion for filter coefficient derivation; determining whether to apply a previously derived filter; selecting one or more (for example, dominant) components to apply a filter (for example, filter coefficients) to; determining whether to turn filters on/off; performing rate-distortion (RD) cost biasing operations; performing operations described in formulas and/or equations; determining and signaling residuals, offset signals, weighting factors, flags, variables, parameters, filters, coefficients, LUTs, etc.; receiving a video signal comprising luma and chroma components; obtaining (for example, selecting) a filter associated with a coding block; filtering a sample within a coding unit applying the filter to a first component associated with a sample in the coding block; modifying a value for a second component associated with the sample in the coding block using an output of the filter applied to the first component modifying a value for a third component associated with the sample in the coding block using the output of the filter applied to the first component obtaining (for example, calculating) a weighting factor associated with the third component; applying the weighting factor to the output of the filter to generate a weighted filter output; modifying the third component associated with the sample in the coding block using the weighted filter output; reconstructing a value for the first component; obtaining a refinement signal for the second component and for the third component based on a difference between the output of the filter and the value for the first component before the value for the first component is filtered using the filter; reconstructing a value for the first component, the value for the second component, and the value for the third component for the sample in the coding block; obtaining a refinement signal for the second component and for the third component based on a difference between the output of the filter and the value for the first component before the value for the first component is filtered using the filter; obtaining a first weighting factor associated with the second component; determining a first weighted refinement signal based on the first weighting factor and the refinement signal; obtaining a second weighting factor associated with the third component determining a second weighted refinement signal based on the second weighting factor and the refinement signal; modifying the second component using the first weighted refinement signal; modifying the value for the third component using the second weighted refinement signal; etc.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, as shown and described with respect to Table 2 (such as, LfnstDcOnly, LfnstZeroOutSigCoeffFlag, transform_tree (x0, y0, cbWidth, cbHeight, treeType)); Table 3 (such as, pred_mode_plt_flag); Table 6 (such as, alf_ctb_flag, alf_ctb_joint_chroma_cross_component_cb_flag); Table 7 (such as, alf_ctb_filter_alt_idx, alf_ctb_joint_chroma_cross_component_filter_idc); variables, parameters and functions shown and described with respect to formulas and equations (such as, tgt_vff_ds, tgt_vff, parameters w_C, w_Cr, resY_ds, variables $curr_{Cb}$ and $curr_{Cr}$, ccalf_off, ccalf_on); other syntax elements (such as, sao-type-idx, sao-eo-class, weight_index, slice_joint_chroma_cross_component_alf_weight_sign_flag, JcCcWeight, JcCcAlfWeight, JcCcAlfCoeff, JcCcAlfWeightFactor, JcCcAlfWLut); etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment," "an embodiment," "an example," "one implementation" or "an implementation," as well as other variations thereof, means that a particular feature, structure, characteristic, and so forth described in connection with the embodiment is included in at least one embodiment. Thus, the appearances of the phrase "in one embodiment," "in an embodiment," "in an example," "in one implementation," or "in an implementation", as well any other variations, appearing in various places throughout this application are not necessarily all referring to the same embodiment or example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/," "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in some embodiments the encoder signals (for example, to a decoder) a video signal comprising luma and chroma components, prediction signals, a coding unit size, residuals (such as, a joint residual block for Cb and Cr blocks), selected dominant components (such as, variable vLf_direct_applied_component), offset signals, weighting factors (such as, fixed or variable values), refinement signals (such as an output (for example, filtered output) for a filter applied to a selected/dominant component), flags (such as, an MPM flag, block-level CCALF on/off flags, a flag indicating whether to apply ALF to a luma CTB), maps (such as, an on/off block map), variables (such as, variable vff_direct_applied_component or vnf_not_direct_applied_component), parameters (such as, ALF or CCALF filter parameters, SAO parameters), filters (such as, filter sets, an ALF and/or a CCALF filter), coefficients (such as, luma and chroma filter coefficients, central position coefficients), LUTs, indexes (such as, a weight value index, a filter set index, an LFNST index, clipping value indexes), etc. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Video coding may use a variety of coding structures. Partitioning may include, for example, flexible multi-type tree block partitioning (for example, quad-tree, binary tree, and/or ternary tree partitioning). Prediction may include intra-prediction and inter-prediction. Intra prediction may use, for example, one or more (for example, 65) angular intra prediction directions, including wide angle prediction, chroma component linear model (CCLM), and/or matrix-based intra prediction (MIP). Inter prediction may use, for example, an affine motion model, sub-block temporal motion vector prediction (SbTMVP), adaptive motion vector precision, decoder-side motion vector refinement (DMVR), triangular partitions, combined intra and inter prediction (CIIP), merge mode with motion vector difference (MMVD), bi-directional optical flow (BDOF), pixel refinement optical flow (PROF), and/or bi-prediction with CU weights (BiCW). Transform, quantization and coefficients coding may include, for example, multiple primary transform selection with DCT2, DST7 and DCT8, secondary transform coding of low frequency non-separable transform (LFNST), dependent quantization (DQ) with max QP increased from 51 to 63, and/or modified transform coefficient coding. Video coding may use an in-loop filter (for example, a generalized adaptive loop filter (GALF)). Video coding may use screen content coding (for example, intra block copy (IBC) and/or palette mode (PLT) for 4:4:4 content). 360-degree video coding (for example, horizontal wrap-around motion compensation) may be performed (for example, with loop-filtering disabled at virtual boundaries).

Cross-component adaptive loop-filtering (CCALF) may be applied to refine chroma components based on luma sample values.

Figure 5B:
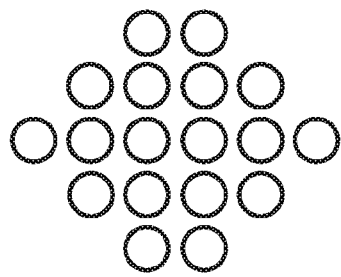
FIG. 5B illustrates an example diamond shaped filter.
Figure 5A:
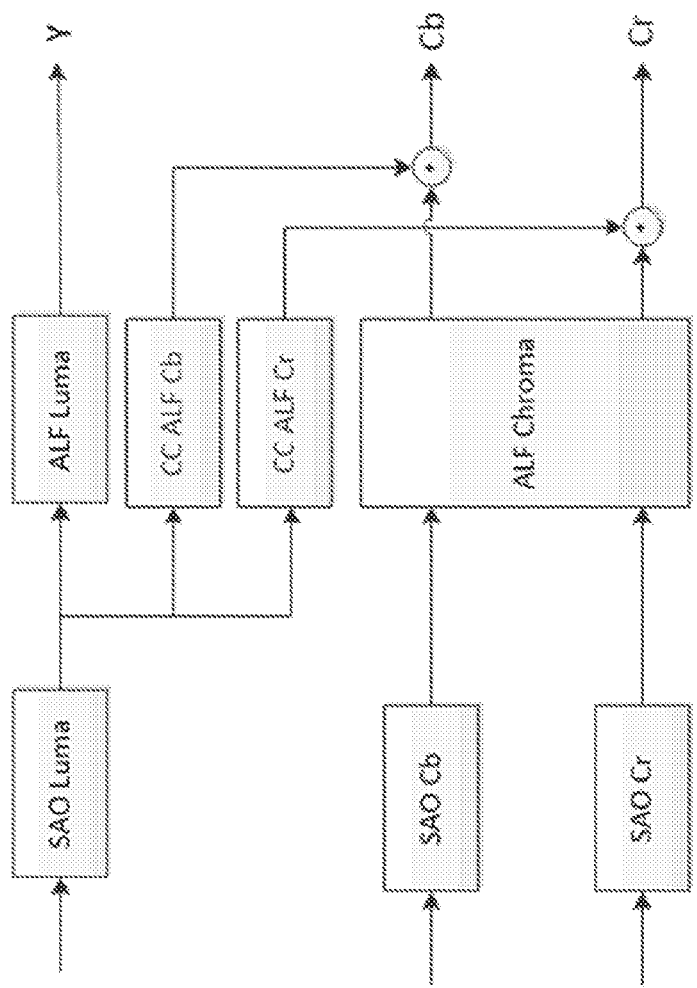
FIG. 5A illustrates an example placement of cross-component adaptive loop-filtering (CCALF) with respect to other loop filters.

FIG. 5A illustrates an example placement of CCALF with respect to other loop filters. CCALF may operate by applying, for example, a linear, diamond shaped filter, to the luma channel to modify (for example, enhance) one or more chroma components. FIG. 5B illustrates an example diamond shaped filter. A CCALF filter may be applied to a diamond region centered at the collocated position in luma component for a chroma component sample. The filter output may be added to a chroma sample value. In an example, the filter coefficients may be transmitted in an adaptation parameter set (APS), scaled by a factor (for example, of $2^{10}$), and rounded for fixed point representation. Application of the filters may be controlled on a variable block size and may be signaled to provide an indication, such as by a context-coded flag received for a (for example, each) block of samples. The block size (for example, along with a CCALF enabling flag) may be received at the slice-level for (for example, each of) one or more chroma components. The supported block sizes (for example, in chroma samples) may include, for example, 16×16, 32×32, 64×64, 128×128. Filter coefficient training functions used in ALF may be used for CCALF in a video processing apparatus (for example, an encoder).

Chroma residuals may be coded jointly (for example, an example coding device may support a mode where the chroma residuals may be coded jointly). A joint residual block may be signaled for Cb and Cr blocks in the same transform unit, for example, if a joint coding of chroma residuals mode is activated. A Cb residual may be set equal to the signaled residual. The Cr residual may be set by negating the signs of the signaled residual. A decoder may reconstruct the chroma blocks, for example, by adding the signaled joint residual to the Cb prediction block and deducting the signal joint residual from the Cr prediction block. The joint residual may be coded using the regular chroma residual coding process. The flag indicating whether joint residual mode is used may be signaled with a flag in the bitstream, for example, if the Cb and Cr coded block flags (CBFs) are set to a certain value (for example, set to 1, which is higher value than 0).

Chroma QP offset values may be signaled in a picture parameter set (PPS) and in a slice header for the joint chroma residual coding mode separately from other chroma QP offset values signaled for other chroma residual coding modes. Chroma QP offset values may be used to derive the chroma QP values for blocks coded using the joint chroma residual coding mode. In examples, chroma QP offset may be set to −1 for the joint chroma residual coding mode and may be set to +1 for another chroma residual coding mode.

A video processing apparatus (for example, an encoder) may subtract the average of the Cr residual (for example, denoted as resCr) from the Cb residual (for example, denoted as resCb), which may be used as an input to a transform and quantization process, for example, in accordance with Equation (1):

$$\text{resJoint}=(\text{res}Cb-\text{res}Cr)/2 \quad (1)$$

Chroma scaling may be applied to the joint residual (for example, similar to chroma scaling in another chroma residual coding mode), for example, if chroma scaling of the luma mapping with chroma scaling (LMCS) mode is active. The obtained (for example, coded) joint residual signal may be scaled.

Figure 6:
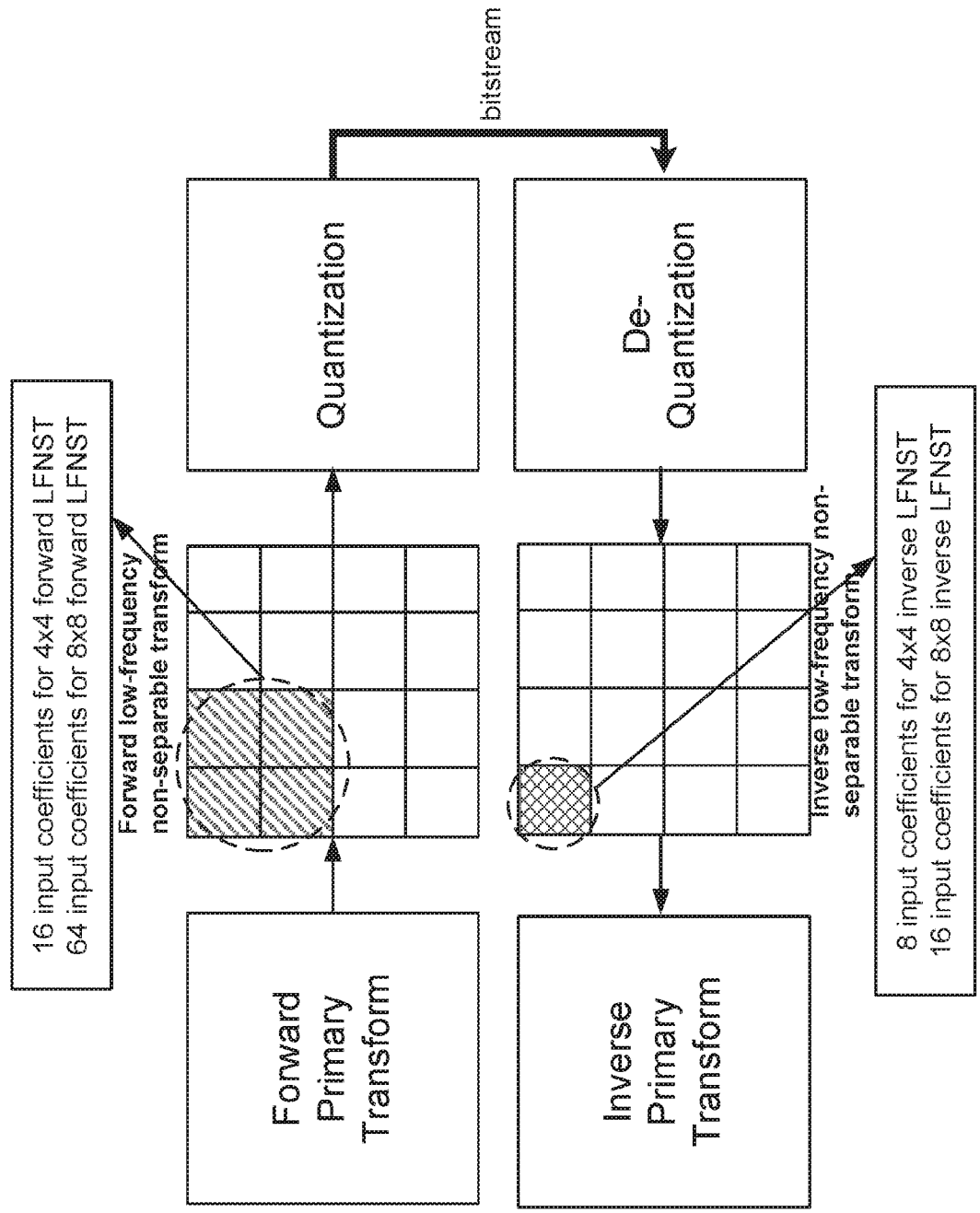
FIG. 6 illustrates an example low-frequency non-separable transform (LFNST) process.

A low-frequency non-separable transform (LFNST) (for example, reduced secondary transform) may be applied between a forward primary transform and quantization (for example, at an encoder) and between de-quantization and inverse primary transform (for example, at a decoder), for example, as shown in FIG. 6.

FIG. 6 illustrates an example low-frequency non-separable transform (LFNST) process. In an example (for example, of LFNST), a 4×4 non-separable transform and/or an 8×8 non-separable transform may be applied according to block size. For example, a 4×4 LFNST may be applied for small blocks (for example, min (width, height)<8), and an 8×8 LFNST may be applied for larger blocks (for example, min (width, height)>4).

A non-separable transform may be used in LFNST, for example, in accordance with Equation (2) using an example input.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (2)$$

A 4×4 LFNST may be applied, for example, by representing the 4×4 input block X as a vector $\vec{X}$, for example, in accordance with Equation (3).

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T \quad (3)$$

A non-separable transform may be calculated as $\vec{F} = T \cdot \vec{X}$, where $\vec{F}$ may indicate the transform coefficient vector, and T may be, for example, a 16×16 transform matrix. A 16×1 coefficient vector F may be (for example, subsequently) re-organized as a 4×4 block using a scanning order for the block (for example, horizontal, vertical or diagonal). The coefficients with smaller index may be placed with the smaller scanning index in the 4×4 coefficient block.

A reduced non-separable transform may be used. An LFNST may be based on a direct matrix multiplication approach to apply a non-separable transform. An LFNST may be implemented in a single pass (for example, without multiple iterations). The non-separable transform matrix dimension may be reduced, for example, to minimize computational complexity and memory space to store the transform coefficients. A reduced non-separable transform (for example, or RST) may be used in an LFNST. A reduced non-separable transform may include, for example, mapping an N dimensional vector (for example, N may be equal to 64 for an 8×8 NSST) to an R dimensional vector in a different space, where N/R (R<N) may be the reduction factor. An RST matrix may be an R×N matrix, for example, in accordance with Equation (4).

$$T_{R \times N} = \begin{bmatrix} t_{11} & t_{12} & t_{13} & \cdots & t_{1N} \\ t_{21} & t_{22} & t_{23} & \cdots & t_{2N} \\ \vdots & & \ddots & & \vdots \\ t_{R1} & t_{R2} & t_{R3} & \cdots & t_{RN} \end{bmatrix} \quad (4)$$

The R rows of the transform may be R bases of the N dimensional space. The inverse transform matrix for RT may be the transpose of its forward transform. A reduction factor of 4 may be applied, for example, for an 8×8 LFNST. A 64×64 direct matrix (for example, an 8×8 non-separable transform matrix size) may be reduced to a 16×48 direct matrix. The 48×16 inverse RST matrix may be used at the decoder side to generate core (for example, primary) transform coefficients in 8×8 top-left regions. A (for example, each) matrix may, for example, if 16×48 matrices are applied, take 48 input data from three 4×4 blocks in a top-left 8×8 block, excluding a right-bottom 4×4 block. Memory usage for storing the LFNST matrices may be reduced from 10 KB to 8 KB, for example, based on the reduced dimension. In an example, the top 8×48 and 8×16 matrices may be applied to an 8×8 TU and a 4×4 TU, respectively. An 8×8 LFNST (for example, 16×48 matrix) may be applied to top-left 8×8 region, for example, for blocks larger than an 8×8 TU. A 4×4 LFNST (for example, 16×16 matrix) may be applied to (for example, only) top-left 4×4 region, for example, for an 8×4 TU or a 4×8 TU. A 4×4 LFNST may be applied to (for example, each of) two adjacent top-left 4×4 blocks, for example, for a 4×N or an N×4 TU (N≥16). The worst-case number of multiplications may be, for example, 8 per sample.

An LFNST transform set may be selected. In examples, there may be 4 transform sets and 2 non-separable transform matrices (for example, kernels) per transform set used in LFNST. Mapping from an intra prediction mode to a transform set may be pre-defined, for example, as shown in Table 1. The selected non-separable secondary transform candidate for a transform set may be specified by the LFNST index. In an example, an LFNST index may be (for example, explicitly) signaled. An LFNST index may be signaled in a bit-stream, for example, once per Intra CU after transform coefficients. An indication (for example, IntraPredMode) may indicate the intra prediction mode of the coding block.

TABLE 1 example transform selection table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

A forward 8×8 LFNST may use 16×48 matrices, for example, so that the transform may produce non-zero coefficients (for example, only) in the top-left 4×4 region within the given 8×8 region. The 8×8 region (for example, except the top-left 4×4 region) may generate zero coefficients if the LFNST is applied, for example, only zero coefficients if the LFNST is applied. Signaling of the LFNST index may be skipped, for example, if a non-zero element is detected within an 8×8 block region other than top-left 4×4 (for example, because it may imply that the LFNST is not applied). An LFNST index may be inferred to be zero. An LFNST may be disabled, for example, if LFNST index is equal to zero (0). LFNST may be applied, if otherwise (for example, if LFNST index is not equal to zero (0)). An LFNST index may be obtained (for example, context coded) and/or may be independent from intra prediction mode. In an example, (for example, only) the first bin may be context coded.

An inverse LFNST may be conditionally applied, for example, if the block size is greater than or equal to a given threshold (W>=4 && H>=4) and if the transform skip mode flag is equal to zero. An 8×8 LFNST may be applied to the top-left 8×8 region of a transform coefficient block, for example, if the width (W) and height (H) of the transform coefficient block are greater than 4. A 4×4 LFNST may be applied on the top-left min(8, W)×min(8, H) region of the transform coefficient block, if otherwise (for example, if the width (W) or height (H) of a transform coefficient block is not greater than 4).

In examples, an LFNST may be applied for intra CU in both intra and inter slices, and for both luma and chroma LFNST indices for luma and chroma may be signaled separately, for example, if a dual tree is enabled. A single LFNST index may be signaled and used for luma and chroma, for example, for inter slice (for example, when the dual tree is disabled).

An LFNST may be disabled and signaling of the RST index may be skipped, for example, if an intra sub-partition (ISP) mode is selected. RST may be disabled for an ISP-predicted residual. An LFNST may be disabled and signaling of the index may be skipped, for example, if a matrix based intra prediction (MIP) mode is selected and min (W, H)<16.

The samples of a rectangular block of width W and height H, may be predicted by performing MIP. An MIP may take as input a line of H reconstructed neighboring boundary samples left of the block and a line of W reconstructed neighbouring boundary samples above the block. Intra prediction may be performed, for example, if the reconstructed samples are unavailable. Generation of the prediction signal may be based on one or more of the following: averaging, matrix vector multiplication and linear interpolation (for example, as shown by example in FIG. 7.

Figure 7:
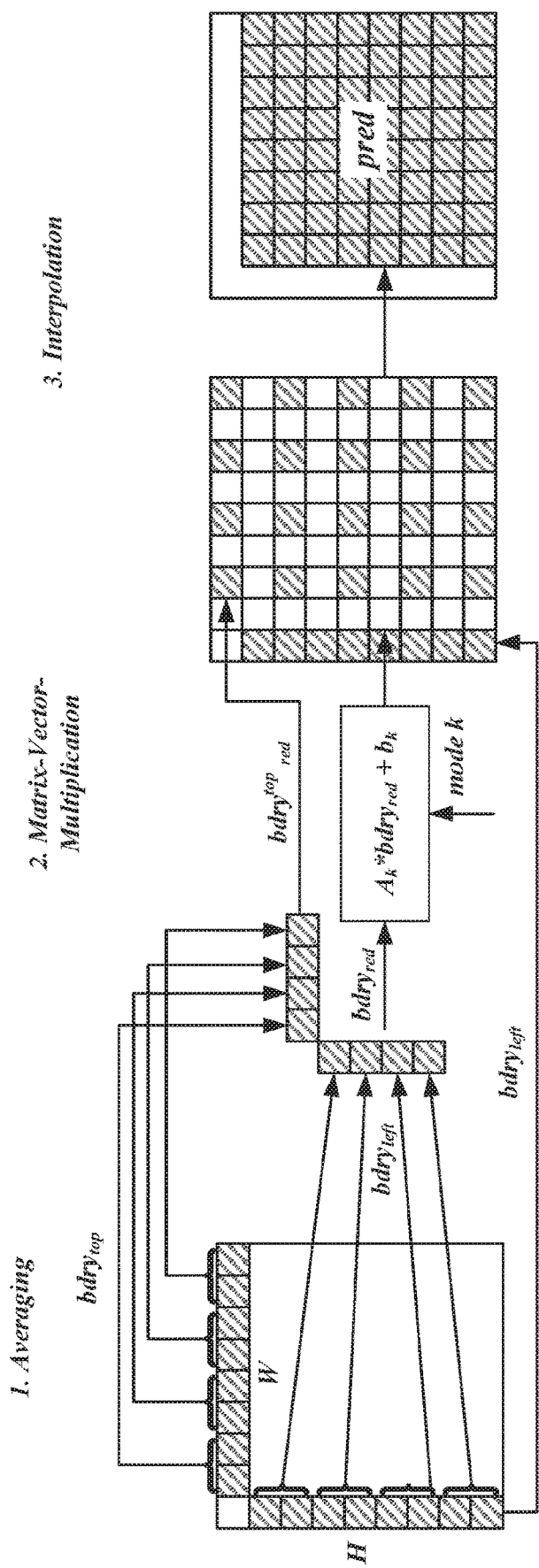
FIG. 7 illustrates an example of a matrix weighted intra prediction process.

FIG. 7 illustrates an example of a matrix weighted intra prediction process. Neighboring samples may be averaged. In an example where W=H=4, eight (8) boundary samples may be extracted by averaging. In other examples, eight boundary samples may be extracted by averaging. The input boundaries $bdry^{top}$ and $bdry^{left}$ may be reduced to smaller boundaries $bdry_{red}^{top}$ and $bdry_{red}^{left}$, for example, by averaging neighboring boundary samples based on the block size. The two reduced boundaries $bdry_{red}^{top}$ and $bdry_{red}^{left}$ may be concatenated to a reduced boundary vector $bdry_{red}$. The reduced boundary vector may be size four, for example, for blocks of shape 4×4, and size eight for blocks of the other shapes. A concatenation may be defined in accordance with Equation (5), for example, if mode refers to the MIP-mode:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6 \end{cases} \quad (5)$$

A matrix vector multiplication (for example, followed by addition of an offset) may be performed with the averaged samples as an input. The result may include a reduced prediction signal on a subsampled set of samples in the original block. A reduced prediction signal $pred_{red}$, (for example, a signal on the down-sampled block of width $W_{red}$ and height $H_{red}$) may be generated out of the reduced input vector $bdry_{red}$. Parameters $W_{red}$ and $H_{red}$ may be defined, for example, in accordance with Equation (6) and Equation (7).

$$W_{red} = \begin{cases} 4 & \text{for } \max(W, H) \leq 8 \\ \min(W, 8) & \text{for } \max(W, H) > 8 \end{cases} \quad (6)$$

$$H_{red} = \begin{cases} 4 & \text{for } \max(W, H) \leq 8 \\ \min(H, 8) & \text{for } \max(W, H) > 8 \end{cases} \quad (7)$$

A reduced prediction signal $pred_{red}$ may be computed, for example, by calculating a matrix vector product and adding an offset, e.g., in accordance with Equation (8):

$$pred_{red} = A \cdot bdry_{red} + b. \quad (8)$$

Matrix A may have $W_{red} \cdot H_{red}$ rows and may have 4 columns if W=H=4 and 8 columns in the other cases. Vector b may be a vector of size $W_{red} \cdot H_{red}$. The matrix A and the offset vector b may be taken from one of the sets $S_0$, $S_1$, $S_2$. Index idx=idx(W, H) may be determined, for example, in accordance with Equation (9):

$$idx(W, H) = \begin{cases} 0 & \text{for } W = H = 4 \\ 1 & \text{for } \max(W, H) = 8 \\ 2 & \text{for } \max(W, H) > 8 \end{cases} \quad (9)$$

Interpolation may be performed to generate a prediction signal at the remaining positions. For example, the prediction signal at the remaining positions may be generated from the prediction signal on the subsampled set by linear interpolation (for example, a single step linear interpolation in each direction). The matrices and offset vectors used for generating the prediction signal may be taken from three sets of matrices $S_0$, $S_1$, $S_2$. In an example, the set $S_0$ may include 18 matrices $A_0^i$, $i \in \{0, \ldots, 17\}$ (for example, each matrix may have 16 rows and 4 columns) and 18 offset vectors $b_0^i$, $i \in \{0, \ldots, 17\}$ (for example, each vector may be of size 16). Matrices and offset vectors of set $S_0$ may be used for blocks of size 4×4. The set $S_1$ may include 10 matrices $A_1^i$, $i \in \{0, \ldots, 9\}$ (for example, each matrix may have 16 rows and 8 columns) and 10 offset vectors $b_1^i$, $i \in \{0, \ldots, 9\}$ (for example, each vector may be of size 16). Matrices and offset vectors of the set $S_1$ may be used for blocks of sizes 4×8, 8×4 and 8×8. The set $S_2$ may include 6 matrices $A_2$, $i \in \{0, \ldots, 5\}$ (for example, each matrix may have 64 rows and 8 columns) and 6 offset vectors $b_2^i$, $i \in \{0, \ldots, 5\}$ (for example, vectors of size 64). Matrices and offset vectors of the set $S_2$ or parts of the matrices and offset vectors may be used for the other block-shapes.

Indication(s) of an MIP mode and a prediction mode may be signaled. In an example (for example, for a coding unit (CU) in intra mode), an indication (for example, a flag indicating if an MIP mode is to be applied on the corresponding prediction unit (PU)) may be signaled. A most probable mode (MPM) indication (for example, an MPM flag) may be signaled, for example, if an MIP is to be applied. The MPM indication may indicate whether prediction mode is one of the MPM modes. Three (3) modes may be considered (for example, in MIP) for MPM. MPM mode may be obtained, for example, context coded with truncated binarization. Non-MPM mode may be obtained (for example, coded) as a fixed length code (FLC). The MPMs may be derived, for example, by performing mode mapping between intra prediction mode and MIP intra prediction mode based on predefined mapping tables and the block size (for example, idx(W, H)∈ {0,1,2}). Forward (for example, a conventional intra prediction mode to MIP mode) and inverse (for example, an MIP mode to conventional intra prediction mode) may be mapped, for example, in accordance with Equation (10) and Equation (11).

$$predmode_{ALWIP} = \text{map\_angular\_to\_} \\ alwip_{idx}[predmode_{Angular}] \quad (10)$$

$$predmode_{Angular} = \text{map\_alwip\_to\_angular}_{idx(PU)}[pred\text{-} \\ mode_{ALWIP}] \quad (11)$$

The number of supported MIP modes may depend on block size. For example, 35 modes may be available for blocks, e.g., where max(W, H)<=8 && W*H<32. For example, 19 and 11 modes may be used, respectively, for max(W, H)=8 and max(W, H)>8. In an example, two modes may be associated with the same matrix and offset vector, for example, in accordance with Equation (12):

$$m = \begin{cases} mode & \text{for } W = H = 4 \text{ and mode} < 18 \\ mode - 17 & \text{for } W = H = 4 \text{ and mode} \geq 18 \\ mode & \text{for } \max(W, H) = 8 \text{ and mode} < 10 \\ mode - 9 & \text{for } \max(W, H) = 8 \text{ and mode} \geq 10 \\ mode & \text{for } \max(W, H) > 8 \text{ and mode} < 6 \\ mode - 5 & \text{for } \max(W, H) > 8 \text{ and mode} \geq 6 \end{cases} \quad (12)$$

Palette mode may be used for screen content coding, for example, where coding blocks may include a small number of distinct colors. Palette mode may be used for 4:4:4 video content. Indices may be signaled (for example, in palette mode) to indicate the color values of sample(s).

A palette table may include a table having representative color values from the CU obtained (for example, coded) using the palette mode. An index into a table (For example, the current table) may be signaled in the bit-stream, for example, for one or more samples in the CU. A video processing apparatus (for example, a decoder) may use a palette table and indices to reconstruct the samples of the CU. An entry in the palette table may include three components (for example, RGB or YCbCr). An escape index may indicate that a sample with color is not represented in the palette table. The quantized values of the component(s) of the escape sample may be included (for example, coded) in the bit-stream.

The size of a palette table may be referred to as the palette size. The indices from zero to a palette size minus one may be used for entries from the palette and the escape index may be set equal to the palette size, for example, if the palette size is non-zero. An example palette coding is illustrated in FIG. 8.

Figure 8:
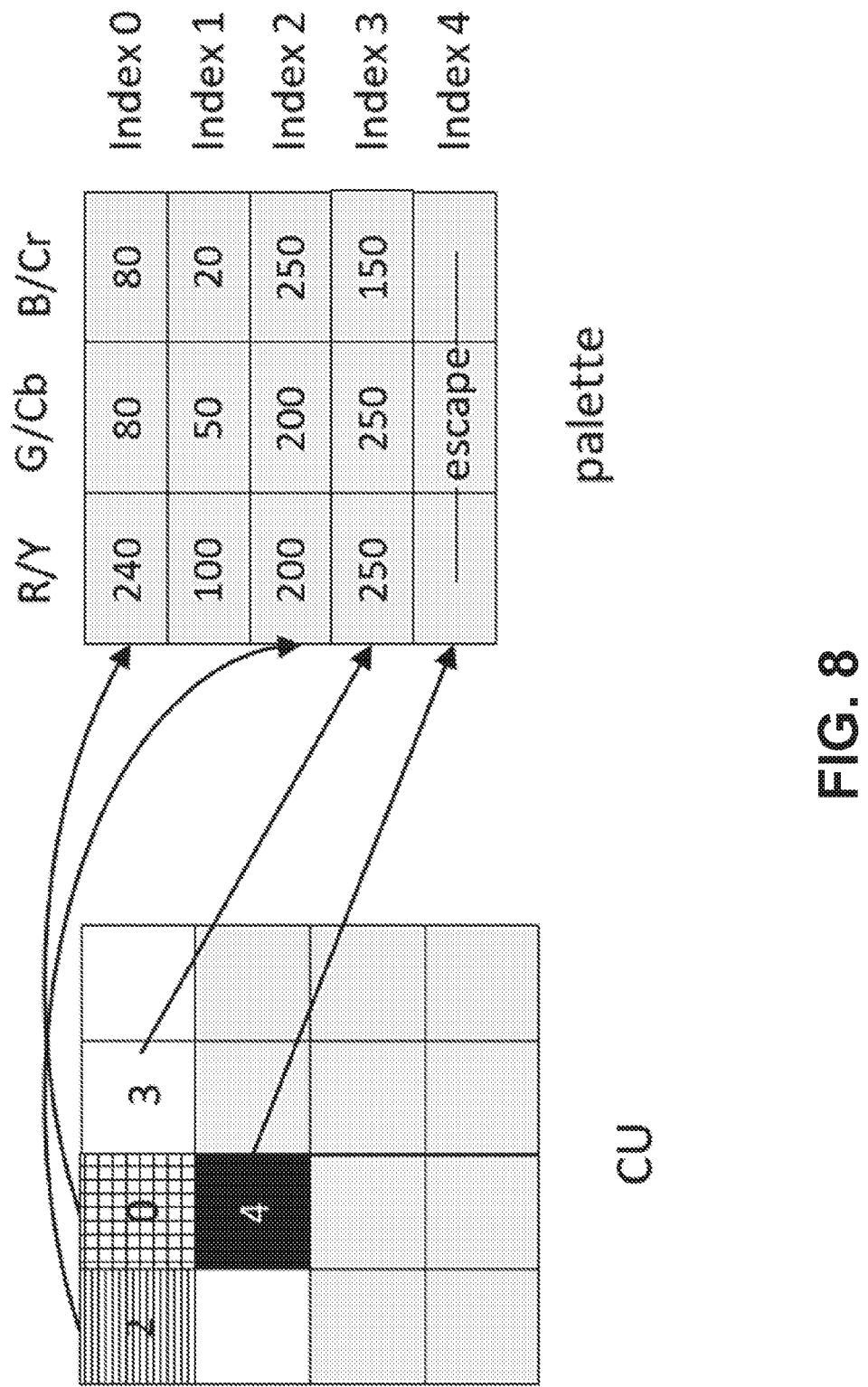
FIG. 8 illustrates an example of palette mode coding with palette size four (4).

FIG. 8 illustrates an example of palette mode coding with palette size four (4). Palette table derivation may be performed, for example, on the encoder side. A palette table may be obtained (for example, coded). The palette indices of the samples in the CU may be obtained (for example, coded).

In an example, CCALF may yield an approximately 1% BD-rate luma coding gain in an example most concerned random access (RA) testing condition, while incurring an approximately 50% computation complexity increase over ALF, for example, where CCALF and ALF are applied to the (for example, all) samples. In an example, ALF may yield an approximately 5% RA coding gain. In an example, LFNST may be used with MIP for large coding blocks (for example, min(width, height)≥16). In an example (for example, for 4:4:4 video content), a palette mode may be used for CUs of the possible CU sizes.

Joint chroma CCALF may be performed, for example, to reduce the complexity of CCALF. For example, a (for example, only one) set of filter coefficients may be used to generate a CCALF filtered output as a refinement signal for a (for example, only one) of the two color components, while a (for example, properly) weighted version of the same chroma refinement signal may be applied to the other color component. The CCALF filtered output signal may be an output of the CCALF filter that is applied to a component, for example, based on the set of filter coefficients. An example LFNST restriction with MIP may be modified (for example, refined). Whether to use a palette mode may be determined, for example, based on a CU size.

An inherent correlation that exists in Cb and Cr components may be exploited in joint chroma residual coding. Inherent correlation may exist between the CCALF output refinement signals of the two chroma components. Correlation is assumed and exploited between the CCALF output refinement signals of the two chroma components, for example, to (for example, significantly) reduce the complexity of CCALF and (for example, thereby) achieve a better trade-off in complexity vs coding efficiency.

Figure 9:
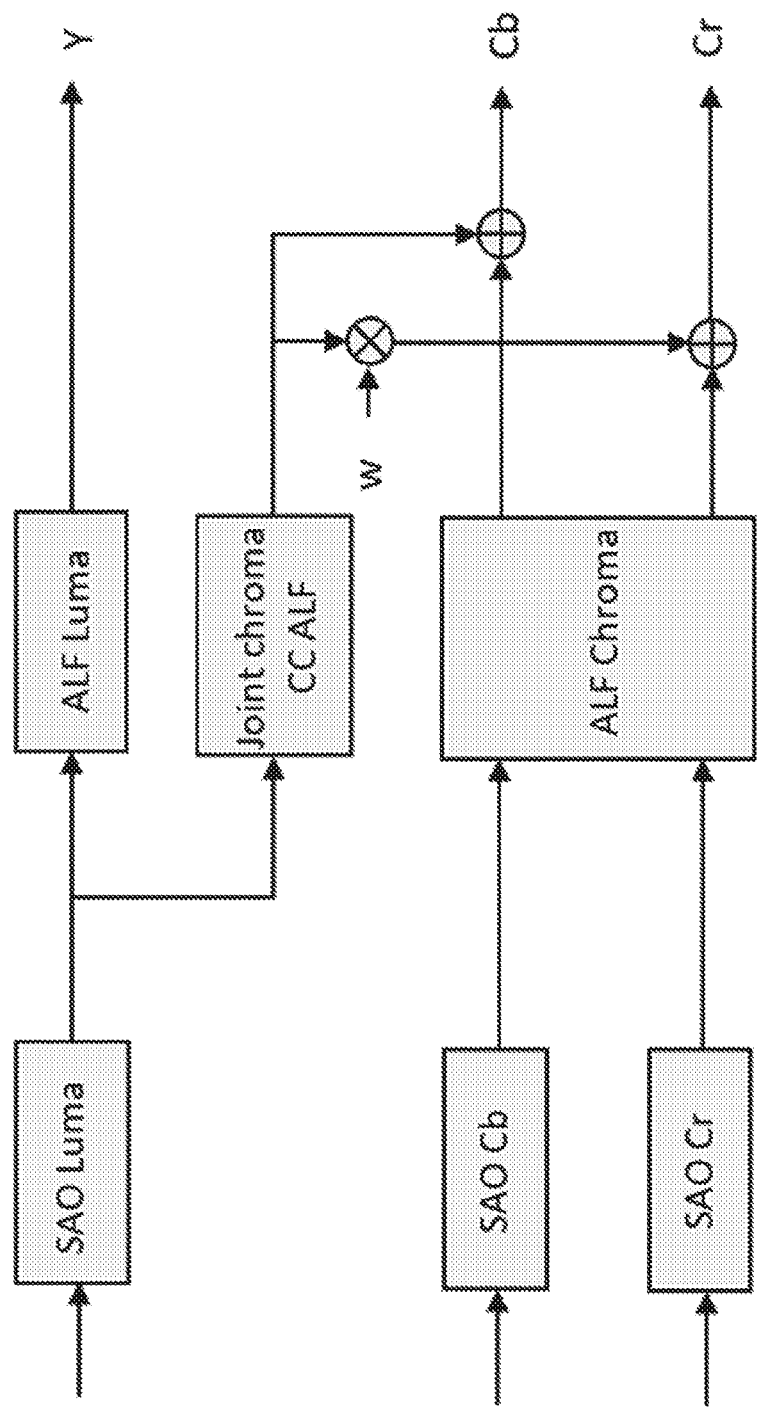
FIG. 9 illustrates an example workflow of joint chroma CCALF.

FIG. 9 illustrates an example workflow of joint chroma CCALF. In some examples, CCALF filtering may be applied, for one of two chroma components, as illustrated in the example CCALF filtering process is in FIG. 9. A refinement signal for the other chroma component may be derived as a (for example, properly) weighted version of the same refinement signal (as the refinement signal for the one of two chroma components).

In some examples, other process(es), such as the on/off control and signaling mechanism of the CCALF filtering for a (for example, each) coding block (for example, of specified block size), may be the same as in CCALF. For example, a set of block-level CCALF on/off indications may be signaled for a (for example, each) chroma component. A video processing apparatus (for example, a decoder) may receive two sets of block-level CCALF on/off flags, for example, one set for the Cb component and one set for the Cr component. A set of block-level CCALF on/off control indications may be signaled (for example, coded or received in the bitstream), for example, to indicate CCALF control information for both chroma components. A set of ALF filter coefficients may be obtained (for example, encoded, decoded), for example, as shown at 2202 of FIG. 22.

A video processing apparatus (for example, an encoder) may train for an optimal set of filter coefficients, for an example CCALF. A (for example, an ideal) target refinement signal may be the residual of a (for example, each) chroma component. An optimization problem for a Cb component may be represented, for example, by Equation (13).

$$\text{Find } tgt\_ccalfCb, s.t.\ \min(orgCb-(tgt\_ccalfCb+alfCb))^2 \quad (13)$$

Parameters tgt_ccalfCb, orgCb, alfCb may represent, respectively, a (for example, an ideal) target CCALF output signal, an original input video signal, and an ALF output signal of a Cb component. The optimal (for example, target) CCALF for a Cb component may be determined, for example, based on the derivative of the squared error of Equation (13), as shown by Equation (14).

$$tgt\_ccalfCb = resCb = orgCb - alfCb \quad (14)$$

The optimal (for example, target) CCALF for a Cr component may be determined, for example, in accordance with (15).

$$tgt\_ccalfCr = resCr = orgCr - alfCr \quad (15)$$

An optimization problem (for example, when using joint chroma CCALF) may be represented, for example, in accordance with Equation (16).

$$\text{Find } tgt\_ccalf, s.t.\ \min[(orgCb-(tgt\_ccalf+alfCb))^2 + (orgCr-(tgt\_ccalf*w+alfCr))^2] \quad (16)$$

Parameter tgt_ccalf may represent the ideal target CCALF output signal. Parameter w may represent the weighting factor. The formula shown in Equation (16) may be solved, for example, by equating its derivative to zero, for example, as shown in Equation (17).

$$-2[orgCb-(tgt_{ccalf}+alfCb)]-2w*[orgCr-(tgt\_ccalf*w+alfCr)]=0 \quad (17)$$

The target CCALF output signal may be determined, for example, by solving Equation (17), and plugging in resCb, resCr from Equation (14) and Equation (15):

$$tgt\_ccalf = (resCb+w*resCr)/(1+w^2) \quad (18)$$

A joint chroma CCALF (JC-CCALF) filter may be derived iteratively. The JC-CCALF filter may be derived, for example, with Equation (18) using the chroma samples. A video processing apparatus (for example, an encoder) may determine whether the previously derived JC-CCALF filter is to be applied for a (for example, each) chroma coding block (for example, 16×16). JC-CCALF may be determined to be applied for the current chroma coding block, for example, if the filtered chroma coding block becomes better (for example, the distortion becomes smaller between filtered chroma coding block and the original signal). The JC-CCALF filter may be derived again with Equation (18) using (for example, only) the chroma samples that the JC-CCALF filter is applied to, for example, after the chroma coding blocks to be JC-CCALF filtered are identified.

In an example, the joint chroma CCALF output refinement signal may be applied (for example, directly) to the Cb component, weighted and applied to the Cr component (for example, as shown in FIG. 9, or otherwise in one or more examples herein). In an example, the joint chroma CCALF output refinement signal may be (for example, directly) applied to the Cr component, weighted and applied to the Cb component. The components Cb and Cr in Equation (18) may be swapped.

In an example, the weighting factor (e.g., the weight) may be of a fixed pre-determined value (e.g. −1, ½, etc.) for multiple (for example, all) pictures in a sequence. The implicit and fixed weight value may be determined, for example, based on the color format of input video signal (e.g., 4:2:0, 4:2:2, 4:4:4, etc.). In an example, the implicit weight value may be determined based on the quantization parameter (QP). The relationship may be defined, for example, via analytic function(s) and/or look-up-table(s) (LUTs).

In an example, the weighting factor may be included (for example, explicitly coded) into the bitstream. The weighting factor may be obtained for a picture or slice, for example, derived and/or coded for each picture or slice. For example, the weighting factor may be signaled in a PPS or in a slice header. The weighting factor may be derived and applied for a group of pictures (e.g., pictures from a same scene). For example, the weighting factor may be signaled in a sequence parameter set (SPS). The weighting factor may be included (for example, coded) along with the other ALF parameters in an adaptation parameter set (APS).

The weight factor may be adapted based on the QPs used to code the blocks, for example, if the weight factor is applied to a (for example, each) block of the specified size for filtering. The adaption function may be defined, for example, via one or more analytic functions and/or one or more LUTs.

The value of the weighting factor may be larger than 1, equal to 1, or less than 1. The value of the weighting factor may be either positive or negative. The value of the weighting factor may be determined based on one or more indications in the bitstream. In an example, the weighting factor may be associated with a flag (for example, coded with one flag) for its sign (for example, "weight_sign") to indicate the sign of the weighting factor (for example, value 0 for positive, and 1 for negative). An indication, such as "weight_isGreaterThanOne," may indicate whether a weighting factor is greater than 1. A fixed length coded weight value index indication, such as "weight_index," may indicate a fixed length coded weight value index in M bits (for example, 0 to (2^M−1)). The resultant maximum weight (for example, denoted as "weight-maxF") value may be 2^M. The weight value may be equal to weight_index/ slice-level (for example, included in the slice header syntax). At the block-level, an index to the set of weight values of the slice may be signaled for (for example, each of) one or more coding blocks, for example, if the filter is to be applied for a block. Signaling of the weight index may be skipped for a block, for example, if the filter is not to be applied for a coding block.

Whether LFNST may be used in conjunction with MIP may be determined, for example, based (for example, at least in part) on the type of the current slice. LFNST may be used in conjunction with MIP, for example, on a condition that the coding block is considered large (for example, min(width, height)≥16) and the current slice is an I-slice. Table 2 shows an example segment of coding unit syntax.

TABLE 2

| example segment of coding unit syntax |
| --- |
| LfnstDcOnly = 1<br>LfnstZeroOutSigCoeffFlag = 1<br>transform_tree( x0, y0, cbWidth, cbHeight, treeType )<br>lfnstWidth = ( treeType = = DUAL_TREE_CHROMA ) ? cbWidth / SubWidthC<br>   : cbWidth<br>lfnstHeight = ( treeType = = DUAL_TREE_CHROMA ) ? cbHeight / SubHeightC<br>   : cbHeight<br>if( Min( lfnstWidth, lfnstHeight ) >= 4 && sps_lfnst_enabled_flag = = 1 &&<br>   CuPredMode[ chType ][ x0 ][ y0 ] = = MODE_INTRA &&<br>   IntraSubPartitionsSplitType = = ISP_NO_SPLIT && ( !intra_mip_flag[ x0 ][ y0 ]<br>   \| \| (Min( lfnstWidth, lfnstHeight ) >= 16 && slice_type = = I ) ) &&<br>   tu_mts_idx[ x0 ][ y0 ] = = 0 && Max( cbWidth, cbHeight ) <= MaxTbSizeY) {<br>   if( LfnstDcOnly = = 0 && LfnstZeroOutSigCoeffFlag = = 1 )<br>     lfnst_idx[ x0 ] [ y0 ]<br>} | weight_max, for example, if weight_index is not equal to 0. The weight value may be determined to be equal to 1, for example, if weight_index is equal to 0. The weight_index derived weight value may represent the inverse of the actual weight value and the actual weight value may be calculated based on weight-max/weight_index, for example, if an indication (for example, weight_isGreaterThanOne) indicates that the weighting factor is greater than 1. The actual weight may be calculated as a negative value with the earlier derived weight value as the magnitude, for example, if an indication (for example, weight_sign) indicates that the weighting factor is negative. The weighting factor may be calculated as a positive value of the earlier derived value as the magnitude, for example, if otherwise.

In examples, the weight values used for filtering at the coding blocks may be different. The weight values may be determined at a block level. In some examples, a set of weight values may be included (for example, coded) at the In an example, MIP may have different modes. LFNST may (for example, only) be combined with certain MIP modes. For example, LFNST may be disabled, and signaling of lfnst_idx[x0][y0] may be skipped, for one or more MIP models (for example, MIP modes that are close to horizontal or vertical intra prediction direction).

Whether to use palette mode may be determined, for example, based on the block size. For example, palette mode may be disabled for small block sizes in inter slices. A block may be considered small, for example, if the block's size in samples is less than a certain value (for example, a certain threshold value).

In an example, an implicit and fixed CU size threshold may be used (e.g., 32, 64, etc.). Palette mode may not be used to code a block, for example, if the block is in an inter slice and the block's size is less than or equal to the limit. Table 3 shows an example segment of coding unit syntax where the palette mode CU size threshold is 32 samples.

TABLE 3

| example segment of coding unit syntax |
| --- |
| if( ( ( ( slice_type = = I \| \| ( cbWidth = = 4 && cbHeight = = 4 ) \| \| sps_ibc_enabled_flag )<br>&&<br>            CuPredMode[ x0 ][ y0 ] = = MODE_INTRA ) \| \|<br>     ( slice_type != I && !( cbWidth = = 4 && cbHeight = = 4 ) &&<br>!sps_ibc_enabled_flag<br>       && CuPredMode[ x0 ][ y0 ] != MODE_INTRA ) ) && sps_palette_enabled_flag &&<br>    cbWidth <= 64 && cbHeight <= 64 && cu_skip_flag[ x0 ][ y0 ] = = 0 && |

TABLE 3-continued example segment of coding unit syntax modeType != MODE_INTER && ! ( slice_type != I && cbWidth * cbHeight <= 32 ) )
   pred_mode_plt_flag In an example, a CU size threshold may be included (for example, explicitly coded) into the bitstream. For example, the palette mode CU size threshold may be signaled in a slice header, a PPS, an SPS, and/or the like.

Cross-component adaptive loop filtering (CCALF) may be applied (for example, once) for one chroma component and the refinement signal may be derived for the other chroma component as a weighted version of the refinement signal, for example, to reduce complexity.

In an example, a video processing apparatus (for example, a decoder) may be configured to receive a cross-component filter, and a video signal comprising a luma component, a first chroma component and a second chroma component. The video processing apparatus may be configured to apply the cross-component filter to the luma component of the video signal to determine a first chroma offset associated with the first chroma component. The video processing apparatus may be configured to calculate, based on the first chroma offset and a weighting factor, a second chroma offset associated with the second chroma component. The video processing apparatus may be configured to refine the first chroma component using the first chroma offset and the second chroma component using the second chroma offse.

In video coding, a reconstructed video picture or frame may be filtered to reduce or remove coding artifacts, such as blockiness, ringing, etc. Video frame filtering (VFF) may be in-loop filtering, for example, where a filtered signal may be used again as a prediction reference picture for the following pictures. VFF may be post-processing filtering, for example, where a filtered signal may be used for final playout, but may not be used as prediction reference picture for the subsequent pictures.

In-loop filtering may improve subjective quality of reconstructed video frames and may improve coding efficiency for the subsequent frame coding. Post-processing filtering may improve the subjective quality of the reconstructed frames.

Video frame filters may include, for example, a deblocking filter, a sample adaptive offset (SAO), an adaptive loop filter (ALF), a cross-component ALF (CCALF), etc. A bilateral filter and/or a Hadamard filter may be used, for example, for in-loop or post-processing filtering.

In-loop filters such as deblocking filter, SAO and ALF may be applied. An example order of a filtering process may be a deblocking filter, SAO and ALF.

In an example, an SAO and a deblocking filtering may be implemented for video frame filtering. Luma mapping with chroma scaling (for example, also known as an adaptive in-loop reshaper) may be performed (for example, for video frame filtering). In some examples, luma mapping with chroma scaling may be performed before deblocking.

Spatial prediction may reduce spatial redundancy inherent in a video signal. Temporal prediction (also referred to as "inter prediction" or "motion compensated prediction") may use pixels from already obtained (for example, coded) video pictures to predict a video block. The video block may be the current video block. Temporal prediction may reduce temporal redundancy inherent in a video signal. A temporal prediction signal for a given video block may be signaled by one or more motion vectors (MVs), which may indicate the amount and/or the direction of motion between a block (for example, the current block) and its reference block.

An ALF with block-based filter adaption may be applied. In an example (for example, for the luma component), a filter among a plurality of filters (for example, 25 filters) may be selected for a (for example, each) 4×4 block, for example, based on the direction and activity of local gradients.

Figures 10A, 10B:
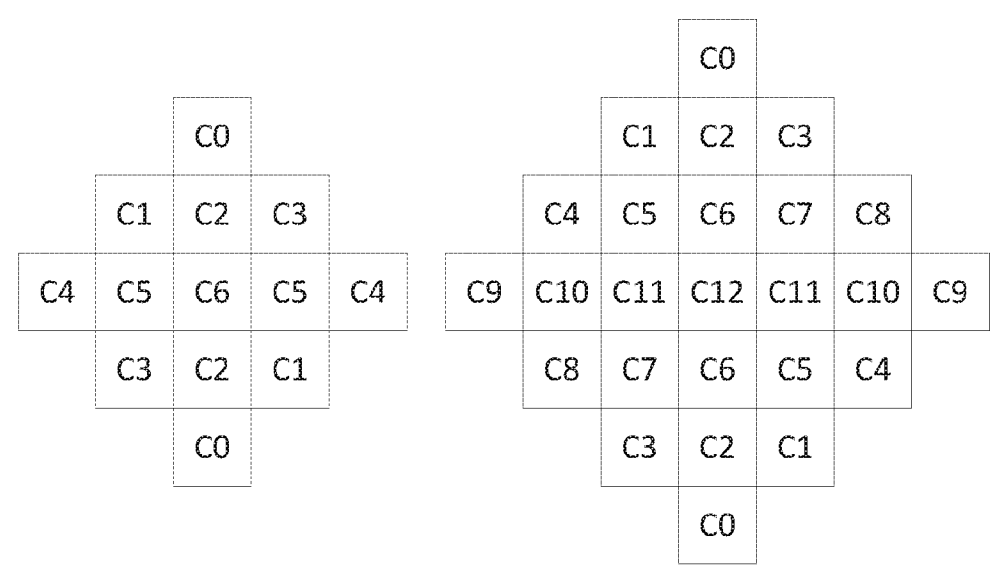

FIGS. 10A and 10B illustrate examples of adaptive loop filter (ALF) shapes. FIGS. 10A and 10B show two diamond filter shapes (for example, chroma: 5×5 diamond, luma: 7×7 diamond) that may be used as ALFs. In examples, the 7×7 diamond shape may be applied for a luma component and the 5×5 diamond shape may be applied for chroma components.

Block classification may be performed on the luma components of a (for example, each) 4×4 block, for example, to categorize the block into a class (for example, one out of 25 classes). A classification index C may be derived, for example, based on its directionality D and a quantized value of activity $\hat{A}$, for example, in accordance with Equation (19).

$$C = 5D + \hat{A} \tag{19}$$

Parameters D and $\hat{A}$ in Equation 1 may be calculated, for example, based on horizontal, vertical and two diagonal direction gradients, which may be calculated using a one dimensional (1-D) Laplacian calculation, for example, in accordance with Equations (20)-(23).

$$g_v = \sum_{k=i-2}^{i+3} \sum_{l=j-2}^{j+3} V_{k,l}, \ V_{k,l} = |2R(k,l) - R(k,l-1) - R(k,l+1)| \tag{20}$$

$$g_h = \sum_{k=i-2}^{i+3} \sum_{l=j-2}^{j+3} H_{k,l}, \ H_{k,l} = |2R(k,l) - R(k-1,l) - R(k+1,l)| \tag{21}$$

$$g_{d0} = \sum_{k=i-2}^{i+3} \sum_{l=j-3}^{j+3} D1_{k,l}, \tag{22}$$

$$D1_{k,l} = |2R(k,l) - R(k-1,l-1) - R(k+1,l+1)|$$

$$g_{d1} = \sum_{k=i-2}^{i+3} \sum_{j=j-2}^{j+3} D2_{k,l}, \tag{23}$$

$$D2_{k,l} = |2R(k,l) - R(k-1,l+1) - R(k+1,l-1)|$$

The gradients in horizontal, vertical and two diagonal directions may be referred to as directional gradients. Indices i and j may refer to the coordinates of the upper left sample (for example, a 2×2 reconstructed block) of the 4×4 block, and R(i,j) may indicate a reconstructed sample at coordinate (i,j).

A subsampled 1-D Laplacian calculation may be applied, for example, to reduce the complexity of block classification.

Figures 11A, 11B, 11C, 11D:
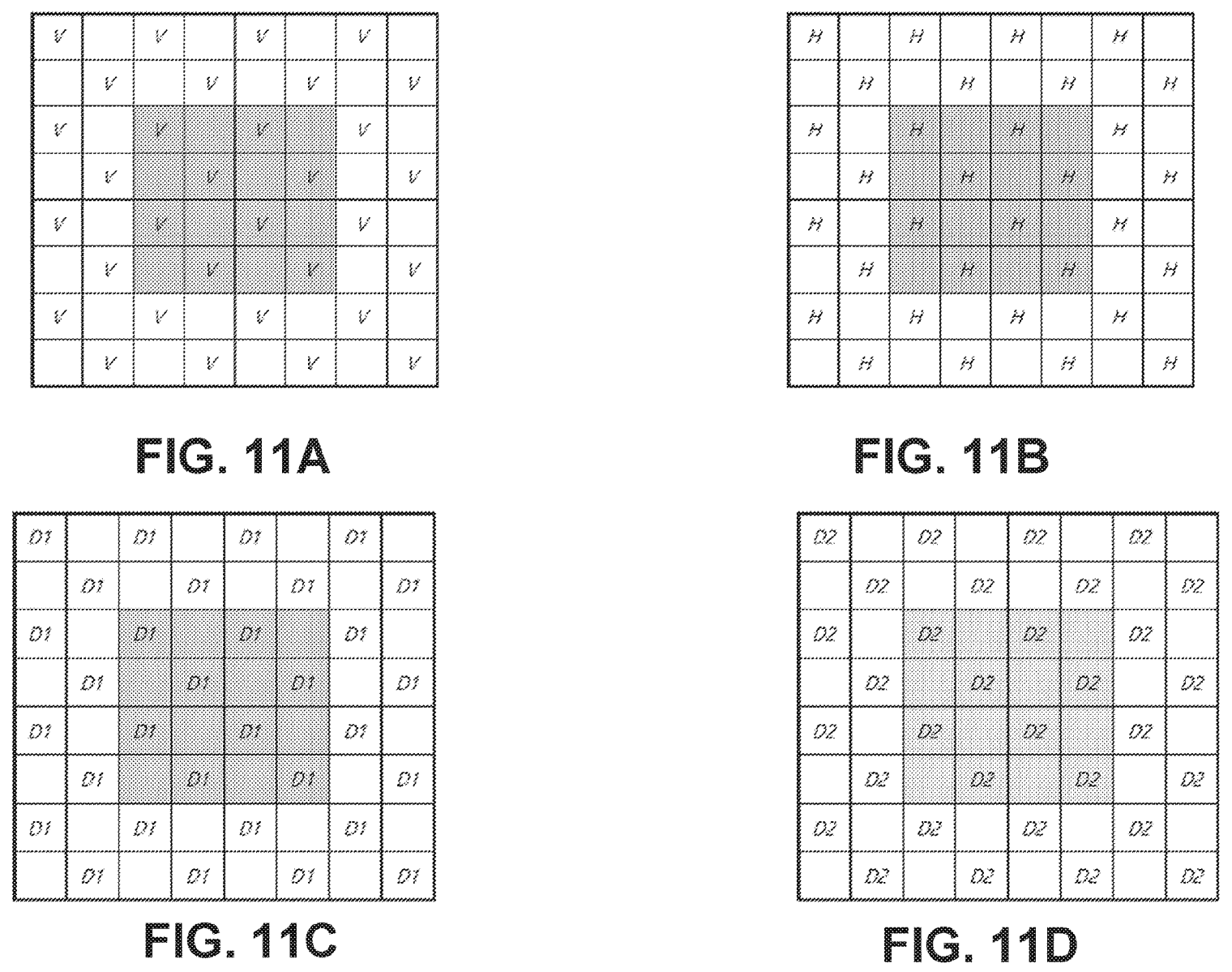

FIGS. 11A-11O illustrate examples of subsampled Laplacian calculations. FIG. 11A is a diagram illustrating subsampled positions for a vertical gradient. FIG. 11B is a diagram illustrating subsampled positions for a horizontal gradient FIG. 11C is a diagram illustrating subsampled positions for a diagonal gradient in a first direction. FIG. 11D is a diagram illustrating subsampled positions for a diagonal gradient in a second direction. Referring to FIGS. 11A-D, the same subsampled positions may be used for gradient calculation of multiple (for example, all) directions.

The maximum and minimum values of the gradients of horizontal and vertical directions may be set, for example, in accordance with Equation (24).

$$g_{h,v}^{max}=\max(g_h,g_v),\ g_{h,v}^{min}=\min(g_h,g_v) \quad (24)$$

The maximum and minimum values of the gradient of two diagonal directions may be set, for example, in accordance with Equation (25).

$$g_{d0,d1}^{max}=\max(g_{d0},g_{d1}),\ g_{d0,d1}^{min}=\min(g_{d0},g_{d1}) \quad (25)$$

The value of directionality D may be derived, for example, by comparing the above values (for example, for Equation (24) and Equation (25)) to each other, and with two thresholds $t_1$ and $t_2$, for example, in one or more of the following operations 1-4:

Operation 1: If both $g_{h,v}^{max} \leq t_1 \cdot g_{h,v}^{min}$ and $g_{d0,d1}^{max} \leq t_1 \cdot g_{d0,d1}^{min}$ are true, D may be set to 0.

Operation 2: If $g_{h,v}^{max}/g_{h,v}^{min} > g_{d0,d1}^{max}/g_{d0,d1}^{min}$, continue from Operation 3; otherwise continue from Operation 4.

Operation 3: If $g_{h,v}^{max} > t_2 \cdot g_{h,v}^{min}$, D may be set to 2; otherwise D may be set to 1.

Operation 4: If $g_{d0,d1}^{max} > t_2 \cdot g_{d0,d1}^{min}$, D may be set to 4; otherwise D may be set to 3.

The activity value A may be calculated, for example, in accordance with Equation (26).

$$A = \sum_{k=i-2}^{i+3} \sum_{l=j-2}^{j+3} (V_{k,l} + H_{k,l}) \quad (26)$$

Activity value A may be quantized, for example, the range of 0 to 4 (for example, inclusively). The quantized value may be denoted as Â. A classification operation may not be applied for chroma components in a picture. For example, a single set of ALF coefficients may be applied for a (for example, each) chroma componen.

One or more geometric transformations (for example, rotation or diagonal and vertical flipping) may be applied to the filter coefficients $f(k,l)$ and/or to the corresponding filter clipping values $c(k,l)$, for example, before filtering a (for example, 4×4) luma block. Application of geometric transformations may depend on gradient values calculated for the luma block. Geometric transformations may be equivalent to applying the transformations to the samples in the filter support region, for example, to make different blocks to which ALF is applied more similar by aligning their directionality. The directionality of the blocks to which ALF may be applied may be aligned.

Geometric transformations (for example, including diagonal, vertical flip and/or rotation) may be used, for example, in accordance with Equations (27)-(29).

Diagonal: $f_D(k,l)=f(l,k), c_D(k,l)=c(l,k),$ \quad (27)

Vertical flip: $f_V(k,l)=f(k,K-l-1),\ c_V(k,l)=c(k,K-l-1)$ \quad (28)

Rotation: $f_R(k,l)=f(K-l-1,k),\ c_R(k,l)=c(K-l-1,k)$ \quad (29)

Parameter K may be the size of the filter, and $0 \leq k, l \leq K-1$ may be coefficient coordinates, for example, so that location (0,0) may be at the upper left corner and location (K-1,K-1) may be at the lower right corner. Transformations may be applied to the filter coefficients $f(k,l)$ and/or to the dipping values $c(k,l)$, for example, based on gradient values calculated for the block. An example relationship between the transformation and the four gradients of the four directions may be summarized, for example, in accordance with Table 4:

TABLE 4 example mapping of the gradient calculated for one block and the transformations

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

ALF parameters may be signaled in an adaptation parameter set (APS). In an example of an APS, one or more sets (for example, up to 25 sets) of luma filter coefficients and clipping value indexes, and/or one or more sets (for example, up to one set) of chroma filter coefficients and clipping value indexes may be signaled. Filter coefficients of different classifications may be merged, for example, to reduce bit overhead. Indices of the APSs used for the current slice may be signaled, for example, in a slice header.

Clipping value indexes, which may be obtained (for example, decoded) from the APS, may be used to determine clipping values using a luma (L) table of clipping values and a chroma (C) table of dipping values. The dipping values may be dependent on the internal bit depth. The luma table of dipping values and chroma table of clipping values may be obtained, for example, in accordance with Equations (30)-(32).

$$AlfClip_L = \left\{\text{round}\left(2^{B\frac{N-n+1}{N}}\right) \text{ for } n \in [1 \ldots N]\right\} \quad (30)$$

$$AlfClip_C = \left\{\text{round}\left(2^{(B-8)+8\frac{(N-n)}{N-1}}\right) \text{ for } n \in [1 \ldots N]\right\} \quad (31)$$

$$AlfClip = \left\{\text{round}\left(2^{B-\alpha*n}\right) \text{ for } n \in [0 \ldots N-1]\right\} \quad (32)$$

AlfClip may be a clipping value, parameter B may indicate the internal bitdepth or the bit depth of input samples for ALF, α may be a pre-defined constant value (for example, equal to 2.35), and parameter N may be a pre-defined constant value (for example, equal to 4), which may represent the number of allowed dipping values.

The filtering process may be controlled at the coding tree block (CTB) level. A flag may be signaled to indicate whether ALF may be applied to a luma CTB. A luma CTB may choose a filter set among filter sets (for example, 16 fixed filter sets) and the filter sets signaled in APS's. A filter set index may be signaled for a luma CTB to indicate which filter set may be applied. The fixed filter sets (for example, 16 fixed filter sets) may be pre-defined and hard-coded in the encoder and/or the decoder.

The filter coefficients may be quantized with a norm equal to a predetermined value (for example, 128). A bitstream conformance may be applied, for example, so that the coefficient value of the non-central position is in the range of $-2^7$ to $2^7-1$ (for example, inclusive of the boundary values), for example, to reduce multiplication complexity. The central position coefficient may not be signaled (for example, signalling may be skipped) in the bitstream, and the central position coefficient may be considered equal to the norm (for example, 128).

A sample R(i,j) within the CU may be filtered, for example, at the decoder side. A (for example, each) sample R(i,j) within the CU may be filtered (for example, if ALF is enabled for a CTB), which may result in sample value R'(i,j), for example, in accordance with Equation (33).

$$R'(i,j)=R(i,j)+((\Sigma_{k\neq 0}\Sigma_{l\neq 0}f(k,l)\times K(R(i+k,j+l)-R(i,j),c(k,l))+64)>>7) \quad (33)$$

where, for example, f(k,l) may indicate the obtained (for example, decoded) filter coefficients, K(x,y) may indicate the clipping function and c(k,l) may indicate the obtained (for example, decoded) clipping parameters. The variable k and l may vary between $$-\frac{L}{2} \text{ and } \frac{L}{2},$$

where L may represent the filter length. The clipping function K(x,y)=min (y,max(−y,x)) may correspond to the function Clip3(−y,y,x).

Figure 12:
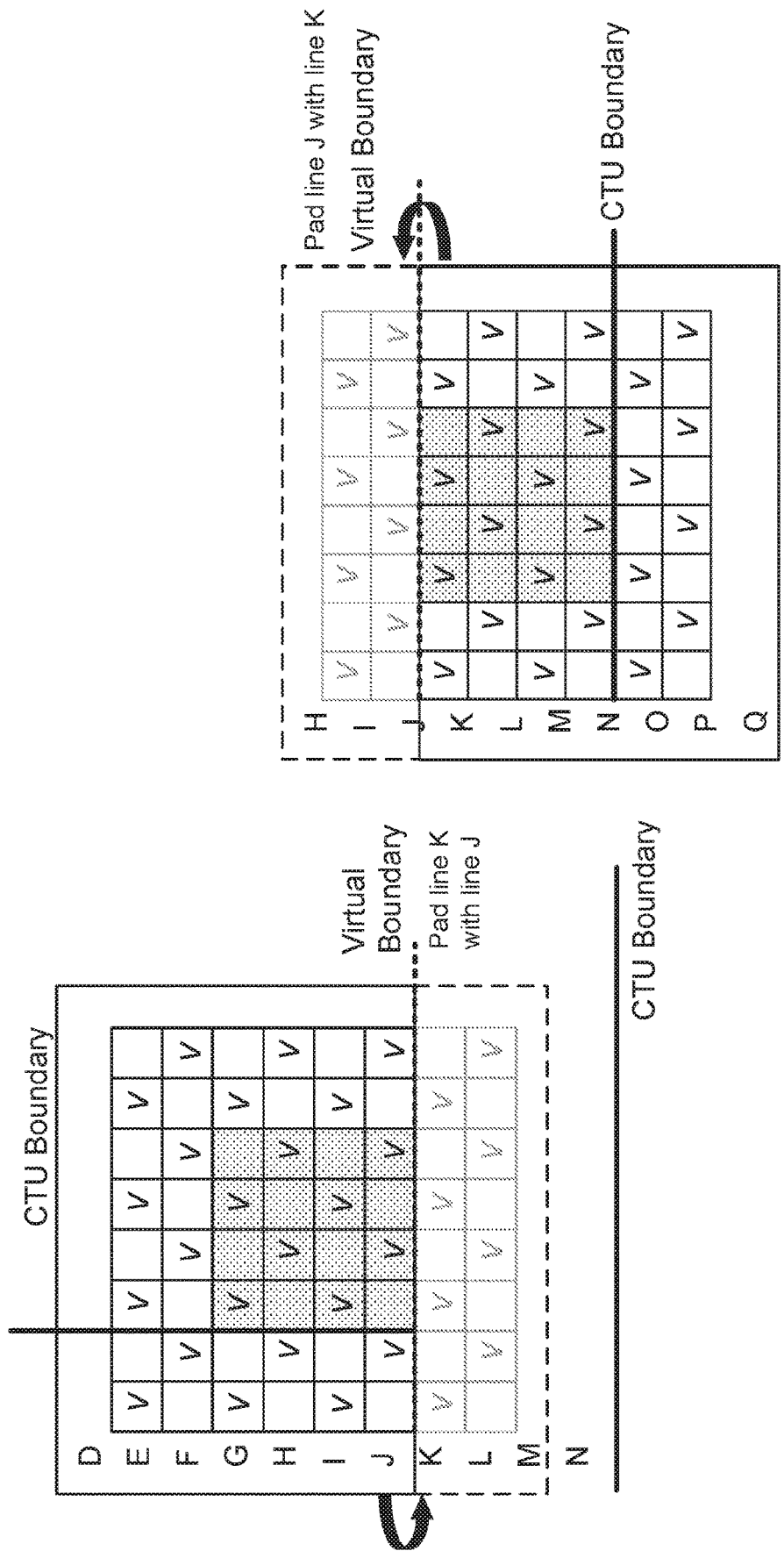
FIG. 12 is a diagram illustrating a block classification (for example, a modified block classification) at virtual boundaries.

FIG. 12 is a diagram illustrating a block classification (for example, a modified block classification) at virtual boundaries. Modified block classification and filtering may be performed for the samples near horizontal CTU boundaries, for example, to reduce the line buffer requirement of ALF. A virtual boundary may be identified, for example, by shifting the horizontal CTU boundary by "N" samples (for example, as shown by example in FIG. 12). N may be equal to 4 for the luma component and 2 for the chroma component.

Modified block classification may be applied for the luma component (for example, as shown by example in FIG. 12). The 1D Laplacian gradient calculation of the 4×4 block above the virtual boundary may use (for example, only) the samples above the virtual boundary. The 1D Laplacian gradient calculation of the 4×4 block below the virtual boundary may use (for example, only) the samples below the virtual boundary. The quantization of activity value A may be scaled, for example, by taking into account the reduced number of samples used in the 1D Laplacian gradient calculation.

Figure 13:
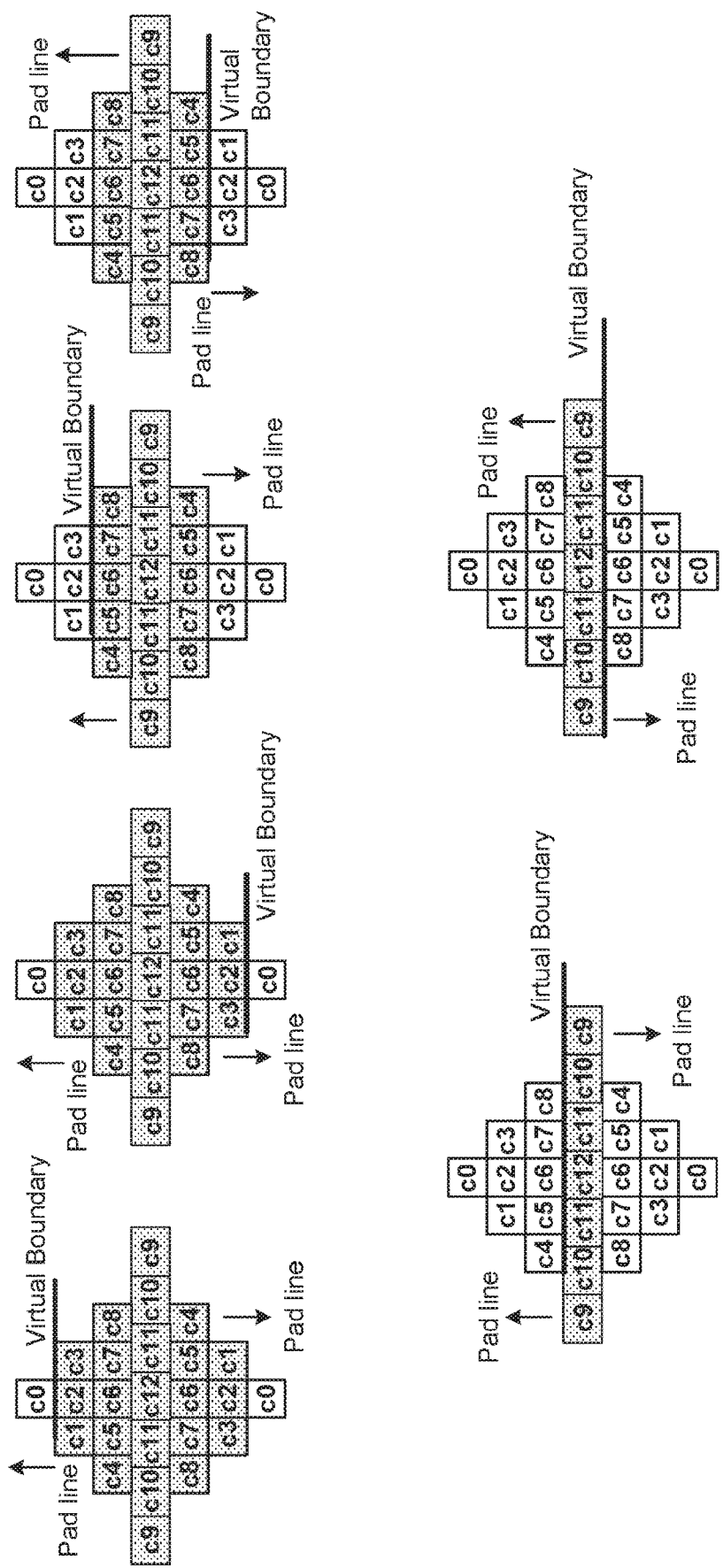
FIG. 13 is a diagram illustrating an ALF filtering (for example, a modified ALF filtering) for the luma component at virtual boundaries.

FIG. 13 is a diagram illustrating an ALF filtering (for example, a modified ALF filtering) for the luma component at virtual boundaries. Symmetric padding at the virtual boundaries may be performed for luma and/or chroma components. The neighboring samples located above the virtual boundary may be padded and the corresponding samples at the other sides may be padded (for example, symmetrically), for example, if the sample being filtered is located below the virtual boundary (for example, as shown by example in FIG. 13).

A deblocking filter may be applied to samples adjacent to a prediction unit (PU) or a transform unit (TU) boundary except when the boundary is also a picture boundary, or when deblocking is disabled across slice or tile boundaries (which may be an option that can be signaled by a video processing apparatus (for example, the encoder)). PU and TU boundaries may be considered, for example, if PU boundaries are not always aligned with TU boundaries for inter picture-predicted coding blocks (CBs). Syntax elements in the sequence parameter set (SPS) and slice headers may indicate whether the deblocking filter may be applied across the slice and tile boundaries.

A deblocking filter may be applied, for example, on a 4×4 sample grid basis. A deblocking filter may be applied (for example, only) to the edges that may be aligned on an 8×8 sample grid, e.g., for the luma and chroma samples, which may reduce the worst-case computational complexity without noticeable degradation of the visual quality. A parallel-processing operation may be improved, for example, by preventing cascading interactions between nearby filtering operations.

The strength of a deblocking filter may be controlled by the values of one or more syntax elements. In some examples, three strengths may be used. A certain filter strength (for example, filter strength of two (2)) may be assigned if one of the blocks is intra-picture predicted, for example, given that P and Q may be two adjacent blocks with a common 8×8 grid boundary. Otherwise (for example, if the blocks are not intra-picture predicted), a certain filter strength (for example, filter strength of 1) may be assigned, for example, if any of the following conditions is satisfied: P or Q has at least one nonzero transform coefficient; the reference indices of P and Q are not equal; the motion vectors of P and Q are not equal; and/or the difference between a motion vector component of P and Q is greater than or equal to an (for example, one) integer sample. A certain filter strength (for example, filter strength of 0) may be assigned (for example, indicating the deblocking process may be skipped), for example, if none of the conditions herein is met.

Multiple (for example, two) thresholds (for example, tC and β), may be determined from predefined tables, for example, according to the filter strength and the average quantization parameter of P and Q. A determination whether to apply no filtering, strong filtering, or weak filtering for luma samples may be based on a threshold (for example, β). The determination may be applied, for example, across four luma rows or columns, e.g., using the first and the last rows or columns. A determination whether to apply no filtering or normal filtering for chroma samples may be based on one or more thresholds. Normal filtering may be applied, for example, if the filter strength is greater than one. The filtering process may be performed, for example, using the control variables tC and β.

A processing order of a deblocking filter may include, for example, horizontal filtering for vertical edges for the (for example, entire) picture first, followed by vertical filtering for horizontal edges. A processing order may enable multiple horizontal filtering or vertical filtering processes to be applied in parallel threads. A processing order may enable multiple horizontal filtering or vertical filtering processes to be implemented on a CTB-by-CTB basis, for example, with a small processing latency.

An SAO may modify obtained (for example, decoded) samples, for example, by conditionally adding an offset value to one or more samples after application of a deblocking filter based on values in look-up tables (LUTs). The LUTs may be transmitted by a video processing apparatus (for example, the encoder). SAO filtering may be performed on a regional basis, for example, based on a filtering type selected per CTB by a syntax element (for example, sao-type-idx). In some examples, a value of zero (0) for the syntax element (for example, sao-type-idx) may indicate that the SAO filter is skipped for the CTB, and the values 1 and 2 may indicate, respectively, the use of the band offset and edge offset filtering types.

A band offset mode may be indicated or specified by a value (for example, 1) of a syntax element (for example, sao-type-idx). A selected offset value may be determined, for example, based on the sample amplitude. A band offset mode may have a full sample amplitude range, which may be (for example, uniformly) split into 32 segments (for example, bands). Sample values belonging to multiple bands (for example, four consecutive bands of the 32 bands) may be modified, for example, by adding transmitted values denoted as band offsets. Band offsets may be positive or negative. Consecutive bands (for example, 4 consecutive bands) may be used, for example, when sample amplitudes in a CTB tend to be concentrated in a few bands in smooth areas where banding artifacts can appear. The number of offsets (for example, 4 offsets) may be determined, for example, to be unified with an edge offset mode of operation. The number of offset values used in an edge offset mode of operation may be four.

An edge offset mode may be indicated or specified by a value (for example, 2) of a syntax element (for example, sao-type-idx). A syntax element (for example, sao-eo-class) may have values (for example, from 0 to 3) that indicate whether a horizontal, vertical or one of two diagonal gradient directions may be used for the edge offset classification in the CTB.

Figure 14:
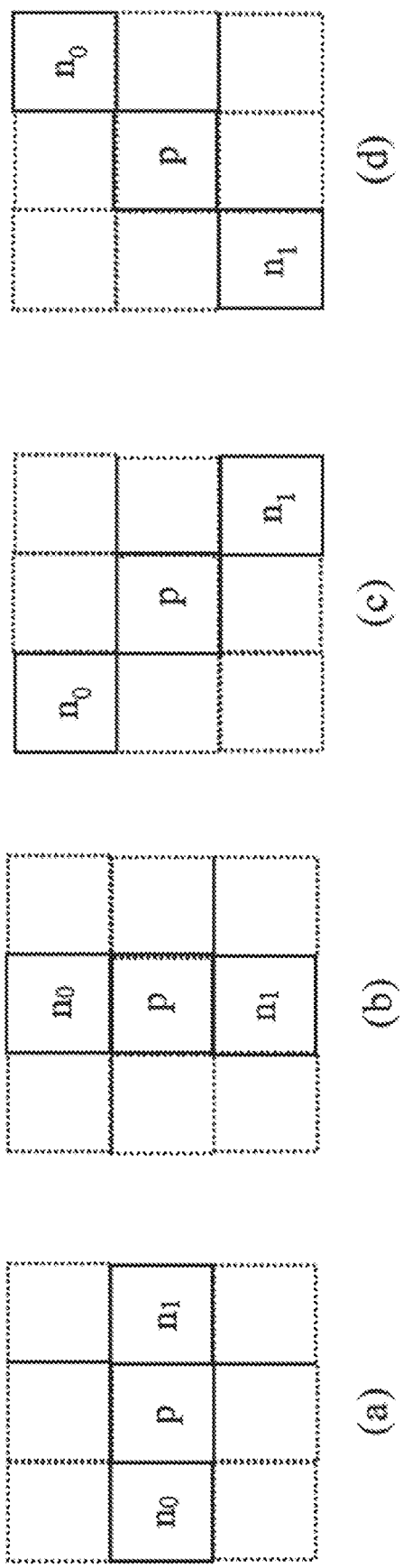
FIG. 14 illustrates four example gradient patterns used in sample adaptive offset (SAO).

FIG. 14 illustrates four example gradient patterns used in sample adaptive offset (SAO). FIG. 14 depicts four gradient patterns used for a respective sao-eo-class in edge offset mode. As shown by examples in FIG. 14, a sample labeled "p" may indicate a center sample to be considered. Two samples labeled "n0" and "n1" may specify two neighboring samples, for example, along the (a) horizontal (sao-eo-dass=0), (b) vertical (sao-eo-dass=1), (c) 135° diagonal (sao-eo-class=2), and (d) 45° (sao-eo-class=3) gradient patterns.

Samples in the CTB may be classified into one of the EdgeIdx categories, for example, by comparing the sample value p located at some position with the values n0 and n1 of two samples located at neighboring positions (for example, as shown in Table 5). Table 5 shows an example of EdgeIdx categories in SAO edge classes. Classification may be performed based on obtained (for example, decoded) sample values. An offset value from a transmitted look-up table may be added to the sample value, for example, depending on the EdgeIdx category at the sample position, e.g., for EdgeIdx categories from 1 to 4. The offset values may be positive for categories 1 and 2 and negative for categories 3 and 4. The filter may have a smoothing effect in the edge offset mode.

TABLE 5 example of edgeIdx categories in SAO edge classes

| EdgeIdx | Condition | Meaning |
|---|---|---|
| 0 | Cases not listed below | Monotonic area |
| 1 | p < n0 and p < n1 | Local min |
| 2 | p < n0 and p = n1 or p < n1 and p = n0 | Edge |
| 3 | p > n0 and p = n1 or p > n1 and p = n0 | Edge |
| 4 | p > n0 and p > n1 | Local max |

Multiple (for example, a total of four) amplitude offset values may be transmitted to a video processing apparatus for a (for example, each) CTB, for example, for SAO types 1 and 2. The video processing apparatus may include, for example, the decoder. The sign may be obtained (for example, encoded) for type 1. The offset values and related syntax elements (for example, sao-type-idx and sao-eo-class) may be determined by a video processing apparatus (for example, the encoder). The offset values and related syntax elements may be determined, for example, using criteria that optimize rate-distortion performance. The SAO parameters may be indicated to be inherited from the left or above CTB, for example, using a merge flag to make the signaling efficient. SAO may be a nonlinear filtering operation that may allow additional refinement of the reconstructed signal. SAO may enhance the signal representation in smooth areas and around edges.

Joint chroma CCALF may be applied, for example, as shown in FIG. 9. A (for example, one) set of filter coefficients may be obtained for a coding block and/or used (for example, applied to a first component associated with a sample in the coding block) to generate a filtered output, for example, as a refinement signal for a color component (for example, a second component) to modify the color component (value). The filter may include a CCALF filter, and the filtered output may include a CCALF filtered output. As shown in FIG. 9, the first component may be a luma component. As shown in FIG. 9, the second component may be a chroma components. The luma component and the chroma components may be associated with the sample in the coding block. As shown in FIG. 9, the filtered output signal may be an output of the filter that is applied to the first component, for example, based on the set of filter coefficients. As shown in FIG. 9, a (for example, properly) weighted version of the filtered output (for example, the same refinement signal for the second component) may be applied to the other color component (for example, a third component) to modify the other color component (value). The third component may be a chroma component associated with the sample in the coding block. CCALF filtering may be applied to one of the two chroma components, for example, the second component. The refinement signal for the other chroma component (for example, the third component) may be derived as a (for example, properly) weighted version of the filtered output (for example, the same refinement signal), for example, as shown in FIG. 9. In an example, the output of the joint chroma CCALF (for example, the output refinement signal) may be applied to the Cb component (value) to modify the Cb component (value), weighted using an obtained weighting factor, and applied to the Cr component (value), for example, to modify the Cr component (value). In an example, the output of the joint chroma CCALF (for example, the output refinement signal) may be applied to the Cr component (value) to modify the Cr component (value), then weighted and applied to the Cb component (value), for example, to modify the Cb component (value).

In an example, a (for example, one) chroma ALF may be applied to the second component (value) and the third component (value). The filter (for example, the CCALF filter) may be applied to the chroma ALF filtered second component (value) and the chroma ALF filtered third component (value), for example, to modify the chroma ALF filtered second component (value) and the chroma ALF filtered third component (value). For example, as shown in FIG. 9, a joint chroma CCALF may be used (for example, applied) after chroma ALF on Cb (for example, the second component), Cr (for example, the third component).

In an example, a first chroma ALF may be applied to the second component (value), and a second chroma ALF may be applied to the third component (value). The filter (for example, the CCALF filter) may be applied to the chroma ALF filtered second component (value) filtered by the first chroma ALF and the chroma ALF filtered third component (value) filtered by the second chroma ALF, for example, to modify the chroma ALF filtered second component (value)

and the chroma ALF filtered third component (value). For example, as shown in FIG. 21A, a joint chroma CCALF may be used (for example, applied) after a first chroma ALF is applied to Cb (for example, the second component) and a second chroma ALF is applied to Cr (for example, the third component).

Figure 18:
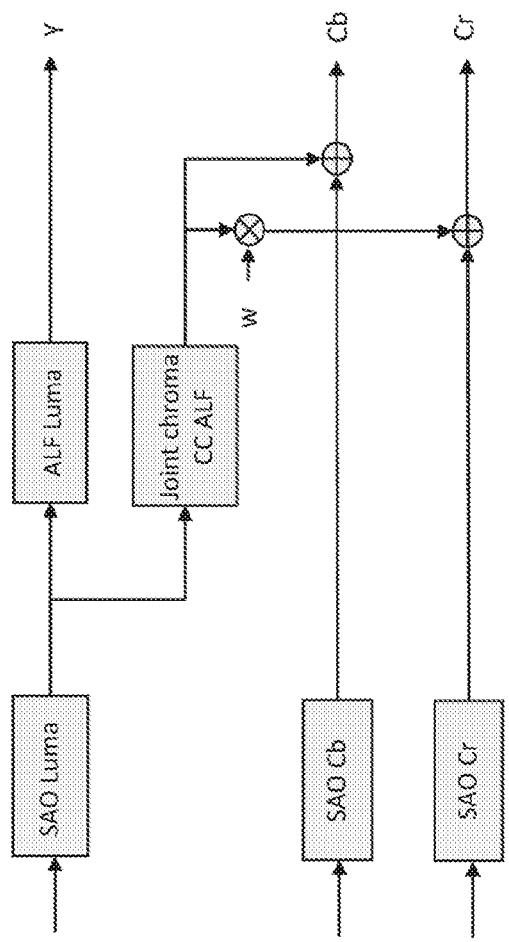
FIG. 18 illustrates an example workflow of a joint chroma CCALF (for example, with chroma ALF skipped).

In an example, a chroma ALF may not be applied to the second component (value) and the third component (value). The filter (for example, the CCALF filter) may be applied to the second component (value) and the third component (value), for example, to modify the second component (value) and the third component (value). As shown in FIG. 18, Cb (for example, the second component) and Cr (for example, the third component) may not be filtered by a chroma ALF before they are filtered, for example, by a joint chroma CCALF.

A determination whether low-frequency non-separable transform (LFNST) may be used in conjunction with matrix-based intra prediction (MIP) may be based (for example, at least in part) on, for example, the type of the current slice. For example, LFNST may be used in conjunction with MIP based on one or more conditions, such as that the coding block is considered large and the current slice is an I-slice.

A determination whether to use palette mode may be based on the block size. For example, palette mode may be disabled for small block sizes in inter slices. A block may be considered small, for example, if the block's size in samples is less than a certain threshold.

A video processing apparatus (for example, an encoder) may subtract the average of the Cr residual (denoted as resCr) from the Cb residual (denoted as resCb). The difference between resCb and resCr may be used as the input to the transform and quantization process, for example, in accordance with Equation (1).

VFF may perform (for example, separate) filtering for (for example, three) components. Components may be, for example, (Y, Cb, Cr), (R, G, B), or components in any other color transformation format. There may be inherent correlation among the refinement signals of the three components. A video component is an example of a componen.

In some examples, CCALF may be applied after ALF for chroma components (Cb, Cr). In some examples, ALF and CCALF may involve training of ALF filter coefficients on the chroma component(s).

Figure 16A:
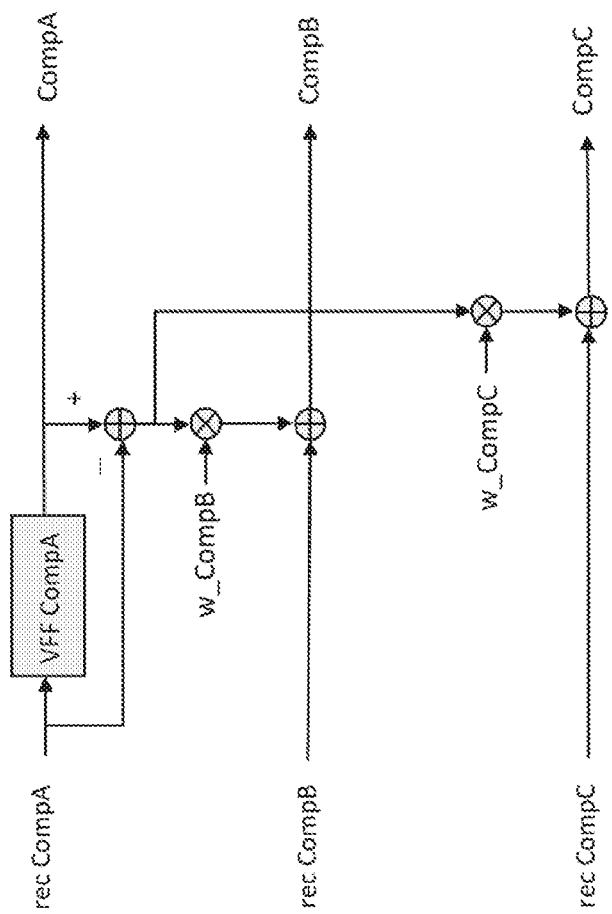
FIG. 16A illustrates an example workflow of VFF with a (for example, one) dominant component.

Joint component VFF may be performed. Filter coefficients may be obtained and/or applied on a subset of multiple (for example, the three) components. For example, a dominant component (for example, a first component) may be selected. FIG. 16A illustrates an example workflow of VFF with a (for example, one) dominant component. As shown in FIG. 16A, component A (CompA) may be the dominant component that is selected. A (for example, one) set of filter coefficients may be applied to the dominant component, for example, to generate a filtered output signal as shown in FIG. 16A. The filtered output signal may be an output of the filter that has the set of filter coefficients applied to the dominant component. A refinement signal (for example, a joint refinement signal) may be obtained (for example, derived) from the dominant component, for example, as the filtered output signal minus the filter input signal of the dominant component, as shown in FIG. 16A. The filter input signal may include a value for the dominant component before the value for the dominant component is filtered using the filter. A (for example, properly) weighted version of the refinement signal may be applied to a second component of the multiple components, for example, to modify the second component (value). A (for example, properly) weighted version of the refinement signal may be applied to a third component of the multiple components, for example, to modify the third component (value). The second component and the third component may be the other two components of the three components. As shown in FIG. 16A, the second component may be component B, and the third component may be component C. The joint refinement signal before being weighted and applied to the second component may be the same as the joint refinement signal before being weighted and applied to the third component. The second component and/or the third component may be non-dominant components.

Figure 16B:
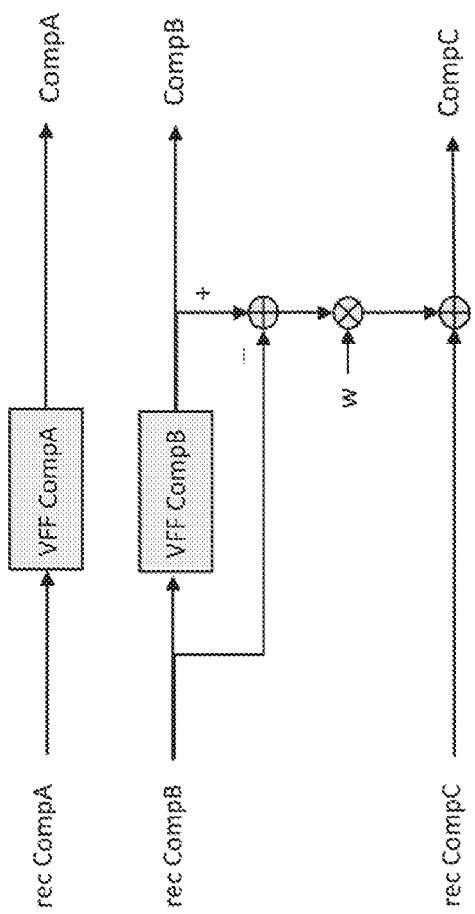
FIG. 16B illustrates an example workflow of VFF with two dominant components.

For example, dominant components (for example, a first component and a second component) may be selected from the multiple components. FIG. 16B illustrates an example workflow of VFF with two dominant components. Multiple sets of filter coefficients (for example, same or different sets of filter coefficients) may be applied to the dominant components (for example, components A and B as shown in FIG. 168). For example, a first set of filter coefficients (for example, VFF component. A as shown in FIG. 16B) may be applied to the first component (for example, component. A as shown in FIG. 168), and a second set of filter coefficients (for example, VFF component B as shown in FIG. 16B) may be applied to the second component (for example, component B as shown in FIG. 168). A component (for example, the first component) of the dominant components may be selected to obtain a refinement signal. For example, as shown in FIG. 16B, component B may be selected from components A and B. A refinement signal (for example, a joint refinement signal) may be derived from the selected one (for example, the first component) of the dominant components as the filtered output signal minus the filter input signal of the selected dominant component, for example, as shown in FIG. 16B. The filtered output signal may be an output of the filter that has the set of filter coefficients applied to the selected dominant component. A weighted version of the refinement signal (for example, using a weighting factor) may be applied to the other component (for example, a third component of the multiple components), for example, to modify the other component (value). For example, as shown in FIG. 16B, component C may be the third component. The other component may be a non-dominant component. The refinement signal before being weighted and applied to the other component may be the same as derived refinement signal.

Complexity of video frame filtering on the three components may be reduced. A better complexity versus coding efficiency trade-off may be achieved. Joint luma chroma VFF may, for example, apply VFF on a luma component and use the luma refinement signal to be (for example, properly) down-sampled, weighted and applied to the two chroma components.

VFFs, as used herein, may include, but are not limited to: a deblocking filter, an SAO, an ALF, a CCALF and/or other filters, such as a bilateral filter, Hadamard filter, etc. A VFF may be used as in-loop filtering or post-processing filtering.

In some examples, chroma ALF may be disabled. Joint chroma CCALF may be applied for the two chroma components (Cb, Cr). Complexity (for example, of video frame filtering on chroma components) may be reduced, while the performance improvement may be retained by joint chroma CCALF.

Joint component VFF may be applied to video coding or processing, to image coding and/or processing. Coding efficiency may be improved. Quality (for example, subjective quality) of the input video signal may be improved.

Examples are described in the context of video coding or processing without loss of generality of applicability of examples in other contexts.

Inherent correlation between chroma components may be exploited in joint chroma residual coding. Correlation may exist between the equivalent VFF output refinement signals of the three components. VFF filtering may be applied for a subset of the three components. In some examples, VFF filtering may be applied once, for example, for one of the three components (for example, the dominant component). The refinement signal for the other two components may be derived as a (for example, properly) weighted version of the same refinement signal derived from the dominant component with VFF applied. In some examples, VFF filtering may be applied for two of the three components (for example, the dominant components). The refinement signal for the other component can be derived as a (for example, properly) weighted version of the same refinement signal derived from the dominant components with VFF applied. One or more dominant components may be adaptively selected, for example, to directly apply VFF at a coding block level, at a slice level, or at a PPS level.

Figure 15:
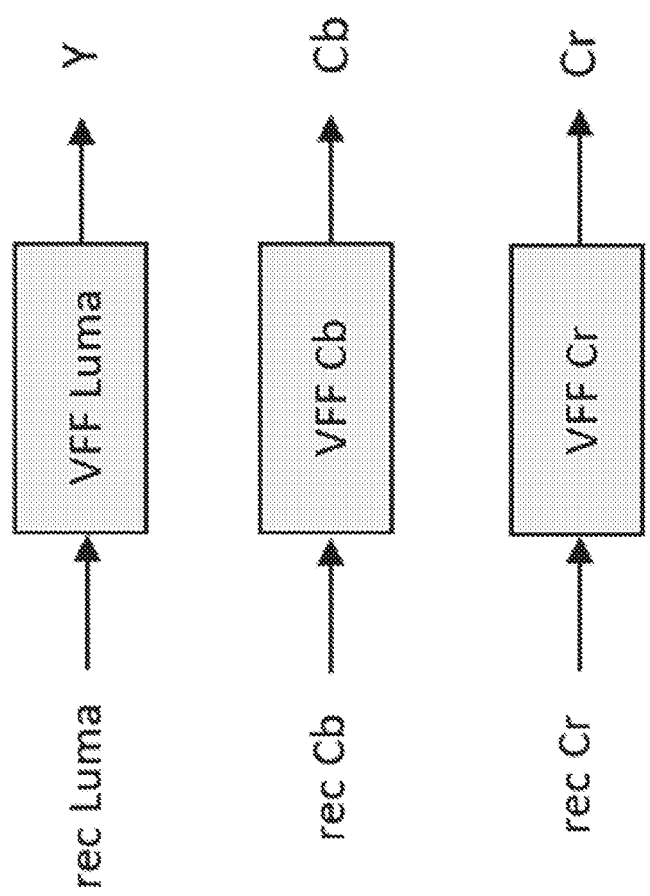
FIG. 15 illustrates an example workflow of video frame filtering (VFF).

An example VFF workflow is illustrated in FIG. 15. Examples of joint component VFF workflows are illustrated in FIGS. 16A and 16B. Components CompA, CompB, CompC shown in FIGS. 16A and 16B may be any combination of the three components. FIG. 16A shows an example workflow of VFF with one dominant component. For example, CompA, CompB, CompC may be Y, Cb, Cr. In an example (for example, where CompA is Y), proper down sampling may be performed to convert the Y refinement signal to match the chroma block size.

FIG. 16B shows an example workflow of VFF with two dominant components. For example, CompA, CompB, CompC may be Y, Cb, Cr. In an example (for example, where CompB is Y), proper down sampling may be performed to convert the Y refinement signal to match the chroma block size.

In an example, the dominant component with VFF applied may be luma component Y in (Y, Cb, Cr) format video. Down sampling (for example, corresponding to a different color format of 4:2:0, 4:2:2, 4:4:4, etc.) may be performed to convert the Y refinement signal to match the corresponding chroma block size, for example, to be weighted and applied to the chroma component(s).

In an example, one (or two) of the three components may be selected to have VFF applied (for example, directly applied). The dominant component(s) may be selected for direct VFF application for (for example, each of) one or more coding blocks. For example, the selected dominant component(s) may be signaled (for example, explicitly coded) as the variable vff_direct_applied_component (or vff_not_direct_applied_component) for a (for example, each) coding block in the related coding block header. In an example, the dominant component(s) may be the same for the coding blocks (for example, all the coding blocks) in an entire slice or picture. An indication (such as vff_direct_applied_component or vff_not_direct_applied_component) may be signaled (for example, explicitly coded) for a (for example, each) slice or picture in the related slice header or PPS.

In examples, vff_direct_applied_component or vff_not_direct_applied_component may be obtained (for example, derived at the decoder side) based on a neighboring blocks' information (for example, coded information). Signaling of vff_direct_applied_component or vff_not_direct_applied_component in the bitstream may be skipped. The decoder may derive the value of vff_direct_applied_component or vff_not_direct_applied_component for a (for example, each) coding block. The decoder may derive the value of vff_direct_applied_component or vff_not_direct_applied_component for a (for example, each) slice or picture.

In examples, a coding block (for example, of a specified block size) level VFF on/off control may be applied (for example, for three components). An on/off block map may be obtained (for example, coded) and/or signaled to the decoder. The three components may use three different sets of block-level on/off indications (for example, on/off control flags) for VFF filtering. Three sets of block-level VFF on/off flags may be included (for example, coded) in the bitstream.

A block-level on/off control mechanism for a different component may be the same. A set of block-level on/off control signaling may be obtained (for example, coded) and signaled for the three components. A set of VFF filter coefficients may be included (for example, coded) in the bitstream.

In examples, the on/off control block sizes of the three components may be the same. An on/off control block size may be signaled and applied to the three components. In examples, the on/off control block sizes of the three components may be different. The on/off control block sizes may be separately included (for example, coded) into the bitstream.

In examples, different VFF filters may be applied to different coding blocks in a slice. For example, the ALF on/off coding block may be a coding tree unit (CTU). The joint component VFF filter training process may be conducted at the coding block level. In examples, the coding blocks in a slice may use the same VFF filter. The VFF filter training process may be conducted at the slice level.

Figure 17A:
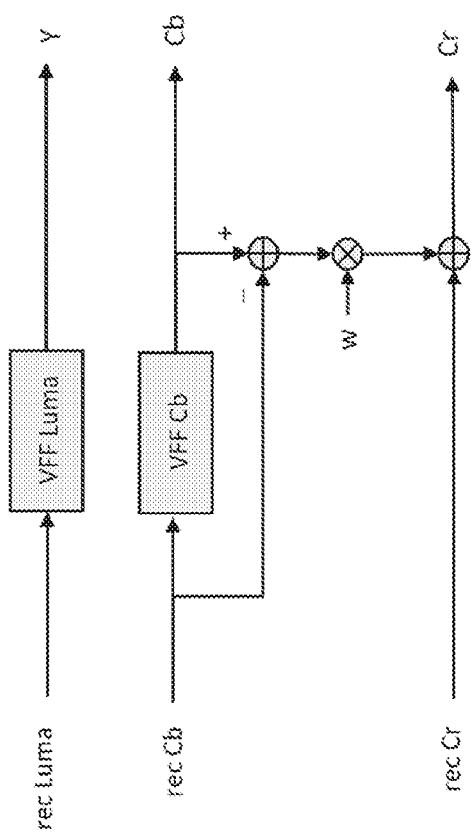
FIG. 17A illustrates an example workflow of joint chroma VFF on Cb.
Figure 17B:
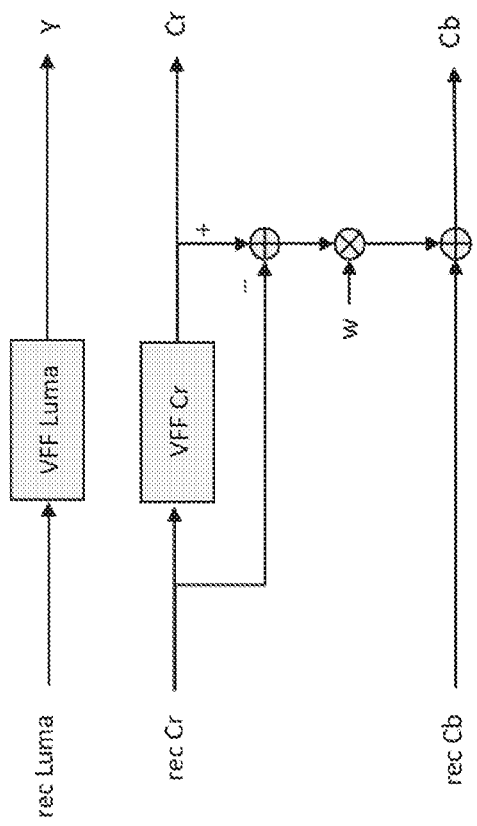
FIG. 17B illustrates an example workflow of joint chroma VFF on Cr.

Joint chroma VFF may be performed, for example, as shown in FIGS. 17A and 17B. FIG. 17A illustrates an example workflow of joint chroma VFF on Cb. FIG. 17B illustrates an example workflow of joint chroma VFF on Cr. The switch of VFF direct application on Cb, as in FIG. 17A, or on Cr, as in FIG. 17B, may be at a coding block level or a slice or picture level. Two dominant components may be selected for VFF application. The two dominant components may be the luma and a chroma component, for example, in a (Y, Cb, Cr) video format. Joint component VFF may include applying VFF on luma and one chroma component (for example, Cb or Cr) and using the chroma dominant component refinement signal for (for example, proper) weighting and application to the other chroma component (for example, Cr or Cb).

A video processing apparatus (for example, an encoder) may train for an optimal set of filter coefficients. The ideal target refinement signal may be the residual of a component(s) (for example, each component). The optimization problem for a Cb component may be represented, for example, in accordance with Equation (34).

$$\text{find } tgt\_vffCb, s.t. \min(orgCb - (tgt\_vffCb + recCb))^2 \qquad (34)$$

Parameters tgt_vCb, orgCb, recCb may represent, respectively, the ideal target VFF output signal, the original input video signal, and the reconstructed signal (for example, input to VFF) of Cb component.

The optimal target VFF output signal for Cb may be calculated, for example, by taking the derivative of the squared error of Equation (34), in accordance with Equation (35).

$$tgt\_vffCb = resCb = orgCb - recCb \qquad (35)$$

The optimal target VFF output signal for the Cr component may be calculated, for example, in accordance with Equation (36).

$$tgt\_vffCr = resCr = orgCr - recCr \quad (36)$$

The optimization problem may be represented for joint chroma VFF, for example, in accordance with Formula (37).

$$\text{Find } tgt\_vff, s.t. \ \min[(orgCb-(tgt\_vff+recCb))^2 + (orgCr-(tgt\_vff*w+recCr))^2] \quad (37)$$

Parameter tgt_vff may represent the ideal target VFF output signal. Parameter w may represent the weighting factor. Formula (37) may be solved, for example, by taking the derivative of Formula (37) and equating the derivative to zero, for example, in accordance with Equation (38).

$$-2[orgCb-(tgt\_vff+recCb)]-2w*[orgCr-(tgt\_vff*w+recCr)]=0 \quad (38)$$

Equation (38) may be solved and, resCb, resCr from Equation (35) and Equation (36) may be plugged in to derive an ideal target VFF signal, for example, in accordance with Equation (39).

$$tgt\_vff=(resCb+w*resCr)/(1+w^2) \quad (39)$$

Joint chroma VFF (JC-VFF) may be derived in an iterative way. A JC-VFF filter may be derived with Equation (39) using coding block chroma samples from both chroma components. A video processing apparatus (for example, an encoder) may determine for a (for example, each) chroma coding block, such as a 16×16 or a CTU, whether to apply the previously derived JC-VFF filter. JC-VFF may be determined to be applied for the current chroma coding block, for example, if the filtered chroma coding block becomes better (for example, the distortion becomes smaller between the filtered chroma coding block and the original signal). The JC-VFF filter may be derived again with Equation (39) using (for example, only) the chroma coding block(s) that the JC-VFF filter is to be applied to, for example, after the chroma coding blocks to be JC-VFF filtered are identified.

In an example, joint chroma VFF filtering may be applied to (for example, directly applied to) the reconstructed Cb component, and the filtered output may be used to derive the chroma refinement signal, which may be applied to the Cr component (as shown above and in FIGS. 17A and 17B).

In an example, the joint chroma VFF output refinement signal may be applied to (for example, directly applied to) the reconstructed Cr component, and the filtered output may be used to derive the chroma refinement signal, which may be weighted and applied to the Cb component. The components Cb and Cr in Equation (39) may be swapped, for example, if the joint chroma VFF output refinement signal is applied to (for example, directly applied to) the reconstructed Cr component.

In an example, the weighting factor may be the same for an entire slice or picture. In an example, the weighting factor may be different for different coding blocks.

In an example, the weighting factor (or the weight) may be a fixed pre-determined value, for example, −1, or ½, etc., for multiple (for example, all) the pictures of a sequence. In an example, a (for example, implicit and fixed) weight value may be determined, for example, based on the color format of an input video signal (for example, 4:2:0, 4:2:2, 4:4:4, etc.). In an example, a (for example, implicit) weight value may be dependent on a quantization parameter (QP). The relationship may be defined, for example, via analytic function(s) or look-up-table(s) (LUTs).

In an example, the weighting factor may be included (for example, explicitly coded) into the bitstream. The weighting factor may be obtained for a picture, slice, or coding block, for example, derived and/or coded for each picture, slice, or coding block. For example, the weighting factor may be signaled in a PPS, a slice header, or a coding block-related header. The weighting factor may be derived and applied for a group of pictures, for example, pictures from a same scene. For example, the weighting factor may be signaled in an SPS. The weighting factor may be included (for example, coded) in an APS, for example, along with other VFF parameters. A video processing apparatus (for example, a decoder) may obtain the weighting factor, for example, based on the APS.

In examples, a weight factor may be adapted based on the QPs used to code the blocks, for example, when the weight factor is applied to a (for example, each) block of a specified size for filtering. An adaption function may be defined, for example, via one or more analytic functions or one or more LUTs.

The value of a weighting factor may be larger than 1, equal to 1, or less than 1. A value of a weighting factor may be positive or negative. The value of a weighting factor may be determined, for example, based on one or more indications in the bitstream. In an example, the weighting factor may be associated with (for example, coded with) a flag, such as "weight_sign," to indicate the sign of the weighting factor. For example, value 0 of the flag may indicate a positive sign, and value 1 of the flag may indicate a negative sign. A fixed length coded weight value index indication, such as "weight_index," may indicate a fixed length coded weight value index in M bits of 0 to (2^M−1), which may indicate a weight magnitude. A weight value may be determined from the weight magnitude and the sign.

In examples, weight values used for filtering at coding blocks may be different. Weight values may be determined at a block level. For example, a set of weight values may be included (for example, coded) at a slice-level, such as in the slice header syntax. An index to the set of weight values of a slice may be signaled for one or more (for example, each) coding block, for example, if the filter is to be applied for the block. Signaling of a weight index may be skipped for a block, for example, if the filter is not to be applied for the coding block.

Joint luma and chroma VFF may be performed, for example, as shown in FIG. 16A. In some examples, there may be one dominant component. The dominant component may be the luma component, for example, in (Y, Cb, Cr) video format. A joint component VFF may include applying VFF on the luma component and using the luma refinement signal to be down sampled, weighted and applied to the chroma components (Cb and Cr). In some examples, components shown in FIG. 16A (CompA, CompB, CompC) may correspond to Y, Cb, Cr, respectively.

A target signal for joint luma and chroma VFF may be derived, for example, similar to (for example, ideal) target signal derivation for joint chroma VFF, for example, as described herein. A weighting factor may be coded, for example, similar to a weighting factor coding for joint chroma VFF, for example, as described herein. Two weighting factors may be obtained and/or used, respectively, for two chroma components (Cb, Cr).

A (for example, an ideal) target optimization problem may be represented in accordance with Formula (40).

$$\text{Find } tgt\_vff, s.t. \ \min[\Sigma_Y(orgY-(tgt\_vff+recY))^2+\Sigma_{Cb}(orgCb-(tgt\_vff\_ds*w\_Cb+recCb))^2+\Sigma_{Cr}(orgCr-(tgt\_vff\_ds*w\_Cr+recCr))^2] \quad (40)$$

Parameter tgt_vff may represent a (for example, an ideal) target VFF output signal, for example, in terms of the luma block size. Parameter tgt_vff_ds may represent the down sampled tgt_vff to match the block size of chroma. The chroma block width and height may be half of that of the luma block, for example, for a 4:2:0 color format. Examples are described in 4:2:0 format without loss of general applicability to other formats. Related down sampling (for example, for 4:2:2 color format) or no down sampling (for example, for 4:4:4 color format) may be applied similarly as in examples discussed herein.

Parameters w_C and w_Cr may represent the weighting factors, respectively, for Cb and Cr. Luma down sampling may be performed to match the chroma block size and the corresponding residual signal representations may be plugged into Formula (40). The target optimization problem may be represented, for example, in accordance with Formula (41).

$$\text{Find } tgt\_vff, s.t. \min[4*(tgt\_vff\_ds - resY\_ds)^2 + (w\_Cb*tgt\_vff\_ds - resCb)^2 + (w\_Cr*tgt\_vff\_ds - resCr)^2] \quad (41)$$

Parameter resY_ds may represent the down sampled residual signal of Y. A video in 4:2:0 format may have a down sampling factor of 4, for example, as shown in Equation (42).

Formula (41) may be solved, for example, by taking the derivative of Formula (41) and equating it to zero, for example, as shown in Equation (42).

$$tgt\_vff\_ds = (4*resY\_ds + w\_Cb*resCb + w\_Cr*resCr) / (4 + w\_Cb^2 + w\_Cr^2) \quad (42)$$

Target signal tgt_vff may be derived, for example, by up-sampling signal tgt_vff_ds.

Chroma ALF may be skipped or removed. Chroma ALF may be disabled or bypassed, for example, when joint chroma CCALF for the (Cb, Cr) components is applied.

FIG. 18 illustrates an example workflow of a joint chroma CCALF (for example, with chroma ALF skipped). As shown in FIG. 18, chroma ALF may be bypassed from a joint chroma CCALF process. The signaling and processes related to chroma ALF may be skipped. For example, the chroma ALF filter flags and parameters, the block level on/off control flag maps for Cb, Cr components, etc., may be skipped from signaling.

A set of filter coefficients may be obtained and/or used to generate a CCALF filtered output, for example, as a refinement signal for a chroma component. A (for example, properly) weighted version of the chroma refinement signal may be applied to the other chroma component Joint chroma VFF and joint luma chroma VFF may be implemented, for example, with signaling of one or more of the following: filter coefficients, a joint component VFF on/off flag, a dominant component for which filtering is to be applied, and/or a weighting factor (e.g., at a block level, slice level, and so on). VFF filtering may be applied on a subset (for example, a first color component) of color components, and the refinement signal may be obtained (for example, derived) for the other color component(s) (for example, a second color component) as a weighted version of the refinement signal. The complexity of VFF may be reduced.

A video processing apparatus (for example, a video decoder) may be configured to obtain a video frame filter and a video signal comprising a plurality of color components. A video processing apparatus (for example, a video coder) may be configured to identify a dominate color component among the plurality of color components, for example, based on an indication in the bitstream for the current block or based on the dominate color component of a neighboring block. In one or more examples, "neighboring" may be used interchangeably with "adjacent," which includes different types of adjacency, such as an adjacent block, an adjacent sub-block, an adjacent pixel, and/or a pixel adjacent to a boundary. Spatial neighbors may be adjacent in the same frame while temporal neighbors may be at the same location in adjacent frames.

A video processing apparatus (for example, a video coder) may be configured to apply the video frame filter to the dominate color component of the video signal to determine a refinement offset associated with the dominant component. The video processing apparatus may be configured to calculate a refinement offset for a non-dominant component based on the refinement offset associated with the dominant component and a weighting factor. The video processing apparatus may be configured to refine the non-dominant component using the refinement offset for a non-dominant component. For example, the video processing apparatus (for example, a video decoder) may be configured to calculate a second refinement offset for a second non-dominant component and refine the second non-dominant component using the second refinement offse.

Cross-Component Adaptive Loop Filter (CCALF) use luma sample values to refine a (for example, each) chroma componen.

FIG. 19 is a diagram illustrating a placement of CCALF with respect to other loop filters. FIGS. 20A and 20B are diagrams illustrating different types of diamond shaped filters. Referring to FIGS. 19, 20A and 20B, a CCALF may operate, for example, by applying a linear, diamond shaped filter to the luma channel, for example, to enhance a (for example, each) chroma component A CCALF filter may be applied to a diamond region centered at a collocated position of a luma component and the filter output may be added to chroma sample value for a (for example, each) chroma component sample. Filter coefficients may be transmitted in an adaptation parameter set (APS), scaled by a factor of $2^N$ (for example $2^{10}$), and may be rounded for fixed point representation. Application of the filters may be controlled on a variable block size and may be signaled by a context-coded flag received for a block (for example, each block) of samples. CCALF information (for example, the block size) and/or a CCALF enabling flag may be received at a slice-level for the chroma components (e.g., each chroma component). Block sizes (for example, supported block sizes) in samples (for example, chroma samples) may be, for example, 16×16, 32×32, 64×64, and 128×128. In some examples, the same or similar filter coefficient training functions used by a video processing apparatus (for example, an encoder) for ALF may be used by a video processing apparatus (for example, an encoder) for CCALF.

FIGS. 20A and 20B are diagrams illustrating different types of diamond shaped filters. An ALF filter may be, for example, a multi tap ALF filter (such as, an 18-tap ALF filter) with filter coefficients (for example, 14 unique filter coefficients), as shown by example in FIG. 20A. An ALF filter may be, for example, four 3×4 diamond shaped 8-tap ALF filters, as shown by example in FIG. 20B. An ALF filter may be obtained (for example, selected) at the CTU level. ALF filters may be linear or non-linear.

A joint chroma CCALF (JC-CCALF) may be implemented, as illustrated by example in FIG. 21A. FIG. 21A is a diagram illustrating an example workflow of JC-CCALF operation in which chroma ALF(s) and JC-CCALF are used. JC-CCALF may be implemented, for example, to reduce complexity of a CCALF. A JC-CCALF may be implemented, for example, where a (for example, only one) set of filter coefficients may be obtained and/or used (for example, applied) to generate a (for example, one) CCALF filtered output. The CCALF filtered output may be used (for example, as a refinement signal) for one of multiple (for example, two) color components. A (for example, properly) weighted version of the CCALF filtered output (for example, chroma refinement signal) may be applied to the other color component(s) of the multiple color components.

JC-CCALF may avoid coding performance loss and may reduce the complexity of certain CCALF (for example, by approximately 50%), for example, due to an inherent correlation between Cb and Cr refinement signals. JC-CCALF may achieve a better trade-off between complexity and coding efficiency.

FIG. 21A is a diagram illustrating workflow of JC-CALF operation in which both chroma ALF and JC-CALF are used. As shown by example in FIG. 21A, JC-CCALF may be used after chroma ALF on the Cb and the Cr, where both chroma ALF and JC-CCALF may be applied.

An encoder side may train for an optimal set of filter coefficients (for example, similar to training for CCALF). A (for example, an ideal) target refinement signal may be a residual of a (for example, each) chroma component (denoted as resCb, resCr, respectively). An optimization for joint chroma CCALF for a Cb component may be represented, for example, in accordance with Formula (43):

$$\text{Find } tgt\_ccalf, s.t \min[(\text{org}Cb-(tgt\_ccalf+alfCb))^2 + (\text{org}Cr-(tgt\_ccalf*w+alfCr))^2], \quad (43)$$

where tgt_ccalf, otgCb/Cr, and alfCb/Cr may represent, respectively, a (for example, an ideal) target output refinement signal, an original input video signal, and an ALF output signal. Parameter w represents a weighting factor. Chroma residual signals may be denoted as resCb/Cr, for example, in accordance with Equation (44).

$$\text{res}Cb=\text{org}Cb-alfCb, \text{res}Cr=\text{org}Cr-alfCr \quad (44)$$

Formula (43) may be solved, for example, by taking the derivative of formula (43) and equating it to zero (e.g., set the derivative equal to zero), for example, in accordance with Equation (45).

$$-2[\text{org}Cb-(tgt\_ccalf+alfCb)]-2w*[\text{org}Cr-(tgt\_ccalf*w+alfCr)]=0 \quad (45)$$

Equation (45) may be solved, for example, by plugging in Equation (44), for example, as shown in Equation (46).

$$tgt\_ccalf=(\text{res}Cb+w*\text{res}Cr)/(1+w^2) \quad (46)$$

An iterative training algorithm (for example, similar to an iterative training algorithm for a CCALF) may be used for training for a JC-CCALF.

An 8-tap ALF filter may be applied, for example, as follows. Slice header semantics may include, for example, a slice_joint_chroma_cross_component_alf_weight_sign_flag. A certain flag value (for example, equal to 0) may specify that the joint chroma cross component weight JcCcAlfWeight is greater than 0 while a certain flag value (for example, equal to 1) may specify that the joint chroma cross component weight JcCcAlfWeight is less than 0. A certain flag value (for example, equal to 1) may specify that the joint chroma cross component weight JcCcAlfWeight is greater than 0 while a certain flag value (for example, equal to 0) may specify that the joint chroma cross component weight JcCcAlfWeight is less than 0. Slice header semantics may include, for example, a slice_joint_chroma_cross_component_alf_weight_index, which may specify the magnitude (for example, other than zero) for the joint chroma cross component weight JcCcWeight. The magnitude of JcCcWeight may be determined, for example, as follows. The value of JcCcWeight may be equal to slice_joint_chroma_cross_component_alf_weight_index>>2, for example, if a slice_joint_chroma_cross_component_alf_weight_index is less than or equal to 4. The value of JcCcWeight may be equal to 4/(slice_joint_chroma_cross_component_alf_weight_index−4), for example, otherwise. The value of JcCcWeight may be determined, for example, by combining the weight magnitude with the sign of JcCcWeight, for example, as derived from slice_joint_chroma_cross_component_alf_weight_sign.

In some examples, slice header semantics may include, for example, a slice_joint_chroma_cross_component_alf_weight_sign_flag, where a flag value equal to 0 may indicate that the joint chroma cross component weight JcCcAlfWeight is greater than 0 a flag value equal to 1 may indicate that the joint chroma cross component weight JcCcAlfWeight is less than 0. In some examples, slice header semantics may include, for example, a slice_joint_chroma_cross_component_alf_weight_index, where an index value (for example, other than zero) may indicate the magnitude of the joint chroma cross component weight JcCcWeight. The magnitude of JcCcWeight may be determined, for example, as follows. JcCcWeight may be equal to the slice_joint_chroma_cross_component_alf_weight_index>>2, for example, if the slice_joint_chroma_cross_component_alf_weight_index is less than or equal to a threshold (for example, a value of 4). JcCcWeight may be equal to another threshold value (for example 4/(slice_joint_chroma_cross_component_alf_weight_index−4), for example, otherwise. A value of JcCcWeight may be determined, for example, by combining the weight magnitude with the sign of the JcCcWeight (for example, as derived from slice_joint_chroma_cross_component_alf_weight_sign).

JC-CCALF may be implemented for one or more filters. In some examples, a single CCALF filter may be implemented (for example, an 18-tap filter or an 8-tap filter). In some examples, multiple (for example, selectable) CCALF filters (such as, four or more filters) may be implemented. Coding performance may be improved.

One or more filter selection procedures may be implemented for CCALF and/or JC-CCALF with multiple CCALF filters, for example, on the encoder side. A filter selection for a coding block may be performed, for example, based on a rate-distortion (RD) cost comparison and the coding bits of the related filter indicator, which may identify whether a filter is used and/or which one of multiple filters is used. The filter selection may include an encoder side filter selection. A filter selection may be based on a predetermined, default and/or fixed filter index to filter indicator assignment and/or mapping. Filter selection (for example, an RD filter selection) may be performed for a block (for example, each block) and/or other sub-unit(s) of a picture. A total count of the occurrence of a (for example, each) filter may be counted, respectively. Filter indices may be sorted, for example, in a descending order in terms of the respective occurrence count in a current slice. The respective occurrence counts may be used to define a final mapping of filter index to filter indicator to be coded (for example, finally coded), for example, so that a filter index having a higher occurrence frequency (for example, count) may be assigned to a lower filter indicator value (for example, a value that uses less bits for its representation). For example, a filter indi(ces) associated with the highest usage may be coded with a smaller (for example, a smallest) number of bits. In some examples, an RD optimized (RDO) filter selection per coding block may be (for example, only) one-pass, where the filter index used (for example, actually used) to filter indicator mapping may not be used to estimate the coding bits of a filter index more accurately when making the filter selection decision. In some examples, a multi-pass iterative RDO filter selection and/or scheme may be implemented, for example, to improve coding performance.

A filter training procedure (for example, on the encoder side) may use block classification. An iterative filter training procedure (for example, an encoder side filter training procedure) may be implemented in ALF CCALF and/or JC-CCALF procedures. A (for example, each) coding block may be determined to be included in deriving an optimized set of filter coefficients (for example, for the selected filter in the current iteration), for example, based on a previous iteration decision for a (for example, each) respective coding block (for example, to select a particular filter or no filter among a plurality of candidate filters for the respective coding block). The derived filter coefficients may be used to make a filter selection decision per coding block. A filter training procedure may proceed to the next iteration for further filter training.

In an example of an iterative filter training procedure, a coding block in a current slice may be decided and/or classified to certain filtering options (for example, whether to use a filter and/or which filter among multiple filters to use). Coding blocks (e.g., only coding blocks) classified to be preferable for application with a certain filter may be included in a training procedure of a respective filter, for example, to calculate statistics and derive corresponding filter coefficients.

In some examples, a block classification decision procedure may align criterion for selection of an optimal set of filter coefficients with minimization of coding distortion. A block classification decision procedure may enable minimization/reduction of coding distortion and RD cost, for example, reducing or minimizing the coding distortion and/or the coding bits that may otherwise compromise the performance of certain filter training procedures, such as, ALF, CCALF, and/or JC-CCALF, among others.

An early termination of filter training may be provided, for example, by an encoder side procedure. In some examples, iterative filter training procedures for CCALF and JC-CCALF may be terminated early, for example, based on one or more triggers. An early termination (ET) of a procedure may be triggered, for example, based on RD cost changes (for example, if the RD cost of the current iteration and/or multiple iterations satisfy an ET condition, such as an RD cost that is higher than an RD cost of one or more previous iterations). An ET condition may be, for example, an aggressive condition, a relaxed condition, and or an adaptive condition. In some examples, a more relaxed ET condition or an adaptive condition that can be relaxed may yield a better coding efficiency than a coding time trade-off.

In some examples, a JC-CCALF procedure may support the use of multiple CCALF filters.

In some examples, filter selection procedures (for example, encoder filter selection procedures) may be implemented to include a multi-pass iterative RDO algorithm, for example, so that a previous iteration's actual filter index to filter indicator mapping can be used in accurately estimating the filter indicator coding bits in a current iteration. Although filter selection procedures (for example, encoder filter selection procedures) described herein may be applicable to JC-CCALF (for example, only applicable to JC-CCALF in some examples), the procedures may be (for example, equally) applicable to CCALF.

In some examples, filter selection procedures (for example, encoder filter selection procedures) may be implemented with block classification decisions, for example, to minimize coding distortion of a coding block, where the optimization criterion may be aligned with (for example, be the same as) the filter coefficient optimization criterion. Although filter selection procedures (for example, encoder filter selection procedures) are described herein with regard to JC-CCALF, the procedures are (for example, equally) applicable to ALF and/or CCALF.

In some examples of filter selection procedures (for example, encoder filter selection procedures), an ET condition may be relaxed (for example, statically or dynamically relaxed via adaptive conditions. An ET condition may be relaxed to allow more than one iteration or pass (for example, with changed/degraded RD performance). Although filter selection procedures (for example, encoder filter selection procedures) are described herein with regard to JC-CCALF, the procedures are (for example, equally) applicable to CCALF.

JC-CCALF may be extended to use multiple ALF filters. In some examples, JC-CCALF may extended to use multiple (for example, four) CCALF filters. An apparatus comprising one or more processors may be configured to obtain a plurality of CCALF filters and perform JC-CCALF based on the obtained plurality of CCALF filters.

In some examples, a block-level filter indication map may include variable block sizes across slices. Different block sizes may be used (for example, for different slices) to code a filter indication map.

In some examples, allowed block sizes may range from the maximum allowed chroma CTU size (for example, N×N, where N may be an integer value, such as 64×64 for 4:2:0 video) to the minimum allowed chroma CTU size (for example, M×M, where M is a integer value less than N, such as 16×16 for 4:2:0 video).

In some examples, a block-level filter indication map may include a (for example, one single) fixed block size across slices. For example, a fixed filter indication map block size may be a maximum allowed chroma CTU size.

Although block-level filter indication maps with a fixed block size of maximal chroma CTU size are disclosed herein for brevity, other fixed or variable block sizes may be implemented.

In some examples, components (for example, color components of Cb and Cr) may use separate block-level on/off maps. For example, Cb and Cr may have separate/different decisions (for example, in block-level on/off maps) indicating whether JC-CCALF filtering may be applied for a (for example, each) coding block position. In some examples, the same filter (for example, ALF, CCALF or other filters) may be used for Cb and Cr components, for example, if a filter is applied to both the Cb and Cr for a coding block position. In some examples, filter determinations for a (for example, each) coding block position may include one or more of the following: the Cb may not use a filter and the Cr may use a candidate filter; the Cb may use a candidate filter and the Cr not use a filter; and/or the Cb and the Cr may use the same filter in the candidate filters. An example of CTU syntax is shown in Table 6:

TABLE 6 example of CTU syntax

| | Descriptor |
|---|---|
| coding_tree_unit( ) { <br> ... <br>     if( slice_alf_chroma_idc = = 1 \|\| slice_alf_chroma_idc = = 3 ) { <br>         alf_ctb_flag[ 1 ][ CtbAddrX ][ CtbAddrY ] | ae(v) |
|         if( alf_ctb_flag[ 1 ][ CtbAddrX ][ CtbAddrY ] <br>         && aps_alf_chroma_num_alt_filters_minus1 > 0 ) <br>           alf_ctb_filter_alt_idx[ 0 ][ CtbAddrX ][ CtbAddrY ] <br>     } | ae(v) |
|     if( slice_alf_chroma_idc = = 2 \|\| slice_alf_chroma_idc = = 3 ) { <br>         alf_ctb_flag[ 2 ][ CtbAddrX ][ CtbAddrY ] | ae(v) |
|         if( alf_ctb_flag[ 2 ][ CtbAddrX ][ CtbAddrX ] <br>         && aps_alf_chroma_num_alt_filters_minus1 > 0 ) <br>           alf_ctb_filter_alt_idx[ 1 ][ CtbAddrX ][ CtbAddrX ] <br>     } <br>   if ( slice_joint_chroma_cross_component_alf_cb_enabled_flag ) <br> alf_ctb_joint_chroma_cross_component_cb_flag[ xCtb >> CtbLog2SizeY ][ yCtb >> CtbLog2SizeY] | ae(v) <br><br> ae(v) |
|   if (slice_Joint_chroma_cross_component_alf_cr_enabled_flag) <br> alf_ctb_joint_chroma_cross_component_cr_flag[ xCtb >> CtbLog2SizeY ][ yCtb >> CtbLog2SizeY ] <br>     if ( <br> alf_ctb_joint_chroma_cross_component_cb_flag[ xCtb >> CtbLog2SizeY ][ yCtb >> Ctb Log2SizeY ] \|\| <br> alf_ctb_joint_chroma_cross_component_cr_flag[ xCtb >> CtbLog2SizeY ][ yCtb >> CtbL og2SizeY ] ) <br> alf_ctb_joint_chroma_cross_component_filter_index[ xCtb >> CtbLog2SizeY ][ yCtb >> CtbLog2SizeY ] <br>     } | ae(v) <br><br><br><br><br><br> ae(v) |

A CTU semantic may provide, for example, one or more of the following: alf_ctb_joint_chroma_cross_component_cb_flag[xCtb>>Ctb Log 2SizeY][yCtb>>Ctb Log 2SizeY] equal to 0 may indicate that the joint chroma cross component filter output refinement signal is not applied to a block of Cb color component samples at luma location (xCtb, yCtb); alf_joint_chroma_cross_component_cb_flag[xCtb>>Ctb Log 2SizeY][yCtb>>Ctb Log 2SizeY] not equal to 0 may indicate that the joint chroma cross component filter output refinement signal is applied to a block of Cb color component samples at luma location (xCtb, yCtb); alf_ctb_joint_chroma_cross_component_cr_flag [xCtb>>Ctb Log 2SizeY][yCtb>>Ctb Log 2SizeY] equal to 0 may indicate that the joint chroma cross component filter output refinement signal is not applied to a block of Cr color component samples at luma location (xCtb, yCtb); alf_joint_chroma_cross_component_cr_flag[xCtb>>Ctb Log 2SizeY] [yCtb>>Ctb Log 2SizeY] not equal to 0 may indicate that the joint chroma cross component filter output refinement signal is applied to block of Cr color component samples at luma location (xCtb, yCtb); and/or alf_ctb_joint_chroma_cross_component_filter_index [xCtb>>Ctb Log 2SizeY][yCtb>>Ctb Log 2SizeY] may specify the index of the joint chroma cross component filter that is applied to the color component sample corresponding to a luma CTB at luma location (xCtb, yCtb), among others.

In some examples, two color components of Cb and Cr may share a (for example, the same) block-level on/off map. Cb and Cr, for a coding block position, may (for example, always) have the same decision whether a filter (for example, JC-CCALF filtering) may be applied. In some examples, the same ALF filter from multiple ALF candidate filters may be used for both Cb and Cr, for example, if a filter is applied. An example of CTU syntax is shown in Table 7:

TABLE 7 example of CTU syntax

| | Descriptor |
|---|---|
| coding_tree_unit( ) { <br> ... <br>     if( slice_alf_chroma_idc == 1 \|\| slice_alf_chroma_idc = = 3 ) { <br>         alf_ctb_flag[ 1 ][ CtbAddrX ][ CtbAddrY ] | ae(v) |
|         if( alf_ctb_flag[ 1 ][ CtbAddrX ][ CtbAddrY ] <br>         && aps_alf_chroma_num_alt_filters_minus1 > 0 ) <br>           alf_ctb_filter_alt_idx[ 0 ][ CtbAddrX ][ CtbAddrY ] <br>     } | ae(v) |
|     if( slice_alf_chroma_idc = = 2 \|\| slice_alf_chroma_idc = = 3 ) { <br>         alf_ctb_flag[ 2 ][ CtbAddrX ][ CtbAddrY] | ae(v) |
|         if( alf_ctb_flag[ 2 ][ CtbAddrX ][ CtbAddrX ] <br>         && aps_alf_chroma_num_alt_filters_minus1 > 0 ) | |

TABLE 7-continued example of CTU syntax

| | Descriptor |
|---|---|
|     alf_ctb_filter_alt_idx[ 1 ][ CtbAddrX ][ CtbAddrX ] | ae(v) |
|   } | |
|   if ( slice_joint_chroma_cross_component_alf_cb_enabled_flag \|\| slice_joint_chroma_cross_component_alf_cr_enabled_flag ) | |
|   alf_ctb_joint_chroma_cross_component_filter_idc[ xCtb >> CtbLog2SizeY ][ yCtb > > CtbLog2SizeY ] | ae(v) |
| } | |

A CTU semantic may provide, for example, one or more of the following:

alf_ctb_joint_chroma_cross_component_filter_idc [xCtb>>Ctb Log 2SizeY] [yCtb>>Ctb Log 2SizeY] equal to 0 may indicate that the joint chroma cross component fiter output refinement signal is not applied to a block of Cb and Cr color component samples at luma location (xCtb, yCtb); and/or alf_joint_chroma_cross_component_filter_idc [xCtb>>Ctb Log 2SizeY][yCtb>>Ctb Log 2SizeY] not equal to 0 may indicate that the alf_joint_chroma_cross-_component_filter_idc[xCtb>>Ctb Log 2SizeY] [yCtb>>Ctb Log 2SizeY]-th joint chroma cross component filter is applied to the color component sample corresponding to a luma CTB at luma location (xCtb, yCtb).

An iterative RDO block-level filter selection procedure may be implemented, for example, at the encoder side. A multi-pass iterative RDO may be implemented, for example, to provide/determine filter on/off and selection decisions for a (for example, each) coding block in a slice. An RDO block-level filter selection result may be used to count usage frequencies of a (for example, each) filter in a current slice (for example, in an iteration). A mapping (for example, a filter index to filter indicator mapping) may be derived, for example, based on a descending order of the filter index in terms of respective usage frequency. The mapping may be used, for example, in a coding bits estimation associated with the next iteration of a (for example, each) respective filter index coding. A more efficient or better optimized RD performance may be achieved, for example, with a more accurate coding bits estimation.

In some examples, an iterative RDO procedure may be terminated, for example, if a total number of iterations exceeds a pre-defined limit (for example, 5 or 10). An iterative RDO procedure may be terminated early, for example, if the number of consecutive iterations without an RD performance improvement reaches a pre-defined limit (for example, one iteration or multiple consecutive iterations, such as two consecutive iterations).

A procedure (for example, at the encoder side) may align optimization criterion of block classification with that of filter coefficient derivation, for example, in encoder side filter training. A procedure may, for example, apply the same optimization criterion for minimizing coding distortion to the block classification and the optimal set of filter coefficient derivation operations in the iterative filter training procedure. For example, an optimal classification decision for a (for example, each) coding block of a slice may determine or indicate whether to apply a filter and, if a filter is applied, which filter among multiple candidate filters is to be applied, for example, to yield minimal coding distortion among decision options.

A procedure may be applicable to a filter training procedure (for example, an encoder-side iterative filter training procedure) associated with ALF, CCALF, and JC-CCALF, among others.

A procedure (for example, at the encoder side) may provide for a relaxed early termination condition in filter training. A procedure may use a relaxed ET condition, for example, if iteratively training multiple filters (for example, CCALF filters) used in CCALF or JC-CCALF. An iterative filter training procedure may be terminated early, for example, if the number of consecutive iterations without RD performance improvement reaches a threshold (for example, a pre-defined limit larger than one, such as two or three, among other threshold values).

A joint chroma cross component filtering procedure may be implemented for a block of Cb and Cr chroma samples. Inputs of a joint chroma cross component filtering procedure may include, for example, one or more of the following: a reconstructed luma picture sample array recPicture$_L$ prior to the luma adaptive loop filtering procedure; filtered, reconstructed Cb and/or Cr picture sample arrays alfPicture$_{Cb}$ and alfPicture$_{Cr}$; a chroma location (xC, yC) specifying a top left sample of a current block of Cb and Cr chroma samples relative to a top left sample of a current picture; a width jcCcAlfWidth of block of chroma samples; a height jcCcAlfHeight of block of chroma samples; joint chroma cross component filter coefficients JcCcAlfCoeff[j], for example with j=0 . . . 7; alf_joint_chroma_cross_component_cb_flag and/or alf_joint_chroma_cross_component_cr_flag (for example, the output of the joint chroma cross component filtering procedure) may include, for example, the modified filtered reconstructed Cb and Cr picture sample arrays jcCcAlfPicture$_{Cb}$ and jcCcAlfPicture$_{Cr}$; vertical sample position offsets yM1, yP1, and yP2 may be specified based on a vertical luma sample position yL, clipTopPos and clipBottomPos, for example, in accordance with Table 8; horizontal sample position offsets xM and xP1 may be specified based on a horizontal luma sample position xL, clipLeftPos and clipRightPos, for example, in accordance with Table 9; the variables curr$_{Cb}$ and curr$_{Cr}$ may be derived/ determined, for example, in accordance with Equation (47) and Equation (48); the array of joint chroma cross component filter coefficients f[j] with j=0.7 may be derived, for example, as set forth in Equation (49); the variable sum may be derived, for example, as set forth in Equations (50) and (51); the modified, filtered, reconstructed Cb picture sample array jcCcAlfPicture$_{Cb}$[xC+x][yC+y] may be derived/determined as set forth in Equation (52), for example, if the alf_joint_chroma_cross_component_cb_flag is equal to 1; and/or the modified filtered reconstructed Cr picture sample array jcCcAlfPicture$_{Cr}$[xC+x][yC+y] may be derived/determined as set forth in Equation (53), for example, if the alf_joint_chroma_cross_component_cr_flag is equal to 1.

TABLE 8 example specification of yM1, yP1 and yP2

| Condition | yM1 | yP1 | yP2 |
|---|---|---|---|
| yL = = clipTopPos | 0 | 1 | 2 |
| yL = = clipBottomPos − 1 | −1 | 0 | 0 |
| yL = = clipBottomPos − 2 | −1 | 1 | 1 |
| Otherwise | −1 | 1 | 2 |

TABLE 9 example specification of xM1 and xP1

| Condition | xM1 | xP1 |
|---|---|---|
| xL = = clipLeftPos | 0 | 1 |
| xL = = clipRightPos − 1 | −1 | 0 |
| Otherwise | −1 | 1 |

$$curr_{Cb}=alfPicture_{Cb}[xC+x,yC+y] \quad (47)$$

$$curr_{Cr}=alfPicture_{Cr}[xC+x,yC+y] \quad (48)$$

$$f[j]=JcCcAlfCoeff[j] \quad (49)$$

$$sum=f[0]*recPicture_L[h_x,v_{y+yM1}]+f[1]*recPicture_L[h_{x+xM1},v_y]+f[2]*recPicture_L[h_x,v_y]+f[3]*recPicture_L[h_{x+xP1},v_y]+f[4]*recPicture_L[h_{x+xM1},v_{y+yP1}]+f[5]*recPicture_L[h_x,v_{y+yP1}]+f[6]*recPicture_L[h_{x+xP1},v_{y+yP1}]+f[7]*recPicture_L[h_x,v_{y+yP2}] \quad (50)$$

$$sum=(sum+64)>>7 \quad (51)$$

$$jcCcAlfPicture_{Cb}[xC+x][yC+y]=Clip3(0,(1<<BitDepth_C)-1,curr_{Cb}+sum) \quad (52)$$

$$jcCcAlfPicture_{Cr}[xC+x][yC+y]=Clip3(0,(1<<BitDepth_C)-1,curr_{Cr}+JcCcAlfWeight*sum) \quad (53)$$

Test results for CCALF show more coding artifacts for high QPs (for example, values of approximately 37 or higher). Overall subjective quality may be degraded, for example, without the application of CCALF. One or more examples herein may reduce artifacts from CCALF at high QPs, including in various embodiments, methods, apparatuses, systems, and/or procedures.

JC-CCALF may include divisions, for example, at the decoder-side. The application of a weighting factor using JC-CCALF may involve division operations (for example, at the decoder-side), for example, if the weighting factor magnitude is greater than 1 and involves larger-than-1 odd number as a denominator (for example, 4/3 for a max weight of 4, and 4/3, 8/3, 8/5, 8/6, 8/7 for a max weight of 8). Decoder-side division operations (for example, ones that incurred) may be removed. Such removal may facilitate more efficient hardware implementations including in various embodiments, methods, apparatuses, systems and/or procedures.

A weighting factor search of JC-CCALF may be performed, for example, at the encoder side. A search (for example, a fast search) procedure may be implemented, for example, to search for a weighting factor for JC-CCALF. A search may be performed, for example, to reduce search complexity (for example, while maintaining coding performance).

A rounding offset may be implemented, for example, if a weighting factor is applied in JC-CCALF. Applying a rounding factor may reduce the complexity of JC-CCALF.

Filter coefficient training associated with JC-CCALF may be performed, for example, at an encoder-side. As shown in Equation (18), encoder-side filter coefficient training of JC-CCALF may attempt to approach a target signal of a weighted combination of Cb, Cr residual signals. The weights of Cb, Cr residual signals may not sum to one. The summed weight of $(1+w)/(1+w^2)$ may be larger than one, for example, if $|w|<1$. Clipping may be used to reduce inaccuracy, for example, if the combined target residual signal is beyond a reasonable range of a residual pixel value.

A rounding offset may be used, for example, if the weighting factor is a rational number when used for weighted combination, such as in Equation (18). A rounding offset may improve accuracy.

A non-linear ALF filter may be implemented with clippings. Coding efficiency and/or quality (for example, subjective quality) of a CCALF may be improved.

A rate-distortion (RD) cost biasing operation may be used to support deactivation and/or turning off CCALF for higher QPs for a block-level on/off decision, for example, at the encoder side.

Non-linear ALF filters may be in CCALF (for example, and Cb, Cr chroma ALF may be removed), for example, if CCALF is used, which may reduce complexity with little to no performance loss (for example, due to similar implementation of CCALF and chroma ALF).

Examples disclosed herein may be applicable to CCALF and/or JC-CCALF, unless indicated otherwise.

In various examples (for example, for JC-CCALF), weighting factors larger than one may be replaced with respective close rational magnitude values with power of 2 numbers as denominators. Integer division operations associated with a weighting factor (for example, at decoder-side) may be reduced or eliminated, which may support hardware design.

A weighting factor fast search may be implemented for JC-CCALF, for example, at the encoder side.

A rounding offset may be used/added in the application of a weighting factor of JC-CCALF. A rounding offset may include the use of a weight look-up-table (LUT), for example, as may be defined in accordance with the rounding offse.

One or skill understands that the embodiments related to the first three above mentioned embodiments may be applicable to at least CCALF and JC-CCALF and the remaining four weighting factor related embodiments may not be applicable to CCALF (e.g., may be applicable to JC-CCALF and not CCALF).

Representative Procedures for CCALF that Uses Non-linear Filter and Clipping

In some examples, a linear ALF filter (for example, an 18-tap or an 8-tap filter), for example, for CCALF and/or for JC-CCALF, may be replaced with a non-linear ALF filter with clipping, for example, similar to an ALF. Equation (33) may define the non-linear ALF filter and Equation (32) may define four clipping value tables for luma and chroma.

In an example, a non-linear ALF filter corresponding to a 3×4 diamond shaped 8-tap ALF filter may be prescribed as follows. Aspects related to the non-linear filter may include, for example, one or more of the following:

The array of chroma filter coefficients f[i] and the array of chroma clipping values c[j] may be derived/determined with i=0 . . . 7, j=0 . . . 6, for example, as set forth in Equations (54) and (55).

$$f[i]=JcCcAlf\text{ }Coeff[i] \quad (54)$$

$$c[j]=JcCcAlf\text{Clip}[j] \quad (55)$$

The variable sum may be derived/determined, for example, as set forth in Equations (56) and (57):

$$\text{sum} = f[0]*\text{Clip3}(-c[0],c[0],\text{recPicture}_L[h_x,v_{y+yM1}]-\text{curr})+f[1]*\text{Clip3}(-c[1],c[1],\text{recPicture}_L[h_{x+M1},v_y]-\text{curr})+f[2]*\text{Clip3}(-c[2],c[2],\text{recPicture}_L[h_x,v_y]-\text{curr})+f[3]*\text{Clip3}(-c[3],c[3],\text{recPicture}_L[h_{x+xP1},v_y]-\text{curr})+f[4]*\text{Clip3}(-c[4],c[4],\text{recPicture}_L[h_L[h_{x+yM1},v_{y+yP1}]-\text{curr})+f[5]*\text{Clip3}(-c[5],c[5],\text{recPicture}_L[h_x,v_{y+yP1}]-\text{curr})+f[6]*\text{Clip3}(-c[6],c[6],\text{recPicture}_L[h_{x+xP1},v_{y+yP1}]-\text{curr})+f[7]*\text{Clip3}(-c[7],c[7],\text{recPicture}_L[h_x,v_{y+yP2}]-\text{curr})+(\Sigma_i f[i])*\text{curr with } i=0\ldots 7.$$ (56)

$$\text{sum}=(\text{sum}+64)>>7$$ (57)

where curr may represent the center luma sample corresponding to the concerned current chroma sample location. In some examples, curr may be derived, for example, as set forth in Equation (58).

$$\text{curr}=\text{recPicture}[h_x,v_y]$$ (58)

FIG. 21B is a diagram illustrating examples of luma interpolation for a chroma sample location of 4:2:0 video signal with 2-tap luma interpolation. FIG. 21C is a diagram illustrating examples of luma interpolation for a chroma sample location of 4:2:0 video signal with 6-tap luma interpolation.

Referring to FIGS. 21B and 21C, two examples are shown that use, respectively, a 2-tap and a 6-tap interpolation filter to derive the luma sample (indicated by a bold circle) at the concerned center chroma sample location based on the two neighboring luma samples (indicated by a bold circle in FIG. 21B) or the six neighboring luma samples (indicated by a bold X in FIG. 21C). In some examples (for example, for a 4:2:0 video signal), the chroma location and luma location may not be aligned (for example, exactly aligned). The center luma sample location that corresponds to the concerned chroma sample location may be derived (for example, a derived curr), via interpolation. Other (e.g., any other) interpolation filter may be used in this and/or in other examples, for example, to derive the curr for a 4:2:0 video.

In some examples, a CCALF clipping table may be the same as defined for ALF, (for example, by Equation (32)). In some examples, a CCALF clipping table may be defined and used (for example, different from a clipping table used by ALF). For example, a clipping table may be defined with values from an ALF clipping table, for example, with a scaling factor such as ½ (for example, represented by a right shift operation, such as a right shifted by one). A smaller clipping range may suppress the impact of coding noise. In various examples, multiple non-linear ALF filters with the same shape and the same number of taps may be used together via block-level switching and/or selection for CCALF.

A RD cost biasing procedure may be implemented, for example, for an encoder. In some examples, an RD cost biasing procedure may be implemented when making decisions on a block-level CCALF being on or off (for example, activated or deactivated on a block-by-block basis). Increased and more visible coding artifacts from CCALF at higher QPs may be reduced.

A Lagrangian RD cost (for example, for an encoder mode decision) may be defined, for example, as set forth in Equation (59).

$$J(\text{mode})=R(\text{mode})+\lambda(QP)*D(\text{mode})$$ (59)

where J may be the overall RD cost, mode may be the concerned coding mode, λ may be the Lagrangian multiplier, QP may be the quantization parameter, and D may be the coding distortion of the coding block with the coding mode. A mode may be CCALF on or off for a concerned coding block. A mode of lower RD cost J may be selected, for example, by the encoder to encode a particular block. In some examples, RD cost may be calculated by Equation (59) while CCALF is off (e.g., ccalf_off). In some examples, while CCALF is on (e.g., ccalf_on), the RD cost may be calculated (for example, in a first operation) by Equation (59), which may be multiplied by a biasing factor γ. A biasing factor γ may be equal to 1 for smaller QPs and larger than 1 for larger QPs, for example, to support turning off/deactivating CCALF at higher QPs, which may reduce or avoid increased resultant coding artifacts from CCALF. An example of an implementation with a biasing factor is shown in Equation (60).

$$J'(\text{ccalf\_on})=\gamma(QP)*J(\text{ccalf\_on})$$ (60)

In some examples, γ(QP) may be a piece-wise linear function, for example, as set forth in Equation (61):

$$\gamma(QP) = \begin{cases} 1, & QP < QP_{th1} \\ 1 + \dfrac{\gamma_{max}-1}{QP_{th2}-QP_{th1}} \cdot (QP-QP_{th1}), & QP_{th1} \leq QP \leq QP_{th2} \\ \gamma_{max}, & QP > QP_{th2} \end{cases}$$ (61)

In various examples, $\gamma_{max}$ may be 1.5 or 2, etc., $QP_{th1}$ may be 33 or 35, etc., and $QP_{th2}$ may be 40 or 42, etc. In some examples, these parameters may be determined empirically, such as from a practical testing result.

In some examples, γ(QP) may be defined by a look-up-table (LUT), which may represent a piece-wise non-linear function.

In some examples, multiple ALF filter options may be selectable/available for ccalf_on. Various ccalf_on RD costs may be calculated with a different ALF filter. RD costs may be calculated, for example, based on Equation (59) and/or Equation (62). A ccalf_off RD cost may be (for example, firstly) calculated by Equation (59) and then multiplied by a biasing factor γ, which may be equal to 1 for smaller QPs and may be smaller than 1 for larger QPs, which may support turning off CCALF at higher QPs, for example, to reduce or avoid increased resultant coding artifacts from CCALF. An example of an implementation with a biasing factor is shown in Equation (62).

$$J'(\text{ccalf\_off})=\gamma(QP)*J(\text{ccalf\_off})$$ (62)

In some examples, γ(QP) may be a piece-wise linear function, for example, as set forth in Equation (63):

$$\gamma(QP) = \begin{cases} 1, & QP < QP_{th1} \\ 1 - \dfrac{1-\gamma_{min}}{QP_{th2}-QP_{th1}} \cdot (QP-QP_{th1}), & QP_{th1} \leq QP \leq QP_{th2} \\ \gamma_{min}, & QP > QP_{th2} \end{cases}$$ (63)

In various examples, $\gamma_{min}$ may be 0.75, or 0.5, etc., $QP_{th1}$ may be 33 or 35, etc., and $QP_{th2}$ may be 40 or 42, etc. In some examples, these parameters may be determined empirically, such as from a practical testing result.

Chroma ALF may be disabled, for example, if CCALF or JC-CCALF is applied with non-linear ALF filters. In some examples, a procedure may be implemented to remove/disable chroma ALF, for example, based on a condition that CCALF or JC-CCALF is being applied using non-linear ALF filters for chroma (Cb, Cr) components. For example, the "ALF Cb" and "ALF Cr" modules in FIG. 19 and FIG. 21A may be removed while other details or modules may be maintained (for example, unchanged). In some examples, the signaling and processes related to chroma ALF may be removed, such as the chroma ALF filter flags and parameters, block level on/off control flag maps for Cb, Cr components, etc.

In some examples, a division (for example, a decoder-side division) may be removed due to a JC-CCALF weighting factor. A JC-CCALF may, for example, use weight magnitude values of (¼, ½, ¾, 1, 4, 2, 4/3) or (⅛, ¼, ⅜, ½, ⅝, ¾, ⅞, 1, 8, 4, 8/3, 2, 8/5, 4/3, 8/7), respectively, for maximum weight magnitude values of 4 or 8. In some examples, division of 3, 5, 7 may be conducted for the weight magnitude value of 4/3, 8/5, 8/7, for example, if the weighting factor is applied to the chroma refinement signal at the decoder side. Division may be undesirable for a hardware implementation.

In some examples, a procedure may be implemented to replace larger-than-one weight magnitude values with larger-than-one odd numbers as a denominator with close rational values that have $2^N$ numbers as denominator, where N may be a positive integer. For example, 4/3, 8/5, 8/7 may be replaced with 5/4, 7/4, 9/8, respectively, which may replace division by 3, 5, 7 with right shifts by 2, 2, 3, respectively, which may be easier to implement in hardware.

In various examples, a larger-than-one rational weight magnitude value may be P/Q, where P, Q may be positive integers, P may be a maximum weight magnitude value, Q may be a larger-than-one value less than P, and Q may not be a power of 2. P/Q may be replaced by $(P+\Delta)/(Q+\Delta)$, where $\Delta$ may be an integer (for example, either positive or negative), and $|\Delta|$ may be a smallest or minimum adjustment so that $\log_2(Q+\Delta)$ may be an integer.

A fast search algorithm/procedure for a JC-CCALF weighting factor may be implemented, for example, at the encoder side. Potential weight values (e.g., all potential weight values) may be prioritized, and searched from the first to the last prioritized weight value. In various examples, an order or a priority of a weighting factor may be determined, for example, by a frequency of usage when the weighting factor is (for example, exhaustively) searched at the encoder side, for example, based on a test set sequence. A search may be terminated (for example, terminated early), for example, if there are a certain number of consecutive searched weight values (for example, two consecutive searched weight values) that do not yield an RD cost reduction. In some examples, a video-processing-apparatus (for example, an encoder) selected (and thus coded) weight value of a previous obtained (for example, coded) slice of a same slice type as the type of a current slice may be put into a first place (for example, set to the highest priority) of a weight search list. In some examples, a video-processing-apparatus selected (and thus coded) weight values of previous obtained slices of multiple (for example, all) slice types may be put into a beginning (for example, set to the highest priorities) of a weight search list, with the selected weight value of the previous coded slice of the same slice type as the current slice put into the first place (for example, set to the highest priority). The video processing apparatus may include an encoder.

A rounding offset may be used, for example, when applying a weighting factor in JC-CCALF. In some examples, a rounding offset may be added in the application of a weighting factor of JC-CCALF. In some examples (such as, for a max weight of four), an original weighting factor of 4/3 may be replaced with and/or adjusted to 3/2, for example, using a rounding operation (for example, as disclosed herein). In some examples, a weighting factor of 4/3 may be replaced with and/or may be adjusted to 5/4. For example, a specification may include {JcCcAlfWLut[k], k=1 . . . 7}={1, 2, 3, 4, 16, 8, 5}.

Slice header semantics may include, for example, a slice_joint_chroma_cross_component_alf_weight_sign_flag, where a flag value equal to 1 may specify that the joint chroma cross component weight factor JcCcAlfWeightFactor is larger than 0 and a flag value equal to 0 may specify that JcCcAlfWeightFactor is less than 0. A slice_joint_chroma_cross_component_alf_weight_index may specify the magnitude of JcCcAlfWeightFactor, where an index value may not be equal to 0. In an example, the JcCcAlfWeightFactor may be set to JcCcAlfWLut[slice_joint_chroma_cross_component_alf_weight_index] with {JcCcAffWLut[k], k=1 . . . 7}{1, 2, 3, 4, 16, 8, 6}, for example, if slice_joint_chroma_cross_component_alf_weight_sign_flag is equal to 0. The JcCcAlfWeightFactor may be set to JcCcAlfWLut[slice_joint_chroma_cross_component_alf_weight_index], for example, if otherwise.

The variable sum may be derived for the joint chroma cross component filtering process for a block of Cb and Cr chroma samples, for example, in accordance with Equations (64) and (65).

$$\text{sum}=f[0]*\text{recPicture}_L[h_x,v_{y+yM1}]+f[1]*\text{recPicture}_L[h_{x+xM1},v_y]+f[2]*\text{recPicture}_L[h_x,v_y]+f[3]*\text{recPicture}_L[h_{x+xP1},v_y]+f[4]*\text{recPicture}_L[h_{x+xM1},v_{y+yP1}]+f[5]*\text{recPicture}_L[h_x,v_{y+yP1}]+f[6]*\text{recPicture}_L[h_{x+xP1},v_{y+yP1}]+f[7]*\text{recPicture}_L[h_x,v_{y+yP2}] \quad (64)$$

$$\text{sum}=(\text{sum}+64)>>7 \quad (65)$$

The modified filtered reconstructed Cb picture sample array jcCcAlfPictureCb[xC+x][yC+y] may be derived, for example, if alf_joint_chroma_cross_component_cb_flag is equal to 1, in accordance with Equation (66).

$$jcCcAlf\text{Picture}_{Cb}[xC+x][yC+y]=\text{Clip3}(0,(1<<\text{BitDepth}_C)-1,\text{curr}_{Cb}+\text{sum}) \quad (66)$$

The modified filtered reconstructed Cr picture sample array jcCcAlfPictureCr[xC+x][yC+y] may be derived, for example, if alf_joint_chroma_cross_component_cr_flag is equal to 1, in accordance with Equation (67).

$$jcCcAlf\text{Picture}_{c}[xC+x][yC+y]=\text{Clip3}(0,(1<<\text{BitDepth}_C)-1,\text{curr}_{Cr}+((\text{sum}*JcCcAlf\text{WeightFactor}+2)>>2)) \quad (67)$$

Filter coefficient training may be implemented for JC-CCALF, for example, at an encoder-side. In some examples, a rounding offset and dipping may be added, for example, if calculating a target residual signal with the weighting factor in the encoder-side filter coefficient training operation.

The calculation may be changed/modified as set forth in Equation (68) and Equation (69) (for example, with a rounding offset added), for example, when calculating target refinement signal via Equation (46).

$$tgt\_ccalf=(w\text{Denom}*(esCb*w\text{Denom}+w\text{Sign}*w\text{Numer}*resCr)+(\Omega>>1))/\Omega \quad (68)$$

$$\Omega=w\text{Denom}^2+w\text{Numer}^2 \quad (69)$$

where wSign, wDenom, wNumer denote, respectively, a sign, a denominator and a numerator of the weighting factor.

In some examples, the max weight may be four, wDenom may be four, and wNumer may be from the same {JcCcAlfWLut[k], k=1.7}, for example, as disclosed herein.

A target refinement signal may be dipped or further dipped, for example, if wNumer<wDenom, in accordance with Equation (70).

$$tgt\_ccalf=\text{Clip3}(-(1<<\text{BitDepth}_C)+1,(1<<\text{BitDepth}_C)-1,tgt\_ccalf) \quad (70)$$

where $\text{BitDepth}_C$ may represent the bit depth of a chroma componen.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement one or more examples herein. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Cross-component ALF may be implemented in a method, an apparatus and/or a system. Methods may be implemented (e.g., in whole or in part), for example, by one or more devices, apparatuses, and/or systems, which may comprise one or more processors configured to execute the methods (e.g., in whole or in part) as computer executable instructions that may be stored on a computer readable medium or a computer program product, that, when executed by the one or more processors, performs the methods. The computer readable medium or the computer program product may comprise instructions that cause one or more processors to perform the methods by executing the instructions.

In examples, a method (e.g., of coding and/or decoding video) may include generating a residual coefficient block, dequantizing the residual coefficient block, and inverse transforming the dequantized residual coefficient block to generate a coding block. The method may include, for example, performing cross-component ALF on the coding block using, for example, one of a linear adaptive loop filter or a non-linear adaptive loop filter to generate a refinement block, and determining a modified (for example, refined) reconstruction based on the refinement block.

The cross-component adaptive loop filtering may be, for example, one of a cross-component ALF (CCALF) or a joint chroma CCALF (JC-CCALF).

The method may include, for example, disabling chroma ALF on condition that the non-linear adaptive loop filter is used for the cross-component ALF, and enabling chroma ALF on condition that the linear adaptive loop filter is used for the cross-component ALF.

The performing of CCALF on the coding block may use, for example, the non-linear adaptive loop filter to generate a refinement block. The method may include, for example, determining a center luma sample location corresponding to a plurality of neighboring chroma sample locations, via and interpolation operation, and generating the refinement block using the determined center luma sample location.

The performing of the cross-component adaptive loop filtering may include, for example, clipping for luma and chroma components using values derived from some (for example, existing) ALF clipping tables.

The performing of the cross component ALF on the coding block may use, for example, a plurality of any of one or more linear adaptive loop filters and/or one or more non-linear adaptive loop filters to generate a refinement block.

The method may include, for example, selecting for a (e.g., each) coding block, one of an adaptive loop filter from a set of candidate adaptive loop filters or no adaptive loop filters, as a selection result, and determining an index value associated with the selection result.

The method may include, for example, indexing or reindexing values associated with the candidate adaptive loop filters based on frequency of the candidate adaptive loop filters for use with the coding blocks, determining an RD cost value associated with one coding block based on the indexed or reindexed values associated with candidate adaptive loop filters, and selectively performing cross-component ALF using the selected candidate adaptive loop filter on the coding block based on the determined RD cost value associated with the coding uni.

The method may include, for example, iteratively changing filter weights of the candidate adaptive loop filters to optimize one or more candidate adaptive loop filters, as a filter optimization operation along with performing an indexing or reindexing operation.

A method (e.g., of coding) may include, for example, generating a residual coefficient block, dequantizing the residual coefficient block, and inverse transforming the dequantized residual coefficient block to generate a coding block. The method may include, for example, determining an RD cost value associated with the coding block, and selectively performing cross-component ALF on the coding block based on the RD cost value associated with the coding block, which may be implemented, for example, by calculating a non-linear biasing factor based on a determined QP value, and determining whether to perform the cross-component ALF on the coding block based on the non-linear biasing factor biased RD cost.

Selectively performing the cross-component ALF on the coding block may include, for example, performing the cross-component ALF on the coding block on condition that a first biased RD cost value is determined and not performing the cross-component ALF on the coding block on condition that a second biased RD cost value is determined. The second biased RD cost value may be larger than the first biased RD cost value.

A method (e.g., of decoding video) may include, for example, generating a residual coefficient block, dequantizing the residual coefficient block, and inverse transforming the dequantized residual coefficient block to generate a coding block. The method may include, for example, performing Joint Chroma Cross-Component Adaptive Loop Filtering (JC-CCALF) on the coding block to generate a refinement block, which may be implemented, for example, by determining weight magnitude values associated with the coding block, adjusting one or more weight magnitude values associated with the coding block to closest values to eliminate one or more division operations for the JC- CCALF, and determining the refinement reconstruction using the adjusted one or more magnitude values via right-shifting operations.

Performing the JC-CALF on the coding block may include, for example, replacing a weight magnitude value that is larger than one involving a larger than one odd number as a denominator with a closest rational value that is a 2^N number as the denominator, and modifying the numerator with the same amount of adjustment as that of the denominator, where N is a positive integer.

Adjusting the one or more weight magnitude values may include adding a rounding offset and using a look-up-table of the weighting factor numerator magnitude values.

A method (e.g., of coding video) may include, for example, generating a residual coefficient block, dequantizing the residual coefficient block, and inverse transforming the dequantized residual coefficient block to generate a coding block. The method may include, for example, performing Joint Chroma Cross-Component Adaptive Loop Filtering (JC-CCALF) on the coding block to generate a refinement block, which may be implemented, for example, by determining or obtaining candidate weight magnitude values associated with the coding block, adjusting one or more candidate weight magnitude values associated with the coding block to closest values to eliminate one or more division operations for the JC-CCALF, prioritizing the adjusted candidate weight magnitude values, performing a selection of one weight magnitude value from the adjusted candidate weight magnitude values in an order based on the priority of the adjusted candidate weight magnitude values in accordance with one or more selection rules, and determining the refinement reconstruction using the selected adjusted weight magnitude value.

The method may include, for example, calculating a target residual signal using a weighting factor during a filter coefficient training operation. The calculated target residual signal may be derived from, based on, or include a rounding offset and clipping associated with the weighting factor.

A method (e.g., of coding video) may include, for example, generating a residual coefficient block, dequantizing the residual coefficient block, and inverse transforming the dequantized residual coefficient block to generate a coding block, determining a RD cost value associated with the coding block. The method may include, for example, selectively performing cross-component Adaptive Loop Filtering on the coding block based on the RD cost value associated with the coding block, which may be implemented, for example, by determining whether to perform the cross-component Adaptive Loop Filtering on the coding block based on RD cost values associated with a plurality of candidate cross-component Adaptive Loop Filters, and selecting one cross-component Adaptive Loop Filter from the candidate cross-component Adaptive Loop Filters, on condition that cross-component Adaptive Loop Filtering is to be performed on the coding block.

The method may include, for example, indexing or reindexing values associated with candidate cross component Adaptive Loop Filters based on frequency of selection of the cross component Adaptive Loop Filter for the coding blocks, determining (e.g., at each iteration) the RD cost value associated with the coding block based on the indexed or reindexed values associated with selected cross-component Adaptive Loop Filter, and terminating the indexing or reindexing of the values, on condition that an ealy termination condition associated with more than one increase to the RD cost value is satisfied.

Figure 23:
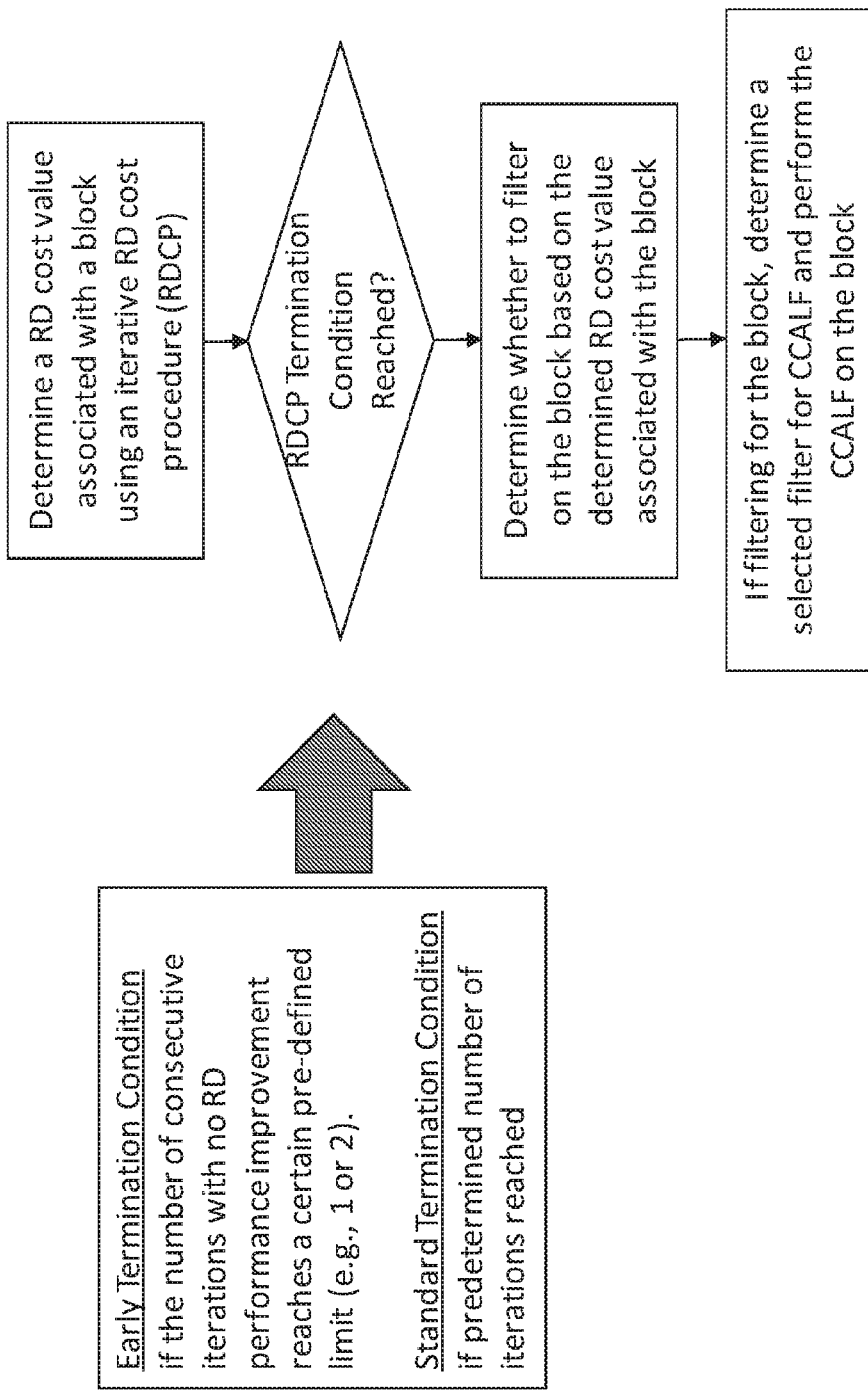
FIG. 23 illustrates an example method for multi-pass iterative RD optimized (RDO) filter on/off.

A method, for example, as shown in FIG. 23, may include or implement multi-pass iterative RDO that may turn a CCALF filter on/off. For example, an iterative RDO process may be terminated if a total number of iterations exceeds a (e.g., predefined) limit (for example, 5 or 10 iterations). Termination (for example, early termination) may occur if the number of consecutive iterations without a threshold level of RD performance improvement exceeds a certain (for example, a predefined) limit (for example, one or two iterations without improvement). FIG. 23 illustrates an example method for multi-pass iterative RD optimized (RDO) filter on/off. A method (for example, for encoding) may include, for example, one or more of the following: determining an RD cost value associated with a block using an iterative RD cost procedure; terminating the iterative RD cost procedure based on an early termination condition for which a number of consecutive iterations exist with RD performance improvement below a pre-defined limit; determining whether to perform filtering on the block based on the determined RD cost value associated with the block after termination of the iterative RD cost procedure; on condition that filtering is to be performed, determining a selected filter of a plurality of candidate filters for CCALF; and/or performing the CCALF on the block using the selected filter.

Figure 22:
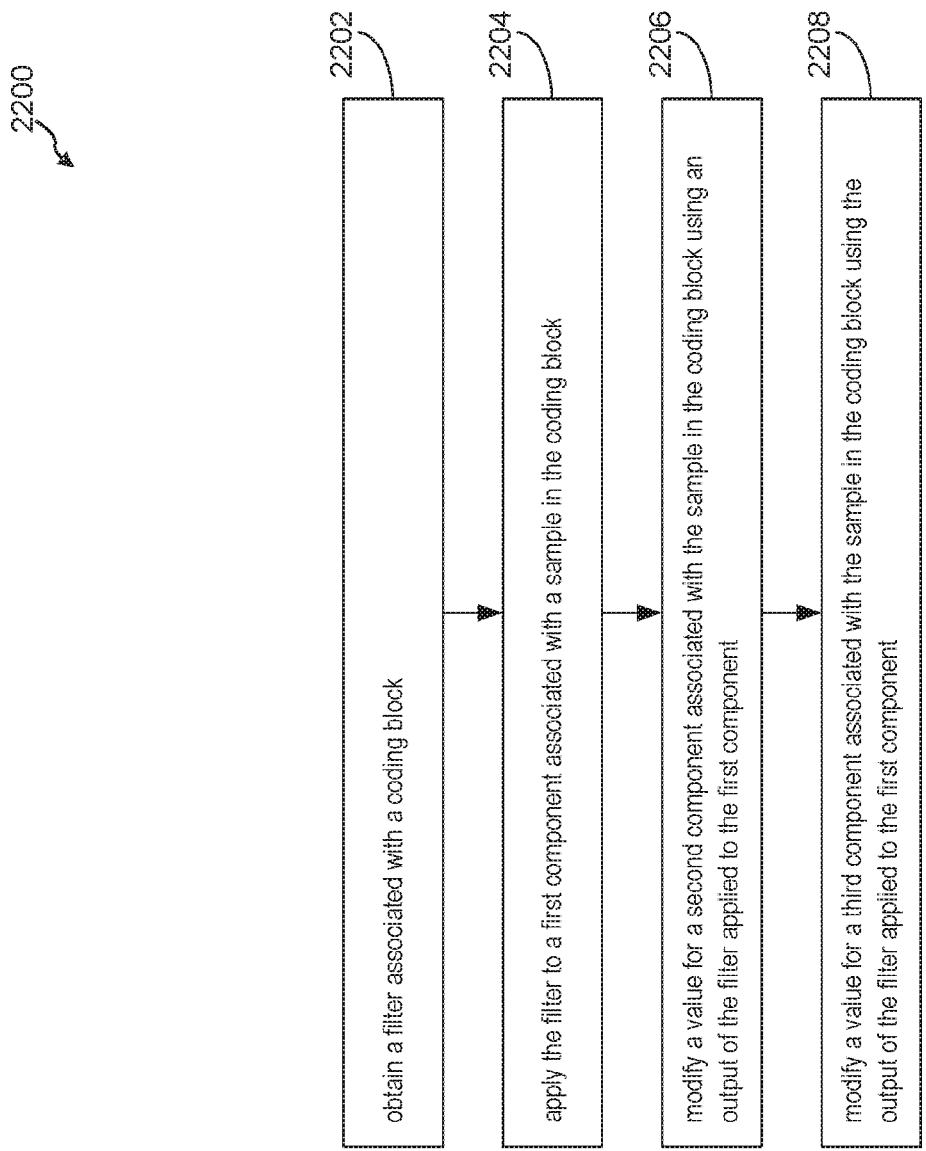
FIG. 22 illustrates an example of a method for applying a filter to one or more components and modifying values for one or more other components.

FIG. 22 illustrates an example of a method for applying a filter to one or more components and modifying (for example, refining) values for one or more other components. Examples disclosed herein and other examples may operate in accordance with example method 2200 shown in FIG. 22. Method 2200 comprises 2202-2208. In 2202, a filter associated with a coding block may be obtained, for example, based on a filter coefficient(s) received in an APS as described herein. In 2204, the filter may be applied to a first component associated with a sample in the coding block, for example, as shown in FIG. 9, FIG. 16A, and FIG. 18. In 2206, a value for a second component associated with the sample in the coding block may be modified using an output of the filter applied to the first component, for example, as shown in FIG. 9, FIG. 16A, and FIG. 18. In 2208, a value for a third component associated with the sample in the coding block may be modified using an output of the filter applied to the first component, for example, as shown in FIG. 9, FIG. 16A, and FIG. 18.

Many embodiments are described herein. Features of embodiments may be provided alone or in any combination, across various claim categories and types. Further, embodiments may include one or more of the features, devices, or aspects described herein, alone or in any combination, across various claim categories and types, such as, for example, any of the following:

A decoder may obtain a filter associated with a coding block. The decoder may obtain the filter, coefficients, weighting factors, etc. to use for decoding the coding block. The decoder may determine which component(s) to filter and which component value(s) to derive for decoding the coding block. A decoder, such as example decoder 300 operating in accordance with the example method shown in FIG. 22, may determine which filter, coefficients, weighting factors, etc. to use, which component(s) to filter, and which component value(s) to derive for decoding the coding block. A decoder, such as example decoder 300 operating in accordance with the example method shown in FIG. 22, may decode the coding block using the filter, coefficients, weighting factors, selected or dominant component(s) for filtering, and component value(s) for derivation. The decoder may apply the filter to a first component associated with a sample in the coding block, for example, as shown in FIG. 9, FIG.

16A, and FIG. 18. The decoder may modify a value for a second component associated with the sample in the coding block using an output of the filter applied to the first component and modify a value for a third component associated with the sample in the coding block using the output of the filter applied to the first component, for example, as shown in FIG. 9, FIG. 16A, and FIG. 18. The decoder may obtain a weighting factor associated with the third component, for example, as shown in FIG. 9, FIG. 16A, and FIG. 18. The decoder may apply the weighting factor to the output of the filter to generate a weighted filter output, for example, as shown in FIG. 9, FIG. 16A, and FIG. 18. The decoder may modify the value for the third component associated with the sample in the coding block using the weighted filter output, for example, as shown in FIG. 9, FIG. 16A, and FIG. 18. The decoder may reconstruct a value for the first component and obtaining a refinement signal for the second component and for the third component based on a difference between the output of the filter and the value for the first component before the value for the first component is filtered using the filter, for example, as shown in FIG. 16A. The decoder may reconstruct a value for the first component, the value for the second component, and the value for the third component for the sample in the coding block and obtain a refinement signal for the second component and for the third component based on a difference between the output of the filter and the value for the first component before the value for the first component is filtered using the filter, for example, as shown in FIG. 16A. The decoder may obtain a first weighting factor associated with the second component, for example, as shown in FIG. 16A. The decoder may determine a first weighted refinement signal based on the first weighting factor and the refinement signal, for example, as shown in FIG. 16A. The decoder may obtain a second weighting factor associated with the third component, for example, as shown in FIG. 16A. The decoder may determine a second weighted refinement signal based on the second weighting factor and the refinement signal, for example, as shown in FIG. 16A. The decoder may modify the value for the second component using the first weighted refinement signal and modify the value for the third component using the second weighted refinement signal, for example, as shown in FIG. 16A. The decoder may obtain a CCALF filter associated with a coding block, for example, as shown in FIG. 9 and FIG. 18. The decoder may obtain a sample in the coding block comprising a first (luma) component, a second (chroma) component and a third (chroma) component, for example, as shown in FIG. 9 and FIG. 18. The decoder may obtain a chroma ALF associated with the second component and the third component, for example, as shown in FIG. 9. The decoder may apply the chroma ALF to the second component and the third component to generate the value for the second component and the value for the third component, for example, as shown in FIG. 9. The decoder may obtain a weighting factor associated with the third component, for example, as shown in FIG. 9. The decoder may apply the weighting factor to the output of the filter to generate a weighted filter output, for example, as shown in FIG. 9. The decoder may modify the value for the third component using the weighted filter output, for example, as shown in FIG. 9. The decoder may apply a CCALF to a first component associated with a sample in a coding block and not filter a value for a second or a third component associated with the sample with a chroma ALF, for example, as shown in FIG. 18. The decoder may filter one or more of a plurality of or a set of components (for example, a first component) associated with a sample in a coding block and obtain (for example, modifying) component values for one or more of the plurality or the set of components (for example, second and third components) using an output generated by filtering the one or more of the plurality of or the set of components, for example, as shown in FIG. 9, FIG. 16A, and FIG. 18.

Decoding tools and techniques including one or more of entropy decoding, inverse quantization, inverse transformation, and differential decoding may be used to enable the method as described in FIG. 22 in the decoder. These decoding tools and techniques may be used to enable one or more of obtaining a filter associated with a coding block, according to the method described in FIG. 22, in one or more of FIG. 9, FIG. 16A, FIG. 18, and/or as otherwise described herein; applying the filter to a first component associated with a sample in the coding block according to the method as described in FIG. 22, in one or more of FIG. 9, FIG. 16A, FIG. 18, and/or as otherwise described herein; modifying a value for a second component associated with the sample in the coding block using an output of the filter applied to the first component, according to the method as described in FIG. 22, in one or more of FIG. 9, FIG. 16A, FIG. 18, and/or as otherwise described herein; modifying a value for a third component associated with the sample in the coding block using the output of the filter applied to the first component, according to the method as described in FIG. 22, in one or more of FIG. 9, FIG. 16A, FIG. 18, and/or as otherwise described herein; generating and sending information which may indicate filter(s), coefficients, selected or dominant component(s), applied filter output, weighting factors, etc., according to the method as described in FIG. 22, in one or more of FIG. 9, FIG. 16A, FIG. 18, and/or as otherwise described herein; obtaining a weighting factor associated with the third component, according to the method as described in FIG. 22, in one or more of FIG. 9, FIG. 16A, FIG. 18, and/or as otherwise described herein; applying the weighting factor to the output of the filter to generate a weighted filter output, according to the method as described in FIG. 22, in one or more of FIG. 9, FIG. 16A, FIG. 18, and/or as otherwise described herein; modifying the value for the third component associated with the sample in the coding block using the weighted filter output, according to the method as described in FIG. 22, in one or more of FIG. 9, FIG. 16A, FIG. 18, and/or as otherwise described herein; reconstructing a value for the first component and obtaining a refinement signal for the second component and for the third component based on a difference between the output of the filter and the value for the first component before the value for the first component is filtered using the filter, according to the method as described in FIG. 22, in one or more of FIG. 16A, and/or as otherwise described herein; reconstructing a value for the first component, the value for the second component, and the value for the third component for the sample in the coding block, according to the method as described in FIG. 22, in FIG. 16A, and/or as otherwise described herein; obtaining a refinement signal for the second component and for the third component based on a difference between the output of the filter and the value for the first component before the value for the first component is filtered using the filter, according to the method as described in FIG. 22, in FIG. 16A, and/or as otherwise described herein; obtaining a first weighting factor associated with the second component, according to the method as described in FIG. 22, in FIG. 16A, and/or as otherwise described herein; determining a first weighted refinement signal based on the first weighting factor and the refinement signal, according to the method as described in FIG. 22, in FIG. 16A, and/or as otherwise described herein; obtaining a second weighting factor associated with the third component, according to the method as described in FIG. 22, in FIG. 16A, and/or as otherwise described herein; determining a second weighted refinement signal based on the second weighting factor and the refinement signal, according to the method as described in FIG. 22, in one or more of FIG. 16A, and/or as otherwise described herein; modifying the value for the second component using the first weighted refinement signal, and modifying the value for the third component using the second weighted refinement signal, according to the method as described in FIG. 22, in FIG. 16A, and/or as otherwise described herein; obtaining a CCALF filter associated with a coding block, according to the method as described in FIG. 22, in FIG. 9, and/or as otherwise described herein; obtaining a sample in the coding block comprising a first (luma) component, a second (chroma) component and a third (chroma) component, according to the method as described in FIG. 22, in FIG. 9, and/or as otherwise described herein; obtaining a chroma ALF associated with the second component and the third component, according to the method as described in FIG. 22, in FIG. 9, and/or as otherwise described herein; applying the chroma ALF to the second component and the third component to generate the value for the second component and the value for the third component, according to the method as described in FIG. 22, in FIG. 9, and/or as otherwise described herein; obtaining a weighting factor associated with the third component, according to the method as described in FIG. 22, in FIG. 9, and/or as otherwise described herein; applying the weighting factor to the output of the filter to generate a weighted filter output, according to the method as described in FIG. 22, in FIG. 9, and/or as otherwise described herein; modifying the value for the third component using the weighted filter output, according to the method as described in FIG. 22, in FIG. 9, and/or as otherwise described herein; applying a CCALF to a first component associated with a sample in a coding block and not filtering a value for a second or a third component associated with the sample with a chroma ALF, according to the method as described in FIG. 22, in FIG. 18, and/or as otherwise described herein; and/or filtering one or more of a plurality of or a set of components (for example, a first component) associated with a sample in a coding block and obtaining (for example, modifying) component values for one or more of the plurality or the set of components (for example, second and third components) using an output generated by filtering the one or more of the plurality of or the set of components, according to the method as described in FIG. 22, in one or more of FIG. 9, FIG. 16A, FIG. 18, and/or as otherwise described herein; and other decoder behaviors that are related to any of the above.

An encoder may determine a filter for a coding block. The encoder may obtain the filter. An encoder may determine which component(s) are and/or are not selected or dominant and/or which filters, filter coefficients, and weighting factors are active for filtering and/or derivation of component values. A n encoder, such as example encoder 200), operating in accordance with the example method shown in FIG. 22, may determine to filter one or more selected or dominant component(s) and derive values for one or more other components based on the filter application in accordance with the determination(s). The encoder may encode the coding block using the filter, coefficients, weighting factors, selected or dominant component(s) for filtering, and component value(s) for derivation, for example, as shown in FIG. 9, FIG. 16A, and FIG. 18. The encoder may apply the filter to a first component associated with a sample in the coding block, for example, as shown in FIG. 9, FIG. 16A, and FIG. 18. The encoder may modify a value for a second component associated with the sample in the coding block using an output of the filter applied to the first component and modify a value for a third component associated with the sample in the coding block using the output of the filter applied to the first component, for example, as shown in FIG. 9, FIG. 16A, and FIG. 18. The encoder may obtain a weighting factor associated with the third component, for example, as shown in FIG. 9, FIG. 16A, and FIG. 18. The encoder may apply the weighting factor to the output of the filter to generate a weighted filter output, for example, as shown in FIG. 9, FIG. 16A, and FIG. 18. The encoder may modify the value for the third component associated with the sample in the coding block using the weighted filter output, for example, as shown in FIG. 9, FIG. 16A, and FIG. 18. The encoder may reconstruct a value for the first component and obtaining a refinement signal for the second component and for the third component based on a difference between the output of the filter and the value for the first component before the value for the first component is filtered using the filter, for example, as shown in FIG. 16A. The encoder may reconstruct a value for the first component, the value for the second component, and the value for the third component for the sample in the coding block, for example, as shown in FIG. 16A. The encoder may obtain a refinement signal for the second component and for the third component based on a difference between the output of the filter and the value for the first component before the value for the first component is filtered using the filter, for example, as shown in FIG. 16A. The encoder may obtain a first weighting factor associated with the second component, for example, as shown FIG. 16A. The encoder may determine a first weighted refinement signal based on the first weighting factor and the refinement signal, for example, as shown in FIG. 16A. The encoder may obtain a second weighting factor associated with the third component, for example, as shown in FIG. 16A. The encoder may determine a second weighted refinement signal based on the second weighting factor and the refinement signal, for example, as shown in FIG. 16A. The encoder may modify the value for the second component using the first weighted refinement signal and modify the value for the third component using the second weighted refinement signal, for example, as shown in FIG. 16A. The encoder may obtain a CCALF filter associated with a coding block, for example, as shown in FIG. 9 and FIG. 18. The encoder may obtain a sample in the coding block comprising a first (luma) component, a second (chroma) component and a third (chroma) component, for example, as shown in FIG. 9. The encoder may obtain a chroma ALF associated with the second component and the third component, for example, as shown in FIG. 9. The encoder may apply the chroma ALF to the second component and the third component to generate the value for the second component and the value for the third component, for example, as shown in FIG. 9. The encoder may obtain a weighting factor associated with the third component, for example, as shown in FIG. 9. The encoder may apply the weighting factor to the output of the filter to generate a weighted filter output, for example, as shown in FIG. 9. The encoder may modify the value for the third component using the weighted filter output, for example, as shown in FIG. 9. The encoder may apply a CCALF to a first component associated with a sample in a coding block and not filter a value for a second or a third component associated with the sample with a chroma ALF, for example, as shown in FIG.

18. The encoder may filter one or more of a plurality of or a set of components (for example, a first component) associated with a sample in a coding block and obtain (for example, modify) component values for one or more of the plurality or the set of components (for example, second and third components) using an output generated by the one or more of the plurality of or the set of components, for example, as shown in FIG. 9, FIG. 16A, and FIG. 18.

Encoding tools and techniques including one or more of quantization, entropy coding, inverse quantization, inverse transformation, differential coding, and filtering may be used to enable the method as described in FIG. 22 in the encoder. These encoding tools and techniques may be used to enable one or more of obtaining a filter associated with a coding block, according to the method described in FIG. 22, in one or more of FIG. 9, FIG. 16A, FIG. 18, and/or as otherwise described herein, applying the filter to a first component associated with a sample in the coding block according to the method as described in FIG. 22, in one or more of FIG. 9, FIG. 16A, FIG. 18, and/or as otherwise described herein; modifying a value for a second component associated with the sample in the coding block using an output of the filter applied to the first component, according to the method as described in FIG. 22, in one or more of FIG. 9, FIG. 16A, FIG. 18, and/or as otherwise described herein; modifying a value for a third component associated with the sample in the coding block using the output of the filter applied to the first component, according to the method as described in FIG. 22, in one or more of FIG. 9, FIG. 16A, FIG. 18, and/or as otherwise described herein; generating and sending parameter sets, such as SPS and CCPS, which may indicate filter(s), coefficients, selected or dominant component(s), applied filter output, weighting factors, etc., according to the method as described in FIG. 22, in one or more of FIG. 9, FIG. 16A, FIG. 18, and/or as otherwise described herein; obtaining a weighting factor associated with the third component, according to the method as described in FIG. 22, in one or more of FIG. 9, FIG. 16A, FIG. 18, and/or as otherwise described herein; applying the weighting factor to the output of the filter to generate a weighted filter output, according to the method as described in FIG. 22, in one or more of FIG. 9, FIG. 16A, FIG. 18, and/or as otherwise described herein; modifying the value for the third component associated with the sample in the coding block using the weighted filter output, according to the method as described in FIG. 22, in one or more of FIG. 9, FIG. 16A, FIG. 18, and/or as otherwise described herein; reconstructing a value for the first component and obtaining a refinement signal for the second component and for the third component based on a difference between the output of the filter and the value for the first component before the value for the first component is filtered using the filter, according to the method as described in FIG. 22, in one or more of FIG. 9, FIG. 16A, FIG. 18, and/or as otherwise described herein; reconstructing a value for the first component, the value for the second component, and the value for the third component for the sample in the coding block, according to the method as described in FIG. 22, in FIG. 16A, and/or as otherwise described herein; obtaining a refinement signal for the second component and for the third component based on a difference between the output of the filter and the value for the first component before the value for the first component is filtered using the filter, according to the method as described in FIG. 22, in FIG. 16A, and/or as otherwise described herein; obtaining a first weighting factor associated with the second component, according to the method as described in FIG. 22, in FIG. 16A, and/or as otherwise described herein; determining a first weighted refinement signal based on the first weighting factor and the refinement signal, according to the method as described in FIG. 22, in FIG. 16A, and/or as otherwise described herein; obtaining a second weighting factor associated with the third component, according to the method as described in FIG. 22, in FIG. 16A, and/or as otherwise described herein; determining a second weighted refinement signal based on the second weighting factor and the refinement signal, according to the method as described in FIG. 22, in FIG. 16A, and/or as otherwise described herein; modifying the value for the second component using the first weighted refinement signal, and modifying the value for the third component using the second weighted refinement signal, according to the method as described in FIG. 22, in one or more of FIG. 16A, and/or as otherwise described herein; obtaining a CCALF filter associated with a coding block, according to the method as described in FIG. 22, in one or more of FIG. 9, FIG. 18, and/or as otherwise described herein; obtaining a sample in the coding block comprising a first (luma) component, a second (chroma) component and a third (chroma) component, according to the method as described in FIG. 22, in one or more of FIG. 9, FIG. 18, and/or as otherwise described herein; obtaining a chroma ALF associated with the second component and the third component, according to the method as described in FIG. 22, in FIG. 9, and/or as otherwise described herein; applying the chroma ALF to the second component and the third component to generate the value for the second component and the value for the third component, according to the method as described in FIG. 22, in FIG. 9, and/or as otherwise described herein; obtaining a weighting factor associated with the third component, according to the method as described in FIG. 22, in one or more of FIG. 9, FIG. 16A, FIG. 18, and/or as otherwise described herein; applying the weighting factor to the output of the filter to generate a weighted filter output, according to the method as described in FIG. 22, in one or more of FIG. 9, FIG. 16A, FIG. 18, and/or as otherwise described herein; modifying the value for the third component using the weighted filter output, according to the method as described in FIG. 22, in one or more of FIG. 9, FIG. 16A, FIG. 18, and/or as otherwise described herein; applying a CCALF to a first component associated with a sample in a coding block and not filtering a value for a second or a third component associated with the sample with a chroma ALF, according to the method as described in FIG. 22, in FIG. 18, and/or as otherwise described herein; and/filtering one or more of a plurality of or a set of components (for example, a first component) associated with a sample in a coding block and obtaining (for example, modifying) component values for one or more of the plurality or the set of components (for example, second and third components) using an output generated by filtering the one or more of the plurality of or the set of components, according to the method as described in FIG. 22, in one or more of FIG. 9, FIG. 16A, FIG. 18, and/or as otherwise described herein; and other encoder behaviors that are related to any of the above.

A syntax element(s), such as syntax elements shown in Tables 2, 3 and 7, may be inserted in the signaling, for example, to enable the decoder to identify an indication of filter(s), coefficients, selected or dominant component(s), applied filter output, weighting factors, etc. to perform the decoding method as described in FIG. 22. For example, the syntax elements may include an indication of one or more of a video signal comprising luma and chroma components, prediction signals, a coding unit size, residuals (such as, a joint residual block for Cb and Cr blocks), selected dominant components (such as, variable vff_direct_applied_component), offset signals, weighting factors (such as, fixed or variable values), refinement signals (such as a filtered output for a filter applied to a selected/dominant component), flags (such as, an MPM flag, block-level CCALF on/off flags, a flag indicating whether to apply ALF to a luma CTB), maps (such as, an on/off block map), variables (such as, variable vff_direct_applied_component or vff_not_direct_applied_component), parameters (such as, ALF or CCALF filter parameters, SAO parameters), filters (such as, filter sets, an ALF and/or a CCALF filter), coefficients (such as, luma and chroma filter coefficients, central position coefficients), LUTs, indexes (such as, a weight value index, a filter set index, an LFNST index, clipping value indexes), for example, to indicate to the decoder which component(s) are dominant and which filter and/or set of coefficients to use in decoding. As an example, and/or an indication of a parameter that the decoder uses to perform one or more examples herein.

The method as described in FIG. 22 may be selected and/or applied, for example, based on the syntax element(s) to apply at the decoder. For example, the decoder may receive an indication (for example, in a message or a parameter set) that indicates filter(s), coefficients, selected or dominant component(s), applied filter output, weighting factors, etc. Based on the indication(s), the decoder may partially filter (for example, selected or dominant) components and partially derive values for other components as described in FIG. 22 for use in decoding components associated with a sample in a coding block.

A bitstream or signal may include one or more of the described syntax elements, or variations thereof. For example, a bitstream or signal may include a syntax element(s) that indicates filter(s), coefficients, selected or dominant component(s), applied filter output, weighting factors, etc. to perform the decoding method as described in FIG. 22.

A bitstream or signal may include syntax conveying information generated according to one or more examples herein. For example, information or data may be generated in performing the examples as shown in FIG. 22, including any examples described herein within the scope of examples shown in FIG. 22. The generated information or data may be conveyed in syntax included in the bitstream or signal.

Syntax elements that enable the decoder to select and apply a filter to selected or dominant filtered component(s) and derive (for example, modify) values for unselected/non-dominant component(s) using the output of the applied filter in a manner corresponding to that used by an encoder may be inserted in a signal. For example, one or more messages and/or parameter sets indicating filter(s), coefficients, selected or dominant component(s), applied filter output weighting factors, etc. to use for decoding may be generated using one or more examples herein.

A method, process, apparatus, medium storing instructions, medium storing data, or signal for creating and/or transmitting and/or receiving and/or decoding a bitstream or signal that includes one or more of the described syntax elements, or variations thereof.

A method, process, apparatus, medium storing instructions, medium storing data, or signal for creating and/or transmitting and/or receiving and/or decoding according to any of the examples described herein.

A method, process, apparatus, medium storing instructions, medium storing data, or signal according to, but not limited to one or more of the following in any number or combination: selecting a filter coefficient training function; training for an optimal set of filter coefficients; determining whether to terminate training early; selecting a filter among multiple filters; aligning optimization criterion of block classification with optimization criterion for filter coefficient derivation; determining whether to apply a previously derived filter; selecting one or more (for example, dominant) components to apply a filter (for example, filter coefficients) to; determining whether to turn filters on/off; performing rate-distortion (RD) cost biasing operations; performing operations described in formulas and/or equations; determining and signaling residuals, offset signals, weighting factors, flags, variables, parameters, filters, coefficients, LUTs, etc.; receiving a video signal comprising luma and chroma components; obtaining (for example, selecting) a filter associated with a coding block; reconstructing chroma blocks; reconstructing the samples of a coding unit; receiving filter on/off flags; receiving a video signal comprising luma and chroma components; receiving a filter associated with a coding block; filtering a sample within a coding unit; applying an obtained (for example, a determined or an indicated, such as received) filter (for example, a CCALF, VFF) to a first component associated with a sample in the coding block; modifying a value for a second component associated with the sample in the coding block using an output of the filter applied to the first component modifying a value for a third component associated with the sample in the coding block using the output of the filter applied to the first component obtaining (for example, calculating) a weighting factor associated with the third component applying the weighting factor to the output of the filter to generate a weighted filter output; modifying the third component associated with the sample in the coding block using the weighted filter output; reconstructing a value for the first component obtaining a refinement signal for the second component and for the third component based on a difference between the output of the filter and the value for the first component before the value for the first component is filtered using the filter; reconstructing a value for the first component, the value for the second component, and the value for the third component for the sample in the coding block; obtaining a refinement signal for the second component and for the third component based on a difference between the output of the filter and the value for the first component before the value for the first component is filtered using the filter; obtaining a first weighting factor associated with the second component; determining a first weighted refinement signal based on the first weighting factor and the refinement signal; obtaining a second weighting factor associated with the third component; determining a second weighted refinement signal based on the second weighting factor and the refinement signal; modifying the second component using the first weighted refinement signal; modifying the value for the third component using the second weighted refinement signal; obtaining a CCALF filter associated with a coding block; obtaining a sample in the coding block comprising a first (luma) component, a second (chroma) component and a third (chroma) component obtaining a chroma ALF associated with the second component and the third component; applying the chroma ALF to the second component and the third component to generate the value for the second component and the value for the third component obtaining a weighting factor associated with the third component; applying the weighting factor to the output of the filter to generate a weighted filter output and modifying the value for the third component using the weighted filter output applying a CCALF to a first component associated with a sample in a coding block and not filtering a value for a second or a third component associated with the sample with a chroma ALF; and/or partially filtering a plurality of or a set of components (for example, a first component) associated with a sample in a coding block and partially deriving (for example, modifying) component values for the plurality or the set of components (for example, second and third components) using an output generated by the partial filtering of the set of components.

A TV, set-top box, cell phone, tablet, or other electronic device that performs partial filtering of a plurality of components, such as video components, associated with a sample in a coding block and modifies a value for at least one other component in the plurality of components using an output of the filter applied to the first component, according to any of the examples described herein A TV, set-top box, cell phone, tablet, or other electronic device that performs filtering on a subset of a plurality of components associated with a sample in a coding block to generate a filtered output and derives values for at least one other component in the plurality of components using the filtered output according to any of the examples described herein, and that displays (for example, using a monitor, screen, or other type of display) a resulting visual representation.

A TV, set-top box, cell phone, tablet, or other electronic device that selects (for example, using a tuner) a channel to receive a signal including a filter associated with a coding block, applies the filter to at least a first component associated with a sample in the coding block, and modifies a value for at least a second component associated with the sample in the coding block using an output of the filter applied to the first component, according to any of the examples described herein.

A TV, set-top box, cell phone, tablet, or other electronic device that receives (for example, using an antenna) a signal over the air that includes a filter associated with a coding block, applies the filter to at least a first component associated with a sample in the coding block, and modifies a value for at least a second component associated with the sample in the coding block using an output of the filter applied to the first component, according to any of the examples described herein.

An encoder (e.g., including a processor, memory and a transmit/receive unit) may be configured to execute any (e.g., partial, full, separate or cumulative) method described herein. A decoder (e.g., including a processor, memory and a transmit/receive unit) may be configured to execute any (e.g., partial, full, separate or cumulative) method described herein. A WTRU (e.g., including a processor, memory and a transmit/receive unit) may be configured to execute any (e.g., partial, full, separate or cumulative) method described herein.

Each of the contents of the following references is incorporated by reference herein: (1) ITU-T Rec. H.264 and ISO/IEC/MPEG-4 part 10, "Advanced video coding for generic audiovisual services," November 2007; (2) SMPTE 421M, "VC-1 compressed video bitstream format and decoding process," April 2006; (3) B. Bross, W.-J. Han, G. J. Sullivan, J.-R. Ohm and T. Wiegand, "High efficiency video coding (HEVC) text specification draft 10," ITU-T SG16 WP3 and ISO/IEC JTC1/SC29/WG11 Doc. JCTVC-L1003, February 2012; (4) A. Segall, V. Baroncini, J. Boyce, J. Chen, T. Suzuki, "Joint call for proposals on video compression with capability beyond HEVC", JVET-H1002, October 2017, Macau, China, (5) B. Bross, J. Chen, S. Liu "Versatile Video Coding (Draft 6)", JVET-O2001, July 2019, Gothenburg, Sweden; (6) Y. Du, X. Zhao, X. Li, S. Liu (Tencent), "Non-CE5: On non-linear ALF clipping values", JVET-P0505, October 2019, Geneva, CH; (7) K. Misra, F. Bossen, A. Segall, "Cross-Component Adaptive Loop Filter for chroma", JVET-O0636, July 2019, Gothenburg, Sweden; (8) K. Misra, F. Bossen, A. Segall (Sharp Labs of America), N. Hu, J. Dong, V. Seregin, M. Karczewicz (Qualcomm), P. Onno, C. Gisquet, G. Laroche (Canon), J. Li, C. S. Lim, C.-W. Kuo (Panasonic), J. Nam, J. Choi, J. Lim, S. Kim (LGE), O. Chubach, C.-Y. Lai, C.-Y. Chen, T.-D. Chuang, Y.-W. Huang, S.-M. Lei (MediaTek), "CE5-related: On the design of CC-ALF", JVET-P1008, October 2019, Geneva, CH; (9) H. Yang, Y. He, H. Li (InterDigital), "CE5-related: Joint chroma cross-component adaptive loop filtering", JVET-P0372, October 2019, Geneva, CH; and (10) F. Bossen, J. Boyce, X. Li, V. Seregin, K. SOhing, "JVET common test conditions and software reference configurations for SDR video", JVET-O2010, Gothenburg, Sweden, July 2019.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the one or more examples herein. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art based the foregoing descriptions. No element, act, or instruction used in the description of the present application should be construed as critical or essential to some of the examples unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than", "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An apparatus for video decoding, comprising one or more processors, wherein the one or more processors are configured to:
   obtain a filter associated with a coding block comprising a first component, a second component and a third component, wherein the filter is associated with the second component and the third component;
   apply the filter to a value of the first component associated with a sample in the coding block to obtain an output of the filter;
   modify a value for the second component associated with the sample in the coding block using the output of the filter to obtain a modified value for the second component;
   obtain a weighting factor associated with the third component;
   apply the weighting factor to the output of the filter to generate a weighted filter output; and
   modify a value for the third component associated with the sample in the coding block using the weighted filter output to obtain a modified-weighted value for the third component.

2. The video decoding apparatus of claim 1, wherein the filter is derived based on the second component and the third component.

3. The video decoding apparatus of claim 1, wherein the one or more processors are further configured to:
   reconstruct the value for the first component, wherein the value for the first component is constructed before the filter is applied to the value of the first component to generate the output of the filter; and
   obtain a refinement signal for the second component and for the third component based on a difference between the output of the filter and the value for the first component.

4. The video decoding apparatus of claim 1, wherein the one or more processors are further configured to:
   reconstruct the value for the first component, the value for the second component, and the value for the third component associated with the sample in the coding block, wherein the value for the first component is constructed before the filter is applied to the value of the first component to generate the output of the filter;
   obtain a refinement signal for the second component and for the third component based on a difference between the output of the filter and the value for the first component;
   obtain a first weighting factor associated with the second component;
   determine a first weighted refinement signal based on the first weighting factor and the refinement signal for the second component and for the third component;
   obtain a second weighting factor associated with the third component; and
   determine a second weighted refinement signal based on the second weighting factor and the refinement signal for the second component and for the third component, wherein the value for the second component associated with the sample in the coding block is modified using the first weighted refinement signal, and the value for the third component associated with the sample in the coding block is modified using the second weighted refinement signal.

5. The video decoding apparatus of claim 1, wherein the filter is a cross-component adaptive loop filter (CCALF), the first component is a luma component, the second component and the third component are chroma components, and the one or more processors are further configured to:
   obtain a chroma adaptive loop filter (ALF) associated with the second component and the third component; and
   apply the chroma ALF to the second component and the third component to generate the value for the second component and the value for the third component.

6. The video decoding apparatus of claim 1, wherein the filter is a cross-component adaptive loop filter (CCALF), and the value for the second component and the value for the third component are not filtered by a chroma ALF.

7. The video decoding apparatus of claim 1, wherein the value for the second component associated with the sample in the coding block is refined using the output of the filter, and the value for the third component associated with the sample in the coding block is refined using the output of the filter.

8. The video decoding apparatus of claim 1, wherein the filter comprises a set of coefficients, wherein the set of coefficients are obtained based on the second component and the third component.

9. The video decoding apparatus of claim 1, wherein the apparatus further comprises a memory.

10. A method for video decoding, comprising:
    obtaining a filter associated with a coding block comprising a first component, a second component, and a third component, wherein the filter is associated with the second component and the third component;

applying the filter to a value of the first component associated with a sample in the coding block to obtain an output of the filter;

modifying a value for the second component associated with the sample in the coding block using the output of the filter to obtain a modified value for the second component;

obtaining a weighting factor associated with the third component;

applying the weighting factor to the output of the filter to generate a weighted filter output; and modifying a value for the third component associated with the sample in the coding block using the weighted filter output to obtain a modified-weighted value for the third component.

11. The video decoding method of claim 10, wherein the filter is derived based on the second component and the third component.

12. The video decoding method of claim 10, further comprising:

reconstructing the value for the first component, wherein the value for the first component is constructed before the filter is applied to the first component to generate the output of the filter; and obtaining a refinement signal for the second component and for the third component based on a difference between the output of the filter and the value for the first component.

13. The video decoding method of claim 10, further comprising:

reconstructing the value for the first component, the value for the second component, and the value for the third component associated with the sample in the coding block, wherein the value for the first component is constructed before the filter is applied to the value of the first component to generate the output of the filter;

obtaining a refinement signal for the second component and for the third component based on a difference between the output of the filter and the value for the first component;

obtaining a first weighting factor associated with the second component;

determining a first weighted refinement signal based on the first weighting factor and the refinement signal for the second component and for the third component;

obtaining a second weighting factor associated with the third component; and determining a second weighted refinement signal based on the second weighting factor and the refinement signal for the second component and for the third component, wherein the value for the second component associated with the sample in the coding block is modified using the first weighted refinement signal, and the value for the third component associated with the sample in the coding block is modified using the second weighted refinement signal.

14. The video decoding method of claim 10, wherein the filter is a cross-component adaptive loop filter (CCALF), the first component is a luma component, the second component and the third component are chroma components, and the method further comprises:

obtaining a chroma adaptive loop filter (ALF) associated with the second component and the third component; and applying the chroma ALF to the second component and the third component to generate the value for the second component and the value for the third component.

15. The video decoding method of claim 10, wherein the filter is a cross-component adaptive loop filter (CCALF), and the value for the second component and the value for the third component are not filtered by a chroma ALF.

16. The video decoding method of claim 10, wherein the value for the second component associated with the sample in the coding block is refined using the output of the filter, and the value for the third component associated with the sample in the coding block is refined using the output of the filter.

17. The video decoding method of claim 10, wherein the filter comprises a set of coefficients, and wherein the set of coefficients are obtained based on the second component and the third component.

18. A non-transitory computer readable medium including instructions for causing one or more processors to:

obtain a filter associated with a coding block comprising a first component, a second component, and a third component, wherein the filter is associated with the second component and the third component;

apply the filter to a value of the first component associated with a sample in the coding block to obtain an output of the filter;

modify a value for the second component associated with the sample in the coding block using an output of the filter to obtain a modified value for the second component;

obtain a weighting factor associated with the third component;

apply the weighting factor to the output of the filter to generate a weighted filter output; and modify a value for the third component associated with the sample in the coding block using the weighted filter output to obtain a modified-weighted value for the third component.

* * * * *